US010528444B2

(12) United States Patent
Harneja et al.

(10) Patent No.: US 10,528,444 B2
(45) Date of Patent: Jan. 7, 2020

(54) EVENT GENERATION IN RESPONSE TO VALIDATION BETWEEN LOGICAL LEVEL AND HARDWARE LEVEL

(71) Applicant: Cisco Technology, Inc., San Jose, CA (US)

(72) Inventors: Sanchay Harneja, Belmont, CA (US); Navneet Yadav, Cupertino, CA (US); Sanjay Sundaresan, San Jose, CA (US); Harsha Jagannati, Fremont, CA (US); Ramadoss Venkatesan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 186 days.

(21) Appl. No.: 15/663,594

(22) Filed: Jul. 28, 2017

(65) Prior Publication Data
US 2018/0365121 A1 Dec. 20, 2018

Related U.S. Application Data

(60) Provisional application No. 62/521,767, filed on Jun. 19, 2017.

(51) Int. Cl.
*G06F 11/00* (2006.01)
*G06F 11/22* (2006.01)
(Continued)

(52) U.S. Cl.
CPC ...... *G06F 11/2289* (2013.01); *G06F 11/0709* (2013.01); *G06F 11/0766* (2013.01);
(Continued)

(58) Field of Classification Search
CPC ............. G06F 11/2289; G06F 11/0709; G06F 11/0766; G06F 11/079; G06F 11/0781;
(Continued)

(56) References Cited

U.S. PATENT DOCUMENTS

| 5,204,829 A | 4/1993 | Lyu et al. |
| 6,763,380 B1 | 7/2004 | Mayton et al. |

(Continued)

FOREIGN PATENT DOCUMENTS

| CN | 105471830 | 4/2016 |
| CN | 105721193 | 6/2016 |

(Continued)

OTHER PUBLICATIONS

Akella, Aditya, et al., "A Highly Available Software Defined Fabric," HotNets-XIII, Oct. 27-28, 2014, Los Angeles, CA, USA, Copyright 2014, ACM, pp. 1-7.
(Continued)

*Primary Examiner* — Joseph D Manoskey
(74) *Attorney, Agent, or Firm* — Polsinelli PC

(57) ABSTRACT

Disclosed are systems, methods, and computer-readable media for assuring tenant forwarding in a network environment. Network assurance can be determined in layer 1, layer 2 and layer 3 of the networked environment including, internal-internal (e.g., inter-fabric) forwarding and internal-external (e.g., outside the fabric) forwarding in the networked environment. The network assurance can be performed using logical configurations, software configurations and/or hardware configurations.

20 Claims, 29 Drawing Sheets

(51) Int. Cl.
*H04L 12/24* (2006.01)
*G06F 11/07* (2006.01)
*G06F 16/23* (2019.01)

(52) U.S. Cl.
CPC ...... *G06F 16/2365* (2019.01); *H04L 41/0866* (2013.01); *H04L 41/145* (2013.01)

(58) Field of Classification Search
CPC ............. G06F 16/2365; H04L 41/0866; H04L 41/145
See application file for complete search history.

(56) References Cited

U.S. PATENT DOCUMENTS

| | | | |
|---|---|---|---|
| 7,003,562 B2 | 2/2006 | Mayer | |
| 7,089,369 B2 | 8/2006 | Emberling | |
| 7,127,686 B2 | 10/2006 | Dreschler et al. | |
| 7,360,064 B1 | 4/2008 | Steiss et al. | |
| 7,453,886 B1 | 11/2008 | Allan | |
| 7,505,463 B2 | 3/2009 | Schuba et al. | |
| 7,548,967 B2 | 6/2009 | Amyot et al. | |
| 7,552,201 B2 | 6/2009 | Areddu et al. | |
| 7,609,647 B2 | 10/2009 | Turk et al. | |
| 7,619,989 B2 | 11/2009 | Guingo et al. | |
| 7,698,561 B2 | 4/2010 | Nagendra et al. | |
| 7,743,274 B2 | 6/2010 | Langford et al. | |
| 7,765,093 B2 | 7/2010 | Li et al. | |
| 8,010,952 B2 | 8/2011 | Datla et al. | |
| 8,073,935 B2 | 12/2011 | Viswanath | |
| 8,103,480 B2 | 1/2012 | Korn et al. | |
| 8,190,719 B2 | 5/2012 | Furukawa | |
| 8,209,738 B2 | 6/2012 | Nicol et al. | |
| 8,261,339 B2 | 9/2012 | Aldridge et al. | |
| 8,312,261 B2 | 11/2012 | Rao et al. | |
| 8,375,117 B2 | 2/2013 | Venable, Sr. | |
| 8,441,941 B2 | 5/2013 | McDade et al. | |
| 8,479,267 B2 | 7/2013 | Donley et al. | |
| 8,484,693 B2 | 7/2013 | Cox et al. | |
| 8,494,977 B1 | 7/2013 | Yehuda et al. | |
| 8,554,883 B2 | 10/2013 | Sankaran | |
| 8,589,934 B2 | 11/2013 | Makljenovic et al. | |
| 8,621,284 B2 | 12/2013 | Kato | |
| 8,627,328 B2 | 1/2014 | Mousseau et al. | |
| 8,693,344 B1 | 4/2014 | Adams et al. | |
| 8,693,374 B1 | 4/2014 | Murphy et al. | |
| 8,761,036 B2 | 6/2014 | Fulton et al. | |
| 8,782,182 B2 | 7/2014 | Chaturvedi et al. | |
| 8,824,482 B2 | 9/2014 | Kajekar et al. | |
| 8,910,143 B2 | 12/2014 | Cohen et al. | |
| 8,914,843 B2 | 12/2014 | Bryan et al. | |
| 8,924,798 B2 | 12/2014 | Jerde et al. | |
| 9,019,840 B2 | 4/2015 | Salam et al. | |
| 9,038,151 B1 | 5/2015 | Chua et al. | |
| 9,055,000 B1 | 6/2015 | Ghosh et al. | |
| 9,106,555 B2 | 8/2015 | Agarwal et al. | |
| 9,137,096 B1 | 9/2015 | Yehuda et al. | |
| 9,225,601 B2 | 12/2015 | Khurshid et al. | |
| 9,246,818 B2 | 1/2016 | Deshpande et al. | |
| 9,264,922 B2 | 2/2016 | Gillot et al. | |
| 9,276,877 B1 | 3/2016 | Chua et al. | |
| 9,319,300 B2 | 4/2016 | Huynh Van et al. | |
| 9,344,348 B2 | 5/2016 | Ivanov et al. | |
| 9,369,434 B2 | 6/2016 | Kim et al. | |
| 9,389,993 B1 | 7/2016 | Okmyanskiy et al. | |
| 9,405,553 B2 | 8/2016 | Branson et al. | |
| 9,444,842 B2 | 9/2016 | Porras et al. | |
| 9,497,207 B2 | 11/2016 | Dhawan et al. | |
| 9,497,215 B2 | 11/2016 | Vasseur et al. | |
| 9,544,224 B2 | 1/2017 | Chu et al. | |
| 9,548,965 B2 | 1/2017 | Wang et al. | |
| 9,553,845 B1 | 1/2017 | Talmor et al. | |
| 9,571,502 B2 | 2/2017 | Basso et al. | |
| 9,571,523 B2 | 2/2017 | Porras et al. | |
| 9,594,640 B1 | 3/2017 | Chheda | |
| 9,596,141 B2 | 3/2017 | McDowall | |
| 9,641,249 B2 | 5/2017 | Kaneriya et al. | |
| 9,654,300 B2 | 5/2017 | Pani | |
| 9,654,361 B2 | 5/2017 | Vasseur et al. | |
| 9,654,409 B2 | 5/2017 | Yadav et al. | |
| 9,660,886 B1 | 5/2017 | Ye et al. | |
| 9,660,897 B1 | 5/2017 | Gredler | |
| 9,667,645 B1 | 5/2017 | Belani et al. | |
| 9,680,875 B2 | 6/2017 | Knjazihhin et al. | |
| 9,686,180 B2 | 6/2017 | Chu et al. | |
| 9,686,296 B1 | 6/2017 | Murchison et al. | |
| 9,690,644 B2 | 6/2017 | Anderson et al. | |
| 9,781,004 B2 | 10/2017 | Danait et al. | |
| 9,787,559 B1 | 10/2017 | Schroeder | |
| 9,998,247 B1 | 6/2018 | Choudhury et al. | |
| 10,084,795 B2 | 9/2018 | Akireddy et al. | |
| 10,084,833 B2 | 9/2018 | McDonnell et al. | |
| 10,084,895 B2 | 9/2018 | Kasat et al. | |
| 2002/0143855 A1 | 10/2002 | Traversat et al. | |
| 2002/0178246 A1 | 11/2002 | Mayer | |
| 2003/0229693 A1 | 12/2003 | Mahlik et al. | |
| 2004/0073647 A1 | 4/2004 | Gentile et al. | |
| 2004/0168100 A1 | 8/2004 | Thottan et al. | |
| 2005/0108389 A1 | 5/2005 | Kempin et al. | |
| 2007/0011629 A1 | 1/2007 | Shacham et al. | |
| 2007/0058570 A1* | 3/2007 | Singh | H04L 41/0866 370/254 |
| 2007/0124437 A1 | 5/2007 | Chervets | |
| 2007/0214244 A1 | 9/2007 | Hitokoto et al. | |
| 2008/0031147 A1 | 2/2008 | Fieremans et al. | |
| 2008/0117827 A1 | 5/2008 | Matsumoto et al. | |
| 2008/0133731 A1 | 6/2008 | Bradley et al. | |
| 2008/0172716 A1 | 7/2008 | Talpade et al. | |
| 2009/0240758 A1 | 9/2009 | Pasko et al. | |
| 2009/0249284 A1 | 10/2009 | Antosz et al. | |
| 2010/0191612 A1 | 7/2010 | Raleigh | |
| 2010/0195537 A1* | 8/2010 | Pelletier | H04L 41/0604 370/255 |
| 2010/0198909 A1 | 8/2010 | Kosbab et al. | |
| 2011/0093612 A1 | 4/2011 | Murakami | |
| 2011/0295983 A1 | 12/2011 | Medved et al. | |
| 2012/0054163 A1 | 3/2012 | Liu et al. | |
| 2012/0198073 A1 | 8/2012 | Srikanth et al. | |
| 2012/0297061 A1 | 11/2012 | Pedigo et al. | |
| 2013/0097660 A1 | 4/2013 | Das et al. | |
| 2013/0191516 A1 | 7/2013 | Sears | |
| 2013/0290512 A1* | 10/2013 | Ngoo | H04L 41/147 709/224 |
| 2014/0019597 A1 | 1/2014 | Nath et al. | |
| 2014/0068035 A1* | 3/2014 | Croy | H04L 41/0893 709/221 |
| 2014/0177638 A1 | 6/2014 | Bragg et al. | |
| 2014/0222996 A1 | 8/2014 | Vasseur et al. | |
| 2014/0304831 A1 | 10/2014 | Hidlreth et al. | |
| 2014/0307556 A1 | 10/2014 | Zhang | |
| 2014/0321277 A1 | 10/2014 | Lynn, Jr. et al. | |
| 2014/0379915 A1 | 12/2014 | Yang et al. | |
| 2015/0019756 A1 | 1/2015 | Masuda | |
| 2015/0113143 A1 | 4/2015 | Stuart et al. | |
| 2015/0124826 A1 | 5/2015 | Edsall et al. | |
| 2015/0186206 A1 | 7/2015 | Bhattacharya et al. | |
| 2015/0234695 A1 | 8/2015 | Cuthbert et al. | |
| 2015/0244617 A1 | 8/2015 | Nakil et al. | |
| 2015/0271104 A1 | 9/2015 | Chikkamath et al. | |
| 2015/0295771 A1 | 10/2015 | Cuni et al. | |
| 2015/0365314 A1 | 12/2015 | Hiscock et al. | |
| 2015/0381484 A1 | 12/2015 | Hira et al. | |
| 2016/0020993 A1 | 1/2016 | Wu et al. | |
| 2016/0021141 A1 | 1/2016 | Liu et al. | |
| 2016/0026631 A1 | 1/2016 | Salam et al. | |
| 2016/0036636 A1 | 2/2016 | Erickson et al. | |
| 2016/0048420 A1 | 2/2016 | Gourlay et al. | |
| 2016/0072769 A1* | 3/2016 | Yakuwa | H04L 41/145 726/12 |
| 2016/0078220 A1 | 3/2016 | Scharf et al. | |
| 2016/0080350 A1 | 3/2016 | Chaturvedi et al. | |
| 2016/0099883 A1 | 4/2016 | Voit et al. | |
| 2016/0105317 A1 | 4/2016 | Zimmermann et al. | |
| 2016/0112246 A1 | 4/2016 | Singh et al. | |
| 2016/0112269 A1 | 4/2016 | Singh et al. | |
| 2016/0149751 A1 | 5/2016 | Pani et al. | |

(56) References Cited

U.S. PATENT DOCUMENTS

| | | | |
|---|---|---|---|
| 2016/0164748 A1 | 6/2016 | Kim | |
| 2016/0224277 A1 | 8/2016 | Batra et al. | |
| 2016/0241436 A1 | 8/2016 | Fourie et al. | |
| 2016/0254964 A1 | 9/2016 | Benc | |
| 2016/0267384 A1 | 9/2016 | Salam et al. | |
| 2016/0323319 A1 | 11/2016 | Gourlay et al. | |
| 2016/0330076 A1 | 11/2016 | Tiwari et al. | |
| 2016/0352566 A1 | 12/2016 | Mekkattuparamban et al. | |
| 2016/0352640 A1* | 12/2016 | Kompella | H04L 63/20 |
| 2016/0380892 A1 | 12/2016 | Mahadevan et al. | |
| 2017/0026292 A1 | 1/2017 | Smith et al. | |
| 2017/0031800 A1 | 2/2017 | Shani et al. | |
| 2017/0031970 A1 | 2/2017 | Burk | |
| 2017/0048110 A1 | 2/2017 | Wu et al. | |
| 2017/0048126 A1 | 2/2017 | Handige Shankar et al. | |
| 2017/0054602 A1* | 2/2017 | Byard | H04L 41/0869 |
| 2017/0054758 A1 | 2/2017 | Maino et al. | |
| 2017/0063599 A1 | 3/2017 | Wu et al. | |
| 2017/0093630 A1 | 3/2017 | Foulkes | |
| 2017/0093664 A1 | 3/2017 | Lynam et al. | |
| 2017/0093750 A1 | 3/2017 | McBride et al. | |
| 2017/0093918 A1 | 3/2017 | Banerjee et al. | |
| 2017/0111259 A1 | 4/2017 | Wen et al. | |
| 2017/0118167 A1 | 4/2017 | Subramanya et al. | |
| 2017/0126740 A1 | 5/2017 | Bejarano Ardila et al. | |
| 2017/0126792 A1 | 5/2017 | Halpern et al. | |
| 2017/0134233 A1 | 5/2017 | Dong et al. | |
| 2017/0163442 A1 | 6/2017 | Shen et al. | |
| 2017/0187577 A1 | 6/2017 | Nevrekar et al. | |
| 2017/0195187 A1 | 7/2017 | Bennett et al. | |
| 2017/0206129 A1 | 7/2017 | Yankilevich et al. | |
| 2017/0222873 A1 | 8/2017 | Lee et al. | |
| 2017/0353355 A1 | 12/2017 | Danait et al. | |
| 2018/0069754 A1 | 3/2018 | Dasu et al. | |
| 2018/0167294 A1 | 6/2018 | Gupta et al. | |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Alsheikh, Mohammad Abu, et al., "Machine Learning in Wireless Sensor Networks: Algorithms, Strategies, and Application," Mar. 19, 2015, pp. 1-23.

Cisco Systems, Inc., "Cisco Application Centric Infrastructure 9ACI Endpoint Groups (EPG) Usange and Design," White Paper, May 2014, pp. 1-14.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Lindem, A., et al., "Network Device YANG Organizational Model draft-rtgyangdt-rtgwg-device-model-01," Network Working Group, Internet-draft, Sep. 21, 2015, pp. 1-33.

Panda, Aurojit, et al., "SCL: Simplifying Distributed SDN Control Planes," people.eecs.berkeley.edu, Mar. 2017, pp. 1-17.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

Cisco Systems, Inc., "The Cisco Application Policy Infrastructure Controller Introduction: What is the Cisco Application Policy Infrastructure Controller?" Jul. 31, 2014, 19 pages.

Jain, Praveen, et al., "In-Line Distributed and Stateful Security Policies for Applications in a Network Environment," Cisco Systems, Inc., Aug. 16, 2016, 13 pages.

Maldonado-Lopez, Ferney, et al., "Detection and prevention of firewall-rule conflicts on software-defined networking," 2015 7th International Workshop on Reliable Networks Design and Modeling (RNDM), IEEE, Oct. 5, 2015, pp. 259-265.

Vega, Andres, et al., "Troubleshooting Cisco Application Centric Infrastructure: Analytical problem solving applied to the Policy Driven Data Center," Feb. 15, 2016, 84 pages.

Xia, Wenfeng, et al., "A Survey on Software-Defined Networking," IEEE Communications Surveys and Tutorials, Mar. 16, 2015, pp. 27-51.

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Fayaz, Seyed K., et al., "Efficient Network Reachability Analysis using a Succinct Control Plane Representation," 2016, ratul.org, pp. 1-16.

Feldmann, Anja, et al., "IP Network Configuration for Intradomain Traffic Engineering," Semantic Scholar, accessed on Jul. 20, 2017, pp. 1-27.

Han, Yoonseon, et al., "An Intent-based Network Virtualization Platform for SDN," 2016 I FIP, pp. 1-6.

Han, Wonkyu, et al., "LPM: Layered Policy Management for Software-Defined Networks," Mar. 8, 2016, pp. 1-8.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, pp. 1-10.

Moon, Daekyeong, et al., "Bridging the Software/Hardware Forwarding Divide," Berkeley.edu, Dec. 18, 2010, pp. 1-15.

Shin, Seugwon, et al., "FRESCO: Modular Composable Security Services for Software-Defined Networks," To appear in the ISOC Network and Distributed System Security Symposium, Feb. 2013, pp. 1-16.

(56) References Cited

OTHER PUBLICATIONS

Shukla, Apoorv, et al., "Towards meticulous data plane monitoring," kaust.edu.sa, access on Aug. 1, 2017, pp. 1-2.
Tang, Yongning, et al., "Automatic belief network modeling via policy inference for SDN fault localization," Journal of Internet Services and Applications, 2016, pp. 1-13.
Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.
Tongaonkar, Alok, et al., "Inferring Higher Level Policies from Firewall Rules," Proceedings of the 21st Large Installation System Administration Conference (LISA '07), Nov. 11-16, 2007, pp. 1-14.
Zhou, Shijie, et al., "High-Performance Packet Classification on GPU," 2014 IEEE, pp. 1-6.

\* cited by examiner

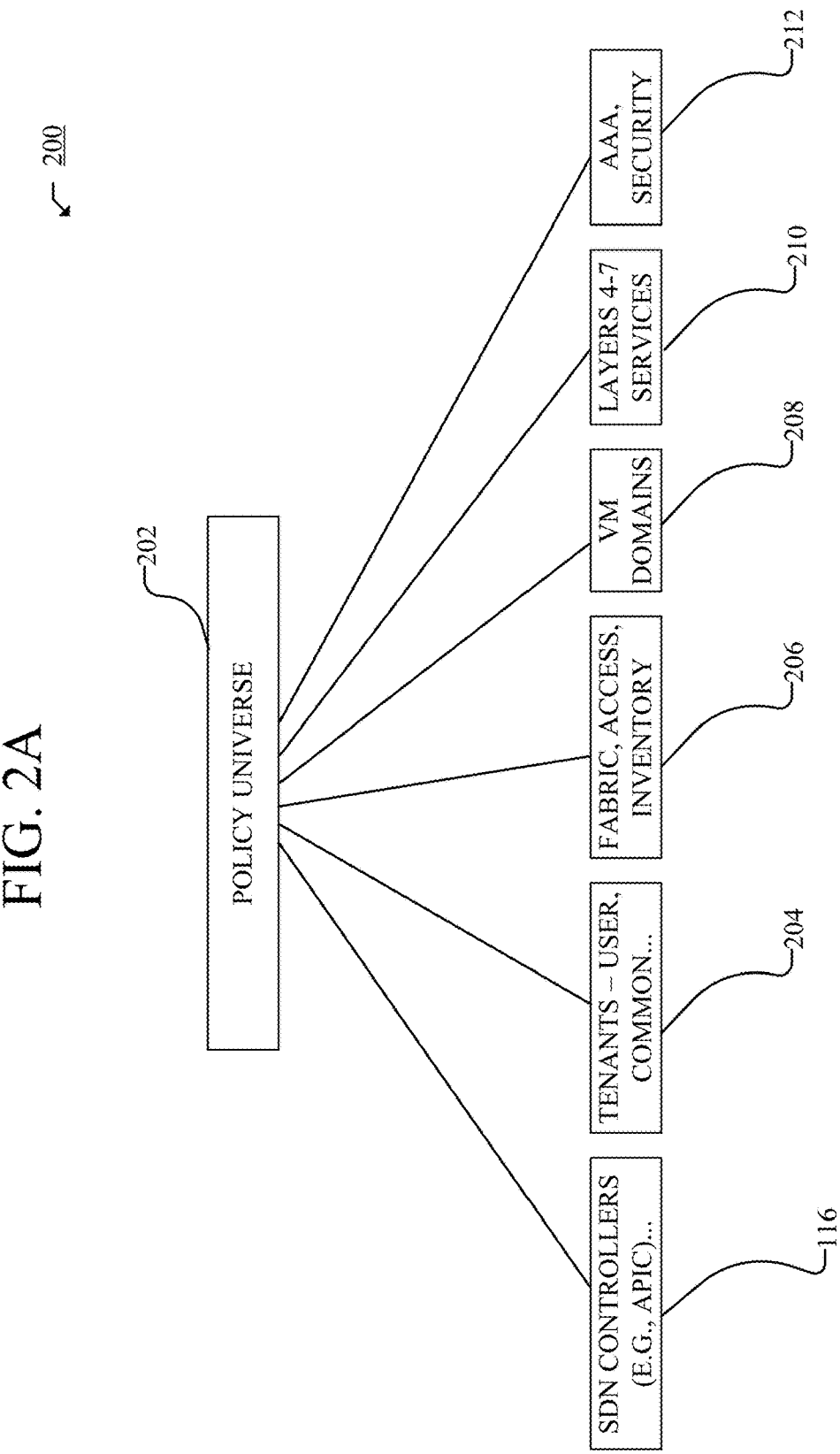

INPUT AND OUTPUT OF STATIC POLICY ANALYZER

EVENT GENERATION IN RESPONSE TO VALIDATION BETWEEN LOGICAL LEVEL AND HARDWARE LEVEL

CROSS REFERENCE TO RELATED APPLICATIONS

The instant application claims priority to U.S. Provisional Application No. 62/521,767, entitled EVENT GENERATION IN RESPONSE TO VALIDATION BETWEEN LOGICAL LEVEL AND HARDWARE LEVEL, filed Jun. 19, 2017, the contents of which are incorporated by reference in its entirety.

TECHNICAL FIELD

The present technology pertains to network configuration and assurance, and more specifically to routing and forwarding configuration and assurance internal and external to a network.

BACKGROUND

Computer networks are becoming increasingly complex, often involving low level as well as high level configurations at various layers of the network. For example, computer networks generally include numerous access policies, forwarding policies, routing policies, security policies, quality-of-service (QoS) policies, etc., which together define the overall behavior and operation of the network. Network operators have a wide array of configuration options for tailoring the network to the needs of the users. While the different configuration options available provide network operators a great degree of flexibility and control over the network, they also add to the complexity of the network. In many cases, the configuration process can become highly complex. Not surprisingly, the network configuration process is increasingly error prone. In addition, troubleshooting errors in a highly complex network can be extremely difficult. The process of identifying the root cause of undesired behavior in the network can be a daunting task.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates an example object model for a network;

DESCRIPTION OF EXAMPLE EMBODIMENTS

Figure 1A:
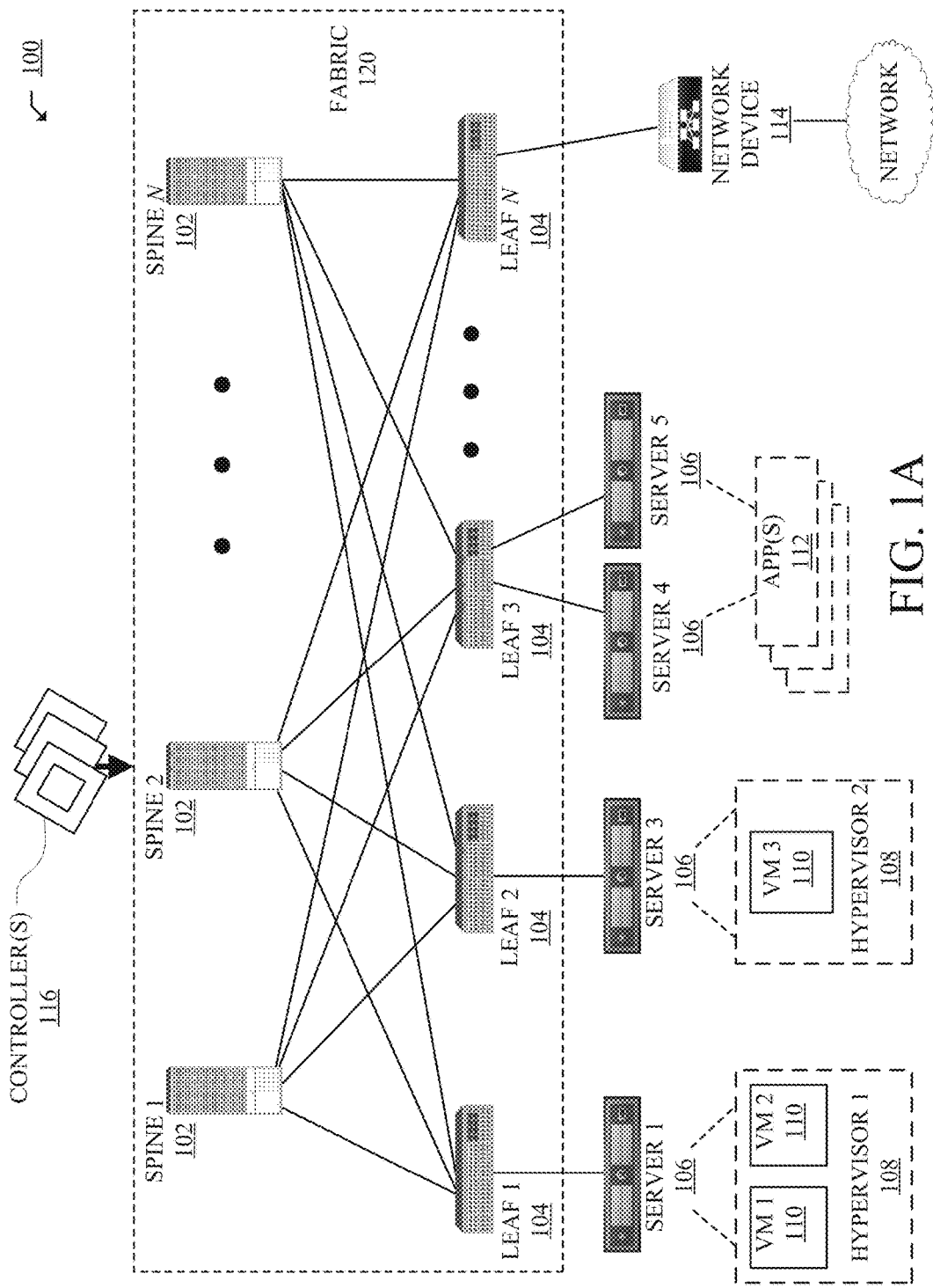
FIGS. 1A and 1B illustrate example network environments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods and non-transitory computer readable medium (CRM) for network assurance of a network. The systems, methods and non-transitory computer readable medium are configured to receive, from a controller, a global logical model in a first format, the global logical model containing instructions on how endpoints connected to a network fabric communicate within the fabric and receive, from one or more network devices within the fabric, a software model being at least a subset of instructions from the global logical model in a second format executable on the one or more network devices, the subset of instructions being instructions from the global logical model that are specific to operability of the one or more network devices. The systems, methods and non-transitory computer readable medium are also configured to create a local logical model in the first format, the local logical model being at least a portion of the received global logical model containing instructions on how endpoints connected to a network fabric communicate within the fabric, convert at least a portion of the created local logical model and at least a portion of the received software model into a common format, and compare content of overlapping fields from the common format of the local logical model and the common format of the software model, wherein a positive outcome of the comparison represents that the one or more network devices accurately created the received software model from the received global logical model. In some examples, the first and second formats are different from each other, the common format is one of the first and second formats, or is different from both of the first and second formats.

In some examples, the systems, methods and CRM can be configured to receive from the one or more network devices within the fabric, a hardware model of hardware configurations converted from the software model. The systems, methods and CRM can be configured to convert at least a portion of the received software model and at least a portion of the received hardware model into the common format and compare content of overlapping fields from the common format of the software model with the common format of the hardware model, and a positive outcome of the first and second comparisons represents that that the one or more network devices accurately created the hardware model from the global logical model. In some examples, the hardware model has a format that is different from the first format and the second format, the second format is one of the second and third formats, or is different from both of the second and third formats, Also disclosed are systems, methods and CRM for event generation in network assurance of a network. The systems, methods and CRM can be configured to receive from a controller a global logical model in a first format, the global logical model containing instructions on how endpoints connected to a network fabric communicate within each other through one or more network devices within the fabric and receive from one or more network devices within the fabric a software model being at least a subset of instructions from the global logical model in a second format executable on the one or more network devices, the subset of instructions being instructions from the global logical model that are specific to operability of the one or more network devices and a hardware model of hardware configurations converted from the software model. The systems, methods and CRM can also be configured to validate accuracy of the received global logical model, the received software model and the received hardware model and generate one or more events based on the validating In some examples, systems, methods and CRM can be configured to store prior configurations and corresponding effectiveness of the prior configurations, identify any configuration in the received global logical model, the received software model and/or the receiving hardware model that is the same or similar to a stored prior configuration with a corresponding adverse effectiveness, and report of potential flaws in the received global logical model, the received software model and/or the receiving hardware model in response to a positive result of the identifying.

In some examples, the one or more events include an informational event in response to no identified inconsistencies resulting from the validating. In other examples, the one or more events includes an error event in response to at least one identified inconsistency resulting from the validating. In some examples, the error event can have different levels of severity based on a severity of the at least one inconsistency. In some examples, in response to an error event, the system further comprising instructions, which when executed by the at least one processor causes the at least one processor to independently validate secondary content within the received global logical model, the received software model and/or the receiving hardware model, the secondary content being related to original content for which the at least one inconsistency was generated.

Also disclosed are systems, methods and CRM for performing a Layer 1 network assurance check of proper deployment of a configuration in a fabric. The systems, methods and CRM can be configured to receive from a controller, a global logical model containing instructions on how endpoints connected to a network fabric communicate within the fabric, the instructions including access policies for at least one interface and receive from one or more network devices within the fabric, a software model being at least a subset of instructions from the global logical model, the subset of instructions being instructions from the global logical model that are specific to operability of the one or more network devices. In some examples, the systems, methods and CRM can be configured to validate that at least Layer 1 of the access policies within the received global logical model are properly configured on the one network devices, identify within the received software model a reported state of a physical link and a software link of one or more ports of the one or more network devices, obtain an actual state of the physical link and the software link of the one or more ports of the one or more network devices, compare the reported state of the physical link and the software link with the obtained actual state of the physical link and the software link and generate one or more events based on the validation and/or the comparison.

In some examples, systems, methods and CRM can be configured to confirm the received global logical model, a switch profile and an interface profile are present, the switch profile and interface profile are properly linked, and that the interface profile is properly linked to a global profile.

In some examples, systems, methods and CRM can be configured to generate an error event in response to the determination that one or more of the access policies are not configured on the at least one interface.

In some examples, systems, methods and CRM can be configured to generate an error even in response to the comparison indicating that the reported state of the physical link is active and the actual state of the physical link is down, or the reported state of physical link is down and the actual state of the physical link is active.

In some examples, systems, methods and CRM can be configured to generate an error event in response to the comparison indicating that the reported state of the software link is active and the actual state of the physical switch is down, or the reported state of physical switch is down and the actual state of the physical switch is active. In some examples, systems, methods and CRM can be configured to poll the one or more network devices for the actual state of the physical link and the software link.

Also disclosed are systems, methods and CRM for performing a Layer 2 network assurance check of proper deployment of a configuration in a fabric. The systems, methods and CRM can be configured to receive, from a controller, a global logical model in a first format, the global logical model containing instructions on how endpoints connected to a network fabric communicate within the fabric and receive, from one or more network devices within the fabric, a software model being at least a subset of instructions from the global logical model in a second format executable on the one or more network devices, the subset of instructions being instructions from the global logical model that are specific to operability of the one or more network devices. The systems, methods and CRM can be configured to create a local logical model in the first format, the local logical model being at least a portion of the received global logical model that is specific to operability of the one or more network devices, convert at least a portion of Layer 2 content of the created local logical model and at least a portion of Layer 2 content of the received software model into a common format and compare content of at least some Layer 2 overlapping fields from the common format of the created local logical model and the common format of the received software model. In some examples, a positive outcome of the comparison represents that the one or more network devices earlier at least partially accurately created the software model from the global logical model. The systems, methods and CRM can also be configured to validate that at least some Layer 2 content of the global logical model is properly configured.

In some examples, at least a portion of Layer 2 content subject to the conversion and the comparison includes VLAN information and interface information, to thereby at least partially check correct deployment of any bridge domains and/or endpoint groups (EPG). In some examples the least some of the Layer 2 content subject to the validation includes, at Layer 2, that access policies are configured properly, EPGs are configured properly, that multiple EPGs when present on the one of the network devices are not using the same virtual local area network (VLAN), there are no overlapping VLANs, no duplicate VLANs at the switch level on a same switch, and no duplicate VLANS on a port level on the same port of a same switch.

The systems, methods and CRM can also be configured to receive from the one of the one or more network devices within the fabric a hardware model in a third format of hardware configurations converted from the software model, convert at least a portion of Layer 2 content of the received software model and/or at least a portion of Layer 2 content of the hardware model into the common format. and compare content of at least some of Layer 2 overlapping fields from the common format of the received software model with the common format of the received hardware model. In some examples, a positive outcome of the comparison represents that the one or more network devices at least partially accurately converted Layer 2 of the software model into the hardware model. In some examples, at least a portion of the Layer 2 content subject to the conversions and the comparisons includes the VLAN for each EPG.

The systems, methods and CRM can also be configured receive a Distributed Virtual Switch (DVS) logical model from a DVS outside of the fabric, convert at least a portion of Layer 2 content of the received DVS logical model and/or at least a portion of Layer 2 content of the received global hardware model into a third common format and compare content of at least some of Layer 2 overlapping fields from the third common format of the received global logical model with the third common format of the received DVS logical model. In some examples, a positive outcome of the third comparing represents VLANs within the global logical model have been properly assigned across the network.

Also disclosed are systems, methods and CRM for performing a Layer 3 BD subnets properly deployed network assurance check of proper deployment of a configuration in a fabric. The systems, methods and CRM can be configured to receive, from a controller, a global logical model in a first format, the global logical model containing instructions on how endpoints connected to a network fabric communicate within the fabric, the global logical model including at least one virtual routing and forwarding instance (VRF) and receive, from one or more network devices within the fabric, a software model being at least a subset of instructions from the global logical model in a second format executable on the one or more network devices, the subset of instructions being instructions from the global logical model that are specific to operability of the one or more network devices. The systems, methods and CRM can also be configured to convert, for each network device, the global model into a local logical model in the first format, the local logical model being at least a portion of the received global logical model that is specific to operability of the corresponding each network device, create a container for each VRF in the received global logical model, populate each of the created containers with the local logical model and the software model for each of the network devices associated with the VRF and confirm bridge domain (BD) subnets in the populated containers match. In some examples, the population includes a set union, such that the populated VRF container does not contain any duplicative BD subnets.

In some examples, the populated container includes a software model without a corresponding local logical model represents an improper extra item. In some examples, the populated container includes a local logical model without a corresponding software model represents an error in deployment of the global logical model.

The systems, methods and CRM can also be configured to subtract one of the software models from a corresponding local logical hardware model, subtract the corresponding local logical model from the one of the software models. In some examples, a mismatch between the subtractions represents a discrepancy. In some examples, an error event is generated in response to a mismatch between the subtractions. In some examples, an error event is generated in response to a mismatch in the bridge domain (BD) subnets in the populated container.

Also disclosed are systems, methods and CRM for performing a Layer 3 VRF container network assurance check of proper deployment of a configuration in a fabric. The systems, methods and CRM can be configured to receive a global logic model, a plurality of software models and a plurality of hardware models, the global logic model including virtual routing instance (VRF). The systems, methods and CRM can also be configured to create a plurality of local logical models from the global logical model, create, for the received VRF, a VRF container. populate the created VRF container with a subset of the received software models, received hardware models, and/or the created local logical models, the subset being defined by one or more network devices in the fabric that are associated with the VRF of the received global logical model and identify within the populated VRF container one or more of the received software models, the received hardware models, and/or the created local logical models that correspond to one or more network devices in the fabric that is not associated with the VRF of the received global logical model. In some examples, a positive result of the identification represents a discrepancy in the global logical model.

In some examples, systems, methods and CRM can be configured to validate that the global logical model is consistent with the software models and/or the hardware models. In some examples, systems, methods and CRM can be configured to compare overlapping fields of content between one of the local logic models and one of the software models. In some examples, systems, methods and CRM can be configured to compare overlapping fields of content between one of the software models and one of the hardware models. In some examples, systems, methods and CRM can be configured to generate an error event in response to a positive result of the identification.

In some examples, the software models are based on the global logical model. In some examples, the hardware models are based on corresponding software models.

Also disclosed are systems, methods and CRM for performing a RIB-FIB network assurance check of proper deployment of a configuration in a fabric. The systems, methods and CRM can be configured to obtain a forwarding information base (FIB) and a routing information base (RIB) of the network device, convert the FIB and/or the RIB to a common format, remove from the RIB and FIB duplicates, determine whether a RIB entry in the RIB matches an entry in the FIB, identify, in response to a negative result of the determination, when the entry in the FIB is covered by another RIB entry. In some examples, an error event can be generated in response to a negative result of the identification.

In some examples, systems, methods and CRM can be configured to determine an IP address/mask and next hop of an entry in the FIB matches the RIB entry. In some examples, systems, methods and CRM can be configured to identify a FIB entry in the FIB that has a next hop that matches the unmatched RIB entry and an IP address/mask that covers the unmatched RIB entry. In some examples, systems, methods and CRM can be configured to identify a FIB entry in the FIB that has an alternative subnet prefix that completely covers the unmatched RIB entry.

In some examples, the FIB is obtained from a line controller of the network device and the RIB is extracted from SUP controller of the network device. In some examples, the network device is a leaf or spine in the fabric, and the system, method and CRM can be configured to obtain from the leaf or spine a software model containing the FIB and RIB. In some examples, systems, methods and CRM can be configured to determine is applied to every entry in the RIB.

Also disclosed are systems, methods and CRM for performing a Cross End Point Group network assurance check of proper deployment of a configuration in a fabric. The systems, methods and CRM can be configured to receive a global logic model, a plurality of software models and/or a plurality of hardware models, the global logic model including a virtual routing and forwarding instance (VRF), the VRF having under it at least one bridge domain (BD) and at least one associated EPG. The systems, methods and CRM can also be configured to create a plurality of local logical models from the received global logical model, create, for the VRF of the received global logical model, a VRF container, populate the created VRF container with a subset of the software models, the hardware models, and/or the local logical models, the subset being defined by leafs in the fabric on which the VRF is deployed, determine whether a security contract exists between any of the at least one EPG in the VRF container and an EPG not in the VRF container of the received global logical model and validate, in response to a positive result of the determination, that one or more subnets do not clash.

In some examples, each of the at least one BD includes at least one subnet. In some examples, each EPG of the at least one EPG includes at least one subnet.

The systems, methods and CRM can also be configured to determine a first set of subnets in a first BD associated with a first EPG where the contract exists, determine second set of subnets in a second BD associated with a second EPG where the contract exists and validate that the first set of subnets does not intersect with the second set of subnets. The systems, methods and CRM can also be configured to validate for each of the subnets, a next hop.

In some examples, an error event is generated in response to a clash between the one or more subnets. In some examples, an error event is generated in response to the first set of subnets intersecting with the second set of subnets.

Also disclosed are systems, methods and CRM for performing an overlapping subnet network assurance check of proper deployment of a configuration in a fabric. The systems, methods and CRM can be configured to receive, from a controller, a global logical model in a first format, the global logical model containing instructions on how endpoints connected to a network fabric communicate within the fabric and receive, from one or more network devices within the fabric, a software model being at least a subset of instructions from the global logical model in a second format executable on the one or more network devices, the subset of instructions being instructions from the global logical model that are specific to operability of the one or more network devices. The systems, methods and CRM can also be configured to determine whether one or more overlapping bridge domain (BD) subnets in the received global logical model and the received software models, and in response to the determination an overlapping BD subnet of the one or more overlapping BD subnets, determine whether any of the one or more overlapping BD subnets satisfy an exception. In some examples, a negative result of either of the determinations at least partially represents that subnets have been properly deployed. In some examples, an error event is generated in response to overlap without an applicable exception.

The systems, methods and CRM can be configured to inspect IP addresses and masks of the software models and determine an overlap when two or more of the IP addresses and masks match. In some examples, the locating is performed in each VRF of each of the network devices. In some examples, an exception is when a BD subnet is within a learned route. In some examples, a positive result of either of the determinations at least partially represents that subnets have not been properly deployed. In some examples, an exception is when overlapping BD subnets are the same.

Also disclosed are systems, methods and CRM for performing an L3out network assurance check of proper deployment of a configuration in a fabric. The systems, methods and CRM can be configured to receive, from a controller, a global logical model in a first format, the global logical model containing instructions on how endpoints connected to a network fabric communicate within the fabric and receive, from one or more network devices within the fabric, a software model being at least a subset of instructions from the global logical model in a second format executable on the one or more network devices, the subset of instructions being instructions from the global logical model that are specific to operability of the one or more network devices. The systems, methods and CRM can also be configured to create a local logical model in the first format, the local logical model being at least a portion of the received global logical model that is specific to operability of the one or more network devices, convert at least a portion of Layer 3 out (L3out) content of the created local logical model and/or at least a portion of L3out content of the received software model into a common format, and compare content of at least some L3out overlapping fields from the common format of the created local logical model and the common format of the received software model. In some examples, a positive outcome of the comparison at least partially represents that the internal subnet has been properly leaked outside of the fabric.

In some examples, at least some L3out overlapping fields subject to the comparison includes leaf, port and network to thereby at least partially validate that an L3out interface has been properly deployed. In some examples, at least some L3out overlapping fields subject to the comparison includes network devices to thereby at least partially validate that an L3out loopback has been properly deployed. In some examples, at least some L3out overlapping fields subject to the comparison includes leaf, and next hop to thereby at least partially validate that L3out static routes has been properly deployed. In some examples, at least some L3out overlapping fields subject to the comparison includes fields to thereby at least partially validate that endpoint groups has been properly deployed.

The systems, methods and CRM can be configured to validate each leaked internal subnet in the longest prefix match (LPM) table of the software model has a next hop that identifies which border leaf leaked the internal subnet, wherein a positive outcome of the validating at least partially represents that the internal subnet has been properly leaked outside of the fabric.

The systems, methods and CRM can be configured to validate that an LPM table of the border leaf has a next hop for the leaked internal subnet that identifies the network device, wherein a positive outcome of the validating at least partially represents that the internal subnet has been properly leaked outside of the fabric.

Also disclosed are systems, methods and CRM for performing a BD-L3out Association network assurance check of proper deployment of a configuration in a fabric. The systems, methods and CRM can be configured to receive, from a controller, a global logical model in a first format, the global logical model containing instructions on how endpoints connected to a network fabric communicate within the fabric, identify bridge domain (BD) subnets in the global logical model that are designated as public and validate, in response to a positive result of the identification, that the identified BDs are associated with an L3out. In some examples, a negative outcome of the identification or a positive result of the validation at least partially represents proper configuration a BD-Layer 3 out (L3out) relationship.

The systems, methods and CRM can also be configured to determine whether any of the identified BDs has a different endpoint group (EPG) from its corresponding L3out.

The systems, methods and CRM can also be configured to confirm, in response to a positive result of the determination, a presence of a contract between any of the identified BDs having a different endpoint group (EPG) from its corresponding L3out.

In some examples, a positive result of the confirmation at least partially represents proper configuration of the BD-L3out relationship. In some examples, an error event can be generated in response to a positive outcome of the identification. In some examples, an error event can be generated in response to a negative result of the validation. In some examples, an error event can be generated in response to a negative result of the confirmation.

Also disclosed are systems, methods and CRM for performing Learned routes network assurance check of proper deployment of a configuration in a fabric. The systems, methods and CRM can be configured to receive, from one or more network devices within the fabric, a software model being at least a subset of instructions from the global logical model in a second format executable on the one or more network devices, the subset of instructions being instructions from the global logical model that are specific to operability of the one or more network devices. The systems, methods and CRM can also be configured to identify from the plurality of network devices a source leaf that imported an external subnet from an external device, the source leaf having an L3out under a virtual routing and forwarding instance (VRF), identify from the plurality of network devices a subgroup of leafs, the subgroup of leafs including the source leaf and other leafs having an L3out or BD under the VRF of the source leaf, confirm that the imported external subnet is consistent in the software model of one or more leafs of the group of leafs, determine, at the source leaf, the next hop of the imported network is the network device that requested the leak, and determine, at the other leafs, the next hop of the imported network is at least the source leaf. In some examples, a positive result of the determinations and the confirming at least partially represents proper propagation of the imported route. In some examples, a negative result of the determinations represents an improper propagation of the imported route. In some examples, a negative result of the confirmation represents an improper propagation of the imported route.

The systems, methods and CRM can also be configured to confirm that the imported external subnet is consistent in the software model of all leafs of the group of leafs further comprises instructions, which when executed by the at least one processor causes the at least one processor to confirm that the imported external subnet is consistent in the longest prefix match (LPM) table of the software model in all leafs of the group of leafs.

The systems, methods and CRM can also be configured to receive, from a controller, the global logical model containing instructions on how endpoints connected to a network fabric communicate within each other through one or more network devices within the fabric, and confirm that any imported routes in the global logical model are consistent with any imported routes in the received software models of border leafs of the plurality of leafs.

The systems, methods and CRM can also be configured to confirm that any imported routes in the global logical model are consistent with any imported routes in received software models of border leafs of the plurality of leafs comprises instructions, which when executed by the at least one processor, causes the at least one processor to confirm that LPM tables of the software models of border leafs include any imported routes found in an endpoint group (EPG) of Layer 3 out (L3out) of the global logical model.

The systems, methods and CRM can also be configured to confirm that any imported routes in the global logical model is consistent with any imported route received software models of border leafs of the plurality of leafs comprises instructions, which when executed by the at least one processor, causes the at least one processor to confirm that LPM tables of the software models of border leafs includes any imported routes found in an EPG of L3out of the global logical model and does not include other imported route unless imported from a different border leaf or a different L3out.

Description

Figure 1B:
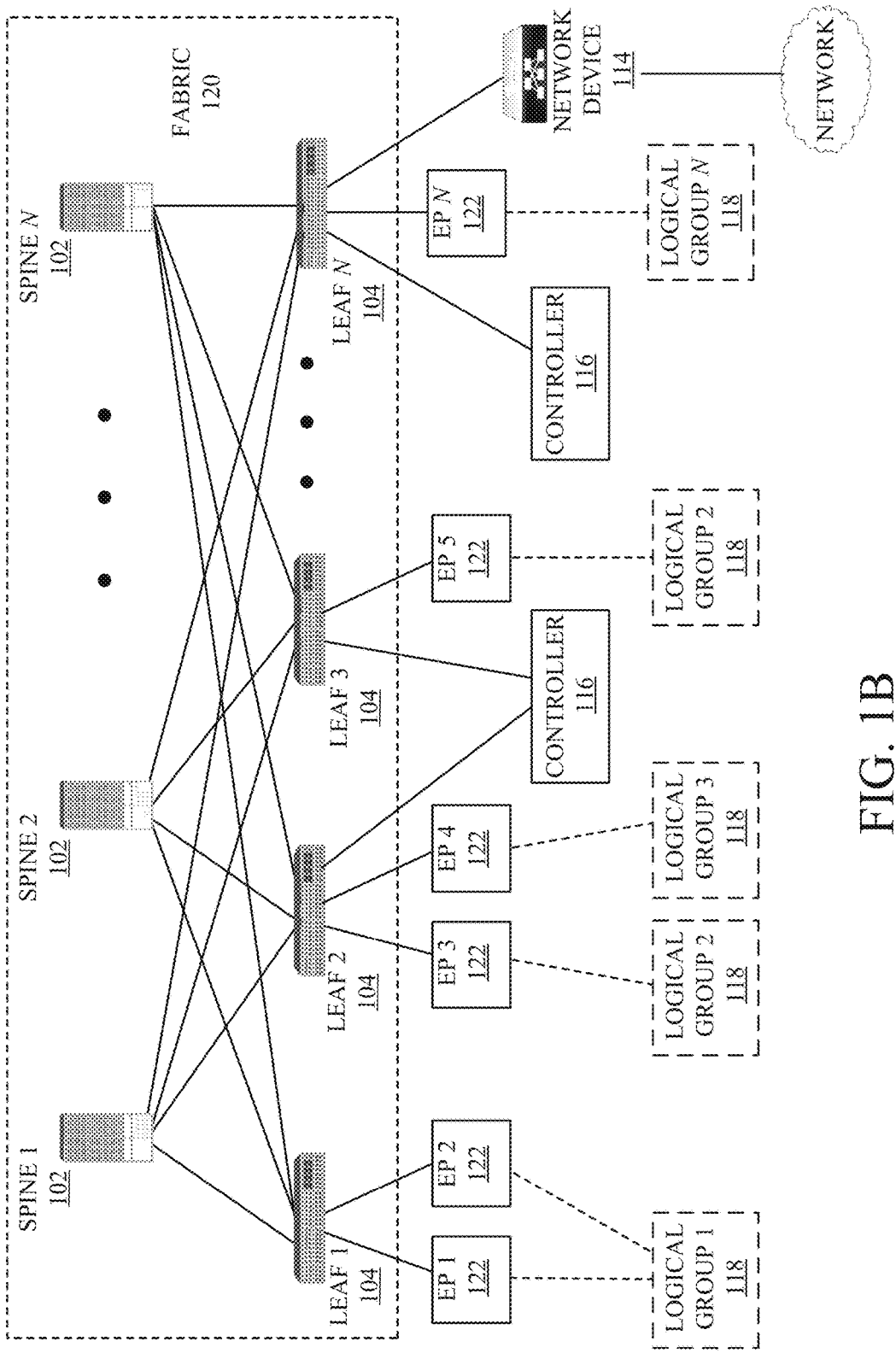
Figure 21:
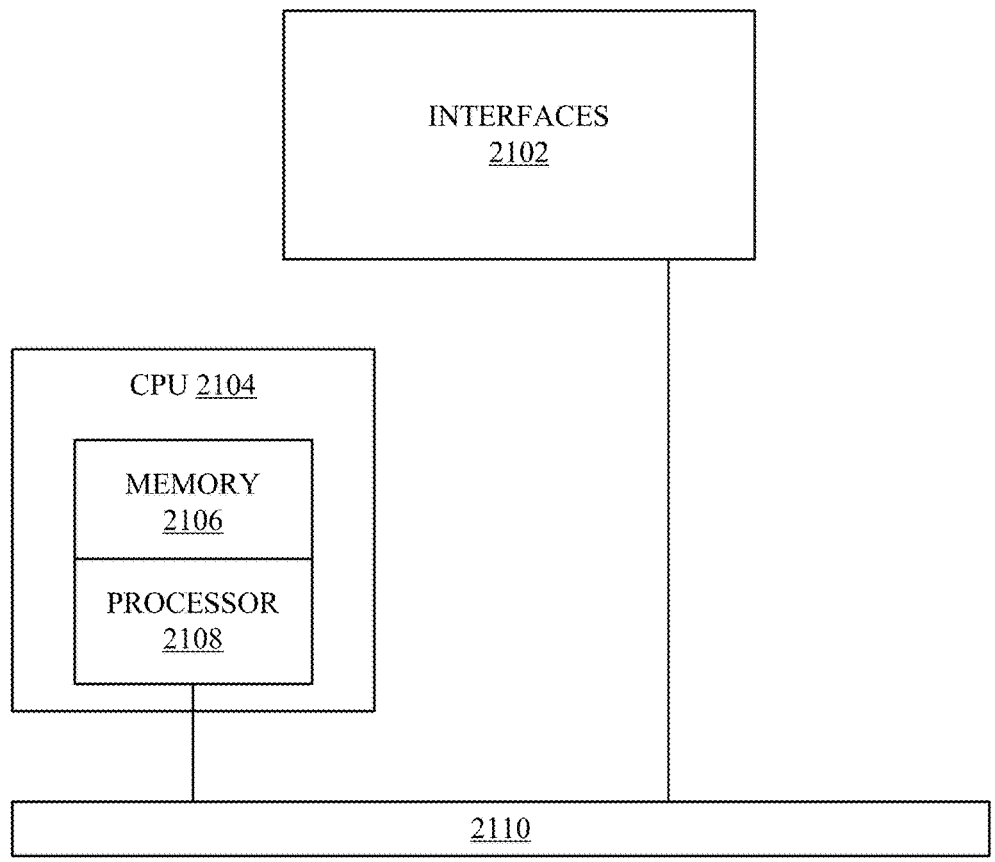
FIG. 21 illustrates an example network device in accordance with various embodiments.
Figure 22:
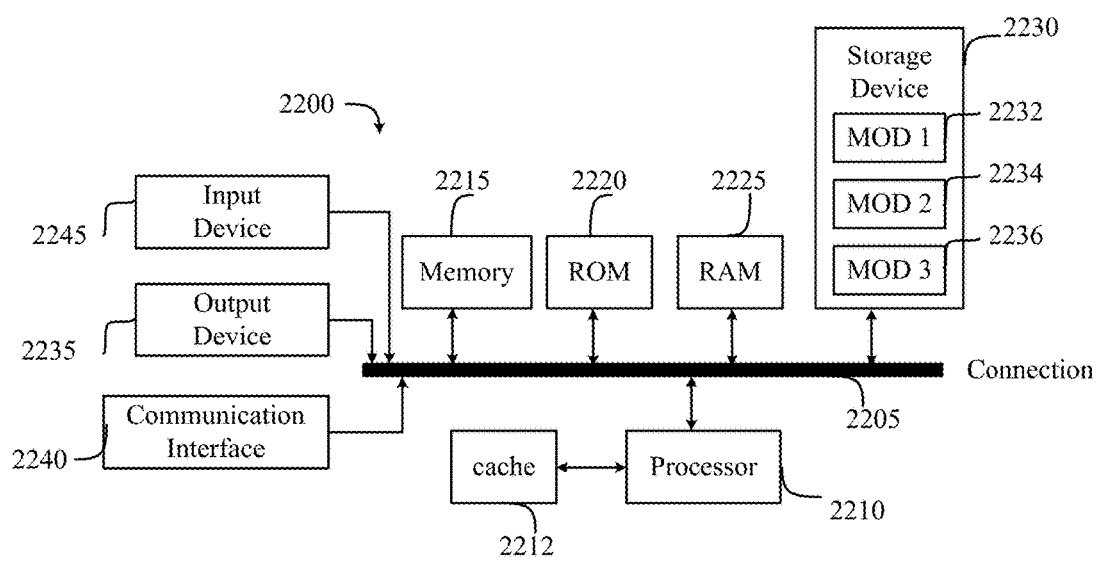
FIG. 22 illustrates an example computing device in accordance with various embodiments.

The disclosed technology addresses the need in the art for accurate and efficient discovery of problems in a large and complex network or data center. The present technology involves system, methods, and computer-readable media for network assurance in layer 1, layer 2 and layer 3 of the networked environment. The present technology also involves system, methods, and computer-readable media for network assurance for internal-internal (e.g., inter-fabric) forwarding and internal-external (e.g., outside the fabric) forwarding in the networked environment. The network assurance can be performed using logical configurations, software configurations and/or hardware configurations. The present technology will be described in the following disclosure as follows. The discussion begins with an introductory discussion of network assurance and fault code aggregation across application-centric dimensions. An introductory discussion of network assurance and a description of example computing environments, as illustrated in FIGS. 1A and 1B, will then follow. The discussion continues with a description of systems and methods for network assurance, network modeling, and fault code aggregation across logical or application-centric dimensions, as shown in FIGS. 2A-2D, 3A-D, 4 and 5A-B. The discussion continues with a description of systems and methods for routing and forwarding assurances and checks, as shown in FIG. 3-20. The discussion concludes with a description of an example network device, as illustrated in FIG. 21, and an example computing device, as illustrated in FIG. 22, including example hardware components suitable for hosting software applications and performing computing operations.

The disclosure now turns to a discussion of network assurance and distributed fault code aggregation across logical or application-centric dimensions.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, settings, configurations, etc., defined for the network and individual network elements (e.g., switches, routers, applications, resources, etc.). However, often times, the configurations, policies, etc., defined by a network operator are incorrect or not accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The approaches herein can also enable identification and visualization of hardware-level (e.g., network switch-level) errors along any software or application-centric dimension. Non-limiting example visualizations can include: 1) per-tenant error aggregation, 2) per-application profile error aggregation, 3) per-endpoint group pair aggregation, and 4) per-contract error aggregation. In this way, data center operators can quickly see hardware errors that impact particular tenants or other logical entities, across the entire network fabric, and even drill down by other dimensions, such as endpoint groups, to see only those relevant hardware errors. These visualizations speed root cause analysis, improving data center and application availability metrics. Given the scale of the network fabric, the aggregations to create these visualizations can be done in a distributed fashion.

In this context, a network assurance platform can run an assurance operator on each individual network device, such as a switch, and emit fault codes associated with the network device. A logical policy enricher can map the hardware IDs (e.g., scope, pcTag, etc.) to the logical policy entity that is defined in the software-defined network (SDN) fabric configuration, such as the application-centric infrastructure (ACI) fabric configuration. The mappings can yield enriched fault codes. The enriched fault codes can be sent to an aggregation layer for aggregation. For example, multiple nodes (e.g., HADOOP) can collect the enriched fault codes and emit them to an aggregation layer as (key, tag) pairs.

In some cases, the aggregation layer can scale horizontally by running the aggregator for each key as a separate reducer. Each key can represent a different dimension for aggregation. Non-limiting examples of dimensions include tenant, contract, application profile, endpoint group (EPG) pair, etc. This provides the operator of a large scale network fabric with an integrated view of the health of the network fabric for that particular dimension of aggregation. For example, this can provide the health of each tenant, contract, application profile, EPG pair, etc.

As previously noted, the fault code aggregation can implement logical models which can represent various aspects of a network. A model can include a mathematical or semantic model of the network, including, without limitation the network's policies, configurations, requirements, security, routing, topology, applications, hardware, filters, contracts, access control lists, EPGs, application profiles, tenants, etc. Models can be implemented to provide network assurance to ensure that the network is properly configured and the behavior of the network will be consistent (or is consistent) with the intended behavior reflected through specific policies, settings, definitions, etc., implemented by the network operator. Unlike traditional network monitoring which involves sending and analyzing data packets and observing network behavior, network assurance can be performed through modeling without necessarily ingesting any packet data or monitoring traffic or network behavior. This can result in foresight, insight, and hindsight: problems can be prevented before they occur, identified when they occur, and fixed immediately after they occur.

Properties of the network can be mathematically modeled to deterministically predict the behavior and condition of the network. A mathematical model can abstract the control, management, and data planes, and may use various techniques such as symbolic, formal verification, consistency, graph, behavioral, etc. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The models can consume numerous types of data and/or events which model a large amount of behavioral aspects of the network. Such data and events can impact various aspects of the network, such as underlay services, overlay service, tenant connectivity, tenant security, tenant EP mobility, tenant policy, resources, etc.

Having described various aspects of network assurance and fault code aggregation across dimensions, the disclosure now turns to a discussion of example network environments for network assurance and fault code aggregation.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more operators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

FIG. 2A illustrates a diagram of an example Management Information Model 200 for an SDN network, such as Network Environment 100. The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Thus, even if the name of an object, once created, cannot be changed, the Alias can be a field that can be changed.

As used herein, the term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 overlaps Contract 1. In this example, by aliasing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endpoints as previously described with reference to FIG. 1B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an operator to exercise domain-based access control. Non-limiting examples of tenants can include:

User tenants defined by the operator according to the needs of users. They contain policies that govern the operation of resources such as applications, databases, web servers, network-attached storage, virtual machines, and so on.

The common tenant is provided by the system but can be configured by the operator. It contains policies that govern the operation of resources accessible to all tenants, such as firewalls, load balancers, Layer 4 to Layer 7 services, intrusion detection appliances, and so on.

The infrastructure tenant is provided by the system but can be configured by the operator. It contains policies that govern the operation of infrastructure resources such as the fabric overlay (e.g., VXLAN). It also enables a fabric provider to selectively deploy resources to one or more user tenants. Infrastructure tenant polices can be configurable by the operator.

The management tenant is provided by the system but can be configured by the operator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an operator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
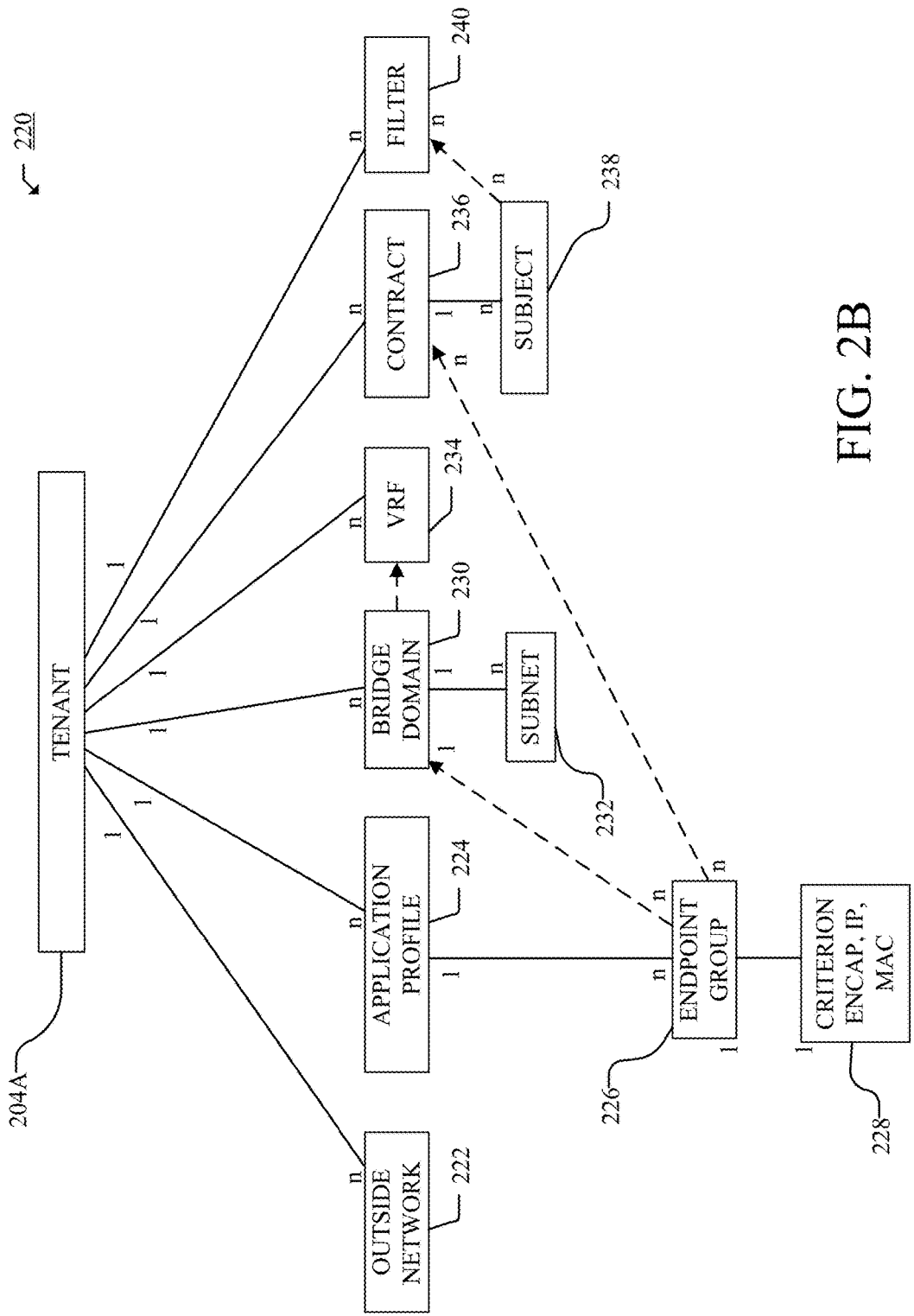
FIG. 2B illustrates an example object model for a tenant object in the example object model from FIG. 2A.

FIG. 2B illustrates an example object model 220 for a tenant portion of MIM 200. As previously noted, a tenant is a logical container for application policies that enable an operator to exercise domain-based access control. A tenant thus represents a unit of isolation from a policy perspective, but it does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant operator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an operator in Controllers 116, or dynamically configured by an automated system such as VCENTER or OPENSTACK.

To activate tenant policies in Tenant Portion 204A, fabric access policies should be configured and associated with tenant policies. Access policies enable an operator to configure other network configurations, such as port channels and virtual port channels, protocols such as LLDP, CDP, or LACP, and features such as monitoring or diagnostics.

Figure 2C:
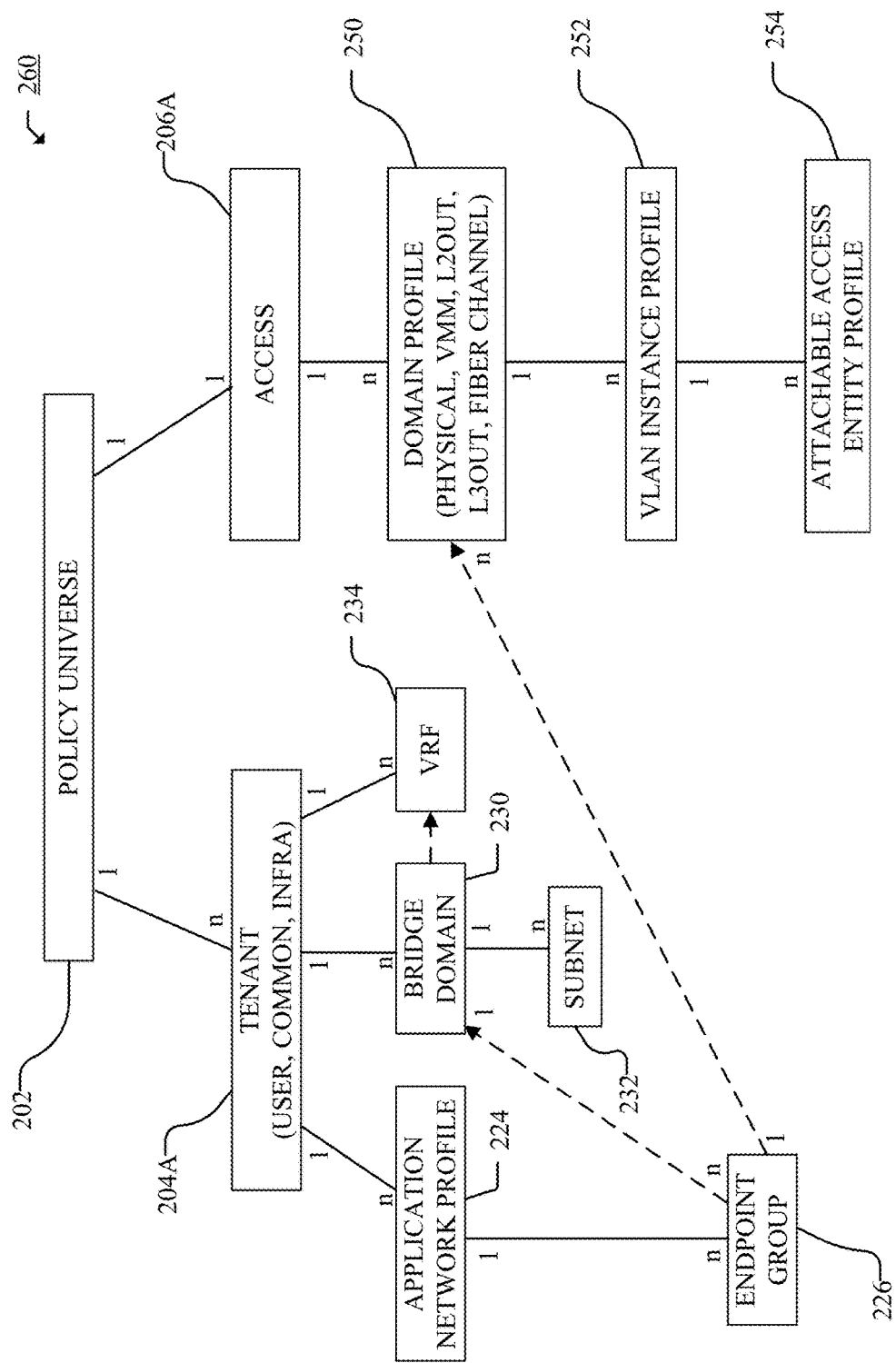
FIG. 2C illustrates an example association of various objects in the example object model from FIG. 2A.

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attachable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
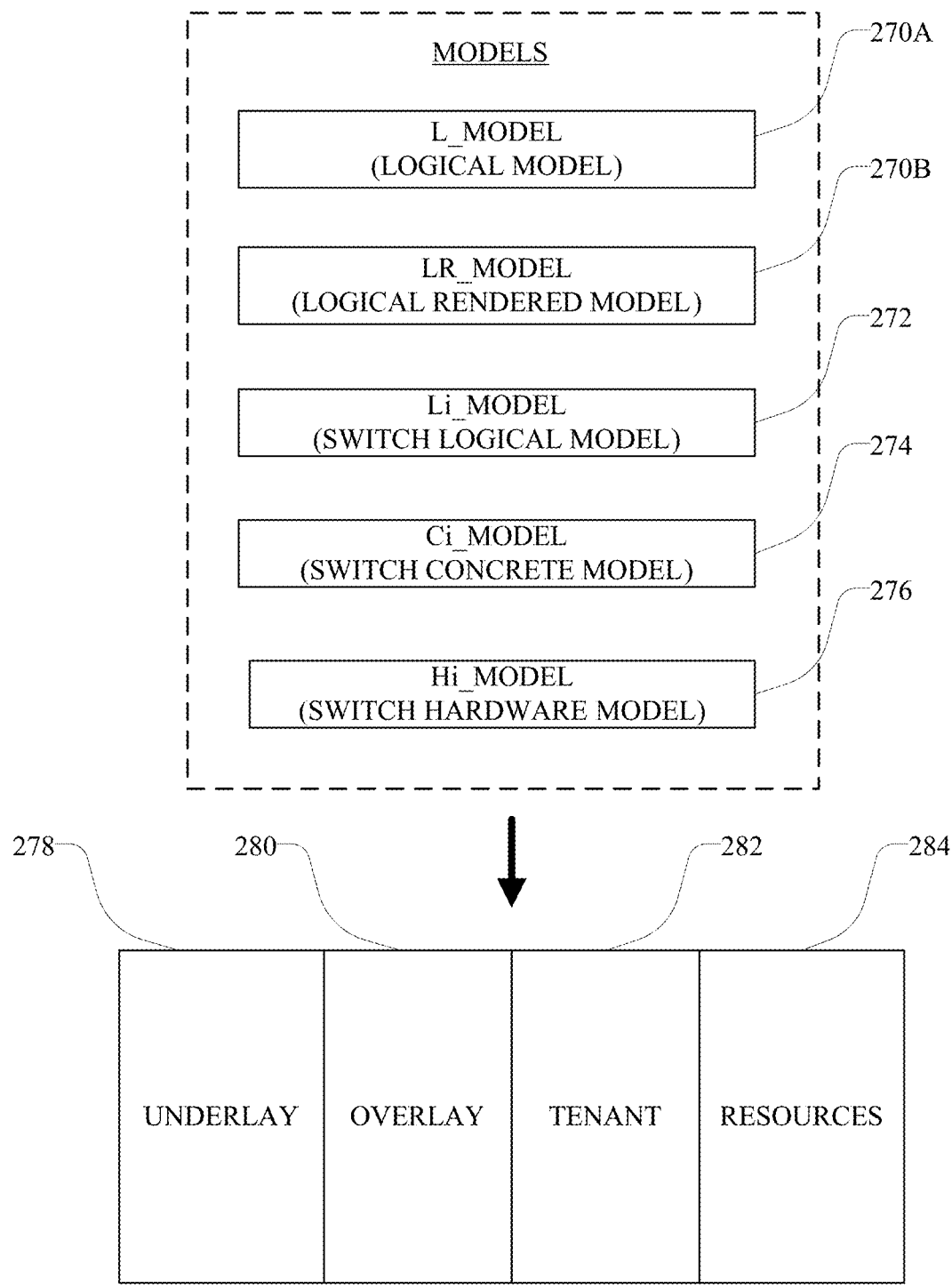
FIG. 2D illustrates a schematic diagram of example models for implementing the example object model from FIG. 2A.

FIG. 2D illustrates a schematic diagram of example models for a network, such as Network Environment 100. The models can be generated based on specific configurations and/or network state parameters associated with various objects, policies, properties, and elements defined in MIM 200. The models can be implemented for network analysis and assurance, and may provide a depiction of the network at various stages of implementation and levels of the network.

As illustrated, the models can include L_Model 270A (Logical Model), LR_Model 270B (Logical Rendered Model or Logical Runtime Model), Li_Model 272 (Logical Model for i), Ci_Model 274 (Concrete model for i), and/or Hi_Model 276 (Hardware model or TCAM Model for i).

L_Model 270A is the logical representation of various elements in MIM 200 as configured in a network (e.g., Network Environment 100), such as objects, object properties, object relationships, and other elements in MIM 200 as configured in a network. L_Model 270A can be generated by Controllers 116 based on configurations entered in Controllers 116 for the network, and thus represents the logical configuration of the network at Controllers 116. This is the declaration of the "end-state" expression that is desired when the elements of the network entities (e.g., applications, tenants, etc.) are connected and Fabric 120 is provisioned by Controllers 116. Because L_Model 270A represents the configurations entered in Controllers 116, including the objects and relationships in MIM 200, it can also reflect the "intent" of the operator: how the operator wants the network and network elements to behave.

L_Model 270A can be a fabric or network-wide logical model. For example, L_Model 270A can account configurations and objects from each of Controllers 116. As previously explained, Network Environment 100 can include multiple Controllers 116. In some cases, two or more Controllers 116 may include different configurations or logical models for the network. In such cases, L_Model 270A can obtain any of the configurations or logical models from Controllers 116 and generate a fabric or network wide logical model based on the configurations and logical models from all Controllers 116. L_Model 270A can thus incorporate configurations or logical models between Controllers 116 to provide a comprehensive logical model. L_Model 270A can also address or account for any dependencies, redundancies, conflicts, etc., that may result from the configurations or logical models at the different Controllers 116.

L_Model 270A is thus the first/highest level model. L_Model 270A is created by the Controllers 116 based on input from the operator. The content within L_Model 270A is thus the specific instructions on how various Leafs 104 and the Spines 102 within the Fabric 120 are to communicate with Endpoints 122. In some examples, any particular L_Model 270A can be "global" in that it can be generated at a central point to include instructions for all of the Leafs 104 and the Spines 102, or only some of them (in theory it could be as small as one Leaf 104 or Spine 120, although this would be unusual). The format is based on whatever the GUI interface and/or the Rest API allows the user to input the content. Multiple L_Model 270A configurations may be present.

The format of L_Model 270A is in the program format of the user to generate the instructions, and not useable as is by Controller 116. Controller 116 converts L_Model 270A as a first level into LR_Model 270B as a second level, for which LR_Model 270B is a logical representation that contains the content of L-Model 270A in a format that is readable on Controller 116 and transmittable to Leafs 104 and Spines 102. As this is a format change, the information content of L_Model 270A and LR_Model 270B can be the same, although the application is not so limited and the content can be omitted or added to create LR_Model 270B.

LR_Model 270B is thus the abstract model expression that Controllers 116 (e.g., APICs in ACI) resolve from L_Model 270A. LR_Model 270B can provide the configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122. LR_Model 270B can also incorporate state information to capture a runtime state of the network (e.g., Fabric 120).

In some cases, LR_Model 270B can provide a representation of L_Model 270A that is normalized according to a specific format or expression that can be propagated to, and/or understood by, the physical infrastructure of Fabric 120 (e.g., Leafs 104, Spines 102, etc.). For example, LR_Model 270B can associate the elements in L_Model 270A with specific identifiers or tags that can be interpreted and/or compiled by the switches in Fabric 120, such as hardware plane identifiers used as classifiers.

Controller 116 transmits L_Model 270A and/or LR_Model 270B (referred to herein individually and collectively as "L_Model 270A/B") to relevant Leafs 104 and Spines 102 in the Fabric 120. Relevance may be defined by Controller 116 to be all of the Leafs 104 and Spines 102, or some subset thereof. By way of non-limiting example, Fabric 120 of FIG. 1B includes Leaf 1, Leaf 2 and Leaf N. An L_Model 270A/B at Controller 116 may only include content for Leaf 1 and Leaf N, but not Leaf 2. Controller 116 could thus transmit the L_Model 270A/B to all of Leafs 1, 2 and N, or only to relevant Leafs 1 and N.

Controller 116 and/or or each particular Leaf 104 and Spine 102 that receives L_Model 270A/B then extracts/isolates content from the received model to form a local subset of content that is specific to that particular Leaf or Spine. This extracted/isolated content defines the third level Li_Model 272, which is a switch-level or switch-specific logical model; Li_Model 272 is thus "local" in that is specific to that switch (although it may include content on the switch's relationship with other switches). Li_Model 272 is thus a switch-level or switch-specific model obtained from L_Model 270A and/or LR_Model 270B. Li_Model 272 can project L_Model 270A and/or LR_Model 270B on a specific switch or device i, and thus can convey how L_Model 270A and/or LR_Model 270B should appear or be implemented at the specific switch or device i.

For example, Li_Model 272 can project L_Model 270A and/or LR_Model 270B pertaining to a specific switch i to capture a switch-level representation of L_Model 270A and/or LR_Model 270B at switch i. To illustrate, Li_Model 272 L1 can represent L_Model 270A and/or LR_Model 270B projected to, or implemented at, Leaf 1 (104). Thus, Li_Model 272 can be generated from L_Model 270A and/or LR_Model 270B for individual devices (e.g., Leafs 104, Spines 102, etc.) on Fabric 120. By way of non-limiting example, if the L_Model 270A/B includes instructions for Leaf 1 and Leaf N, then Leaf 1 will extract/isolate the content relevant to the operation of Leaf 1 to define local L1 Model 272, and Leaf N will extract/isolate the content relevant to the operation of Leaf N to define local LN_Model 272. Since the L_Model 270A/B did not include instructions for Leaf 2, then even if Leaf 2 received the L_Model 270A/B it would not create its own local L2 Model, although the application is not so limited. To the extent that the local Li_Model 272 is a subset of L_Model 270A/B, then this represents a change of content. To the extent that local Li_Model 272 is an extraction/isolation of the content from LR_Model 270B, there is generally no change in format, although the application is not so limited.

In some cases, Li_Model 272 can be represented using JSON (JavaScript Object Notation). For example, Li_Model 272 can include JSON objects, such as Rules, Filters, Entries, and Scopes.

Each Li_Model 272 may not be in a format executable by the particular Leaf 104 or Spine 102 on which it was created (e.g., it may not be executable on the local operating system of that Leaf or Spine). Each Leaf 104 and Spine 102 can thus locally create the fourth level by converting the format of the Li_Model 272 into a format that the operating system of that particular Leaf 104 or Spine 102 can execute. This results in Ci_Model 274, referred to herein as a software model or a concrete model. Thus, by way of non-limiting example, where Leaf N created a local LN_Model 272 from L_Model 270A/B, Leaf N will in turn create a local CN_Model 274 from LN_Model 272.

Ci_Model 274 is thus the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

The creation of local Li_Model 274 from Ci_Model 274 represents at least a change in format. The content of the Li_Model 272 may be the same Ci_Model 274 such that there is no content change, although the application is not so limited and the content may only overlap. By way of example, not all of the content from Li_Model 272 may be included in the corresponding Ci_Model 274. Similarly, the particular Leaf 104 or Spine 102 can add content to Ci_Model 274 that was not present in Li_Model 272.

In some cases, Li_Model 272 and Ci_Model 274 can have a same or similar format. For example, Li_Model 272 and Ci_Model 274 can be based on JSON objects. Having the same or similar format can facilitate objects in Li_Model 272 and Ci_Model 274 to be compared for equivalence or congruence. Such equivalence or congruence checks can be used for network analysis and assurance, as further described herein.

Each Leaf 104 and Spine 102 that creates a Ci_Model 274 as a fourth level will in turn create a fifth level as a local hardware model Hi_Model 276. Hi_Model 276 represents the actual hardware configurations from Ci_Model 274 that are extracted and stored in the local memory. The conversion of Ci_Model 274 into Hi_Model 276 represents both a format and content change. Similarly, the particular Leaf 104 or Spine 102 can add content to Hi_Model 276 that was not present in Ci_Model 274.

Hi_Model 276 is thus also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci_Model 274 in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci_Model 274, and/or Hi_Model 276 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

Figure 3A:
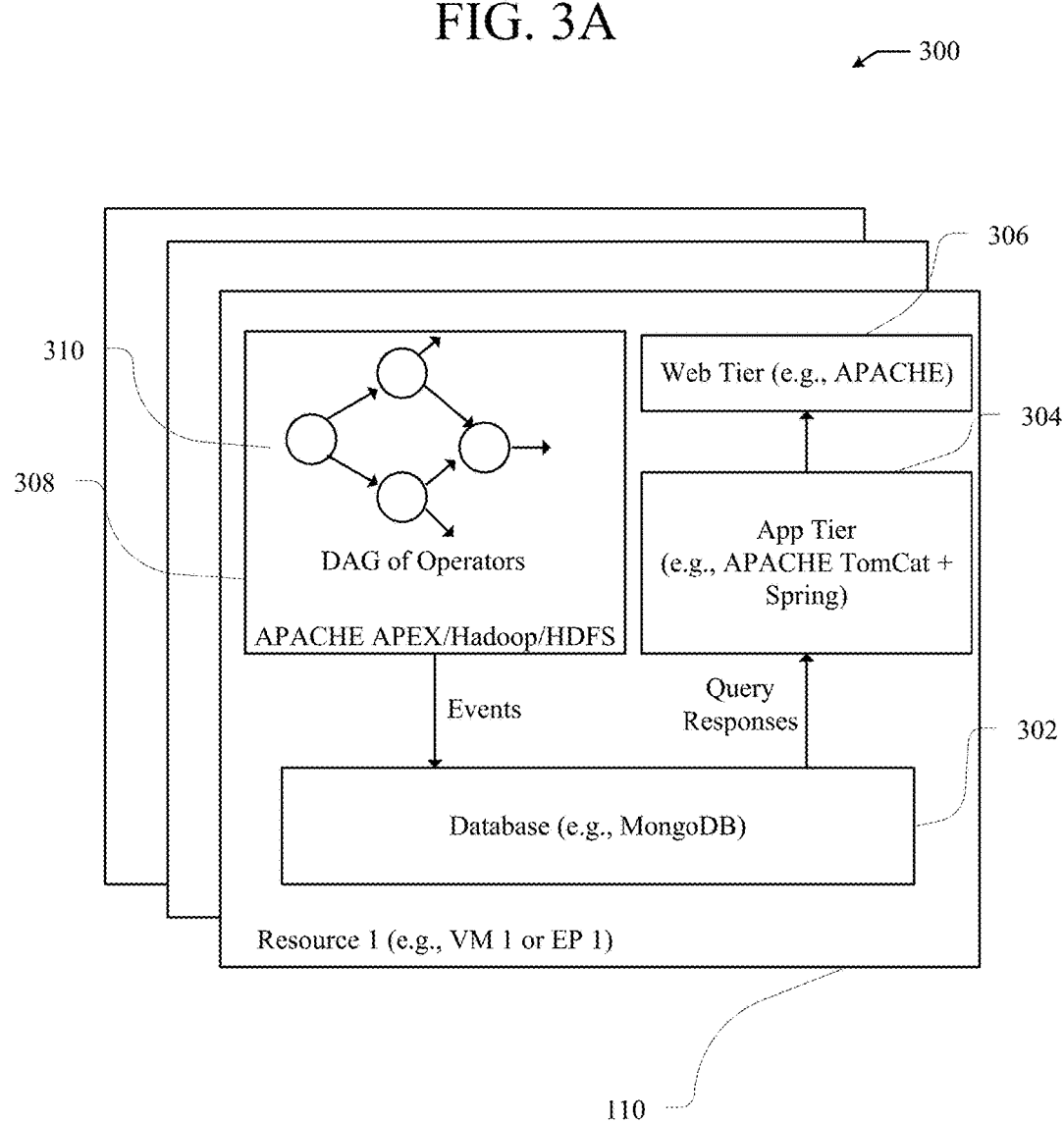
FIG. 3A illustrates an example network assurance appliance.

FIG. 3A illustrates a diagram of an example Assurance Appliance 300 for network assurance. In this example, Assurance Appliance 300 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 3A illustrates a cluster mode configuration, other configurations are also contemplated herein, such as a single mode configuration (e.g., single VM, container, or server) or a service chain for example.

Assurance Appliance 300 can run on one or more Servers 106, VMs 110, Hypervisors 108, EPs 122, Leafs 104, Controllers 116, or any other system or resource. For example, Assurance Appliance 300 can be a logical service or application running on one or more VMs 110 in Network Environment 100.

The Assurance Appliance 300 can include Data Framework 308, which can be based on, for example, APACHE APEX and HADOOP. In some cases, assurance checks can be written as individual operators that reside in Data Framework 308. This enables a natively horizontal scale-out architecture that can scale to arbitrary number of switches in Fabric 120 (e.g., ACI fabric).

Assurance Appliance 300 can poll Fabric 120 at a configurable periodicity (e.g., an epoch). The analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE Tomcat and Spring framework) 304 and Web Server 306. A graphical user interface (GUI) interacts via the APIs exposed to the customer. These APIs can also be used by the customer to collect data from Assurance Appliance 300 for further integration into other tools.

Operators 310 in Data Framework 308 (e.g., APEX/Hadoop) can together support assurance operations. Below are non-limiting examples of assurance operations that can be performed by Assurance Appliance 300 via Operators 310.

Security Policy Adherence

Assurance Appliance 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 300 can check for issues in the specification of the user's intent or intents (e.g., identify contradictory or conflicting policies in L_Model 270A).

TCAM Utilization

TCAM is a scarce resource in the fabric (e.g., Fabric 120). However, Assurance Appliance 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance 300 can validate that BDs, VRFs, subnets (both internal and external), VLANs, contracts, filters, applications, EPGs, etc., are correctly programmed.

Infrastructure Routing

Assurance Appliance 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis

Assurance Appliance 300 can validate rules in the specification of the network (e.g., L_Model 270A) are complete and do not have inconsistencies or other problems. MOs in the MIM 200 can be checked by Assurance Appliance 300 through syntactic and semantic checks performed on L_Model 270A and/or the associated configurations of the MOs in MIM 200. Assurance Appliance 300 can also verify that unnecessary, stale, unused or redundant configurations, such as contracts, are removed.

Figure 3B:
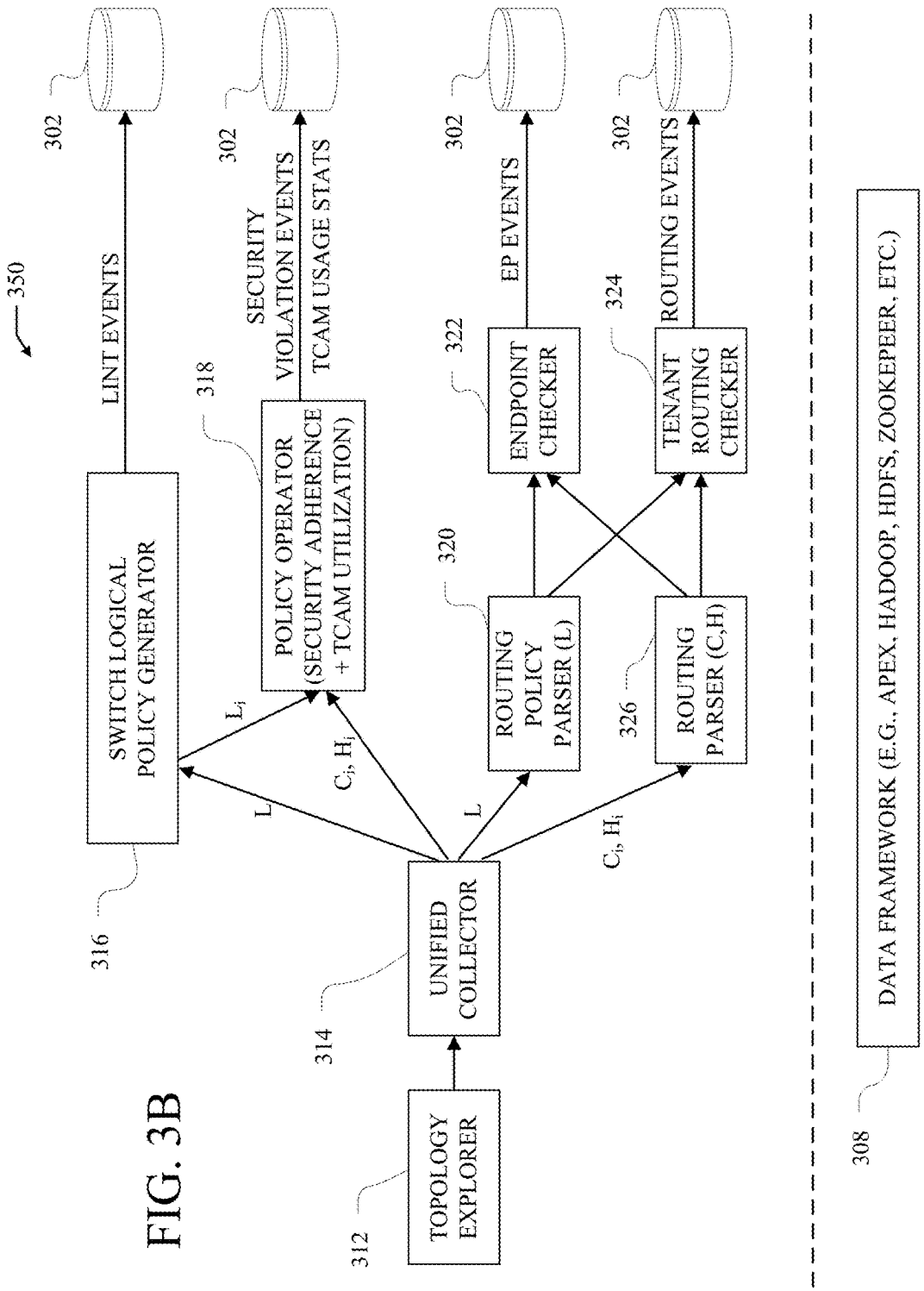
FIG. 3B illustrates an example system for network assurance.

FIG. 3B illustrates an architectural diagram of an example system 350 for network assurance, such as Assurance Appliance 300. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

In some examples, Topology Explorer 312 can receive as input a list of Controllers 116 (e.g., APIC controllers) that are associated with the network/fabric (e.g., Fabric 120). Topology Explorer 312 can also receive corresponding credentials to login to each controller. Topology Explorer 312 can retrieve information from each controller using, for example, REST calls. Topology Explorer 312 can obtain from each controller a list of nodes (e.g., Leafs 104 and Spines 102), and their associated properties, that the controller is aware of. Topology Explorer 312 can obtain node information from Controllers 116 including, without limitation, an IP address, a node identifier, a node name, a node domain, a node URI, a node_dm, a node role, a node version, etc.

Topology Explorer 312 can also determine if Controllers 116 are in quorum, or are sufficiently communicatively coupled amongst themselves. For example, if there are n controllers, a quorum condition might be met when (n/2+1) controllers are aware of each other and/or are communicatively coupled. Topology Explorer 312 can make the determination of a quorum (or identify any failed nodes or controllers) by parsing the data returned from the controllers, and identifying communicative couplings between their constituent nodes. Topology Explorer 312 can identify the type of each node in the network, e.g. spine, leaf, APIC, etc., and include this information in the topology information generated (e.g., topology map or model).

If no quorum is present, Topology Explorer 312 can trigger an event and alert a user that reconfiguration or suitable attention is required. If a quorum is present, Topology Explorer 312 can compile the network topology information into a JSON object and pass it downstream to other operators or services, such as Unified Collector 314.

Unified Collector 314 can receive the topological view or model from Topology Explorer 312 and use the topology information to collect information for network assurance from Fabric 120. Unified Collector 314 can poll nodes (e.g., Controllers 116, Leafs 104, Spines 102, etc.) in Fabric 120 to collect information from the nodes.

Unified Collector 314 can include one or more collectors (e.g., collector devices, operators, applications, VMs, etc.) configured to collect information from Topology Explorer 312 and/or nodes in Fabric 120. For example, Unified Collector 314 can include a cluster of collectors, and each of the collectors can be assigned to a subset of nodes within the topological model and/or Fabric 120 in order to collect information from their assigned subset of nodes. For performance, Unified Collector 314 can run in a parallel, multi-threaded fashion.

Unified Collector 314 can perform load balancing across individual collectors in order to streamline the efficiency of the overall collection process. Load balancing can be optimized by managing the distribution of subsets of nodes to collectors, for example by randomly hashing nodes to collectors.

In some cases, Assurance Appliance 300 can run multiple instances of Unified Collector 314. This can also allow Assurance Appliance 300 to distribute the task of collecting data for each node in the topology (e.g., Fabric 120 including Spines 102, Leafs 104, Controllers 116, etc.) via sharding and/or load balancing, and map collection tasks and/or nodes to a particular instance of Unified Collector 314 with data collection across nodes being performed in parallel by various instances of Unified Collector 314. Within a given node, commands and data collection can be executed serially. Assurance Appliance 300 can control the number of threads used by each instance of Unified Collector 314 to poll data from Fabric 120.

Unified Collector 314 can collect models (e.g., L_Model 270A and/or LR_Model 270B) from Controllers 116, switch software configurations and models (e.g., Ci_Model 274) from nodes (e.g., Leafs 104 and/or Spines 102) in Fabric 120, hardware configurations and models (e.g., Hi_Model 276) from nodes (e.g., Leafs 104 and/or Spines 102) in Fabric 120, etc. Unified Collector 314 can collect Ci_Model 274 and Hi_Model 276 from individual nodes or fabric members, such as Leafs 104 and Spines 102, and L_Model 270A and/or LR_Model 270B from one or more controllers (e.g., Controllers 116) in Network Environment 100.

Unified Collector 314 can poll the devices that Topology Explorer 312 discovers in order to collect data from Fabric 120 (e.g., from the constituent members of the fabric). Unified Collector 314 can collect the data using interfaces exposed by Controllers 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including, without limitation: topology information, tenant forwarding/routing information, tenant security policies, contracts, interface policies, physical domain or VMM domain information, OOB (out-of-band) management IP's of nodes in the fabric, etc.

Unified Collector 314 can also poll information from nodes (e.g., Leafs 104 and Spines 102) in Fabric 120, including without limitation: Ci_Models 274 for VLANs, BDs, and security policies; Link Layer Discovery Protocol (LLDP) connectivity information of nodes (e.g., Leafs 104 and/or Spines 102); endpoint information from EPM/COOP; fabric card information from Spines 102; routing information base (RIB) tables from nodes in Fabric 120; forwarding information base (FIB) tables from nodes in Fabric 120; security group hardware tables (e.g., TCAM tables) from nodes in Fabric 120; etc.

In some cases, Unified Collector 314 can obtain runtime state from the network and incorporate runtime state information into L_Model 270A and/or LR_Model 270B. Unified Collector 314 can also obtain multiple logical models from Controllers 116 and generate a comprehensive or network-wide logical model (e.g., L_Model 270A and/or LR_Model 270B) based on the logical models. Unified Collector 314 can compare logical models from Controllers 116, resolve dependencies, remove redundancies, etc., and generate a single L_Model 270A and/or LR_Model 270B for the entire network or fabric.

Unified Collector 314 can collect the entire network state across Controllers 116 and fabric nodes or members (e.g., Leafs 104 and/or Spines 102). For example, Unified Collector 314 can use a REST interface and an SSH interface to collect the network state. This information collected by Unified Collector 314 can include data relating to the link layer, VLANs, BDs, VRFs, security policies, etc. The state information can be represented in LR_Model 270B, as previously mentioned. Unified Collector 314 can then publish the collected information and models to any downstream operators that are interested in or require such information. Unified Collector 314 can publish information as it is received, such that data is streamed to the downstream operators.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance 300 can contact Controllers 116, Spines 102, Leafs 104, and other nodes to collect various types of data. In some scenarios, Assurance Appliance 300 may experience a failure (e.g., connectivity problem, hardware or software error, etc.) that prevents it from being able to collect data for a period of time. Assurance Appliance 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A and/or LR_Model 270B for each switch.

Each Li_Model 272 can represent L_Model 270A and/or LR_Model 270B as projected or applied at the respective network device i (e.g., switch i) in Fabric 120. In some cases, Li_Model 272 can be normalized or formatted in a manner that is compatible with the respective network device. For example, Li_Model 272 can be formatted in a manner that can be read or executed by the respective network device. To illustrate, Li_Model 272 can included specific identifiers (e.g., hardware plane identifiers used by Controllers 116 as classifiers, etc.) or tags (e.g., policy group tags) that can be interpreted by the respective network device. In some cases, Li_Model 272 can include JSON objects. For example, Li_Model 272 can include JSON objects to represent rules, filters, entries, scopes, etc.

The format used for Li_Model 272 can be the same as, or consistent with, the format of Ci_Model 274. For example, both Li_Model 272 and Ci_Model 274 may be based on JSON objects. Similar or matching formats can enable Li_Model 272 and Ci_Model 274 to be compared for equivalence or congruence. Such equivalency checks can aid in network analysis and assurance as further explained herein.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 3C:
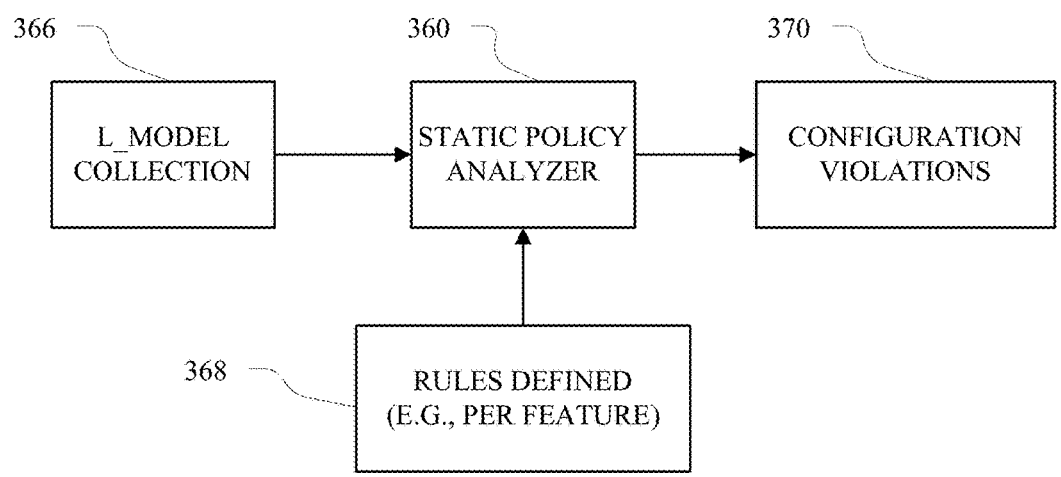
FIG. 3C illustrates a schematic diagram of an example system for network assurance.

FIG. 3C illustrates a schematic diagram of an example system for static policy analysis in a network (e.g., Network Environment 100). Static Policy Analyzer 360 can perform assurance checks to detect configuration violations, logical lint events, contradictory or conflicting policies, unused contracts, incomplete configurations, etc. Static Policy Analyzer 360 can check the specification of the user's intent or intents in L_Model 270A to determine if any configurations in Controllers 116 are inconsistent with the specification of the user's intent or intents.

Static Policy Analyzer 360 can include one or more of the Operators 310 executed or hosted in Assurance Appliance 300. However, in other configurations, Static Policy Analyzer 360 can run one or more operators or engines that are separate from Operators 310 and/or Assurance Appliance 300. For example, Static Policy Analyzer 360 can be a VM, a cluster of VMs, or a collection of endpoints in a service function chain.

Static Policy Analyzer 360 can receive as input L_Model 270A from Logical Model Collection Process 366 and Rules 368 defined for each feature (e.g., object) in L_Model 270A. Rules 368 can be based on objects, relationships, definitions, configurations, and any other features in MIM 200. Rules 368 can specify conditions, relationships, parameters, and/or any other information for identifying configuration violations or issues.

Moreover, Rules 368 can include information for identifying syntactic violations or issues. For example, Rules 368 can include one or more rules for performing syntactic checks. Syntactic checks can verify that the configuration of L_Model 270A is complete, and can help identify configurations or rules that are not being used. Syntactic checks can also verify that the configurations in the hierarchical MIM 200 are complete (have been defined) and identify any configurations that are defined but not used. To illustrate, Rules 368 can specify that every tenant in L_Model 270A should have a context configured; every contract in L_Model 270A should specify a provider EPG and a consumer EPG; every contract in L_Model 270A should specify a subject, filter, and/or port; etc.

Rules 368 can also include rules for performing semantic checks and identifying semantic violations or issues. Semantic checks can check conflicting rules or configurations. For example, Rule1 and Rule2 can have aliasing issues, Rule1 can be more specific than Rule2 and thereby create conflicts/ issues, etc. Rules 368 can define conditions which may result in aliased rules, conflicting rules, etc. To illustrate, Rules 368 can specify that an allow policy for a specific communication between two objects can conflict with a deny policy for the same communication between two objects if the allow policy has a higher priority than the deny policy, or a rule for an object renders another rule unnecessary.

Static Policy Analyzer 360 can apply Rules 368 to L_Model 270A to check configurations in L_Model 270A and output Configuration Violation Events 370 (e.g., alerts, logs, notifications, etc.) based on any issues detected. Configuration Violation Events 370 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Static Policy Analyzer 360 can iteratively traverse each node in a tree generated based on L_Model 270A and/or MIM 200, and apply Rules 368 at each node in the tree to determine if any nodes yield a violation (e.g., incomplete configuration, improper configuration, unused configuration, etc.). Static Policy Analyzer 360 can output Configuration Violation Events 370 when it detects any violations.

Figure 4:
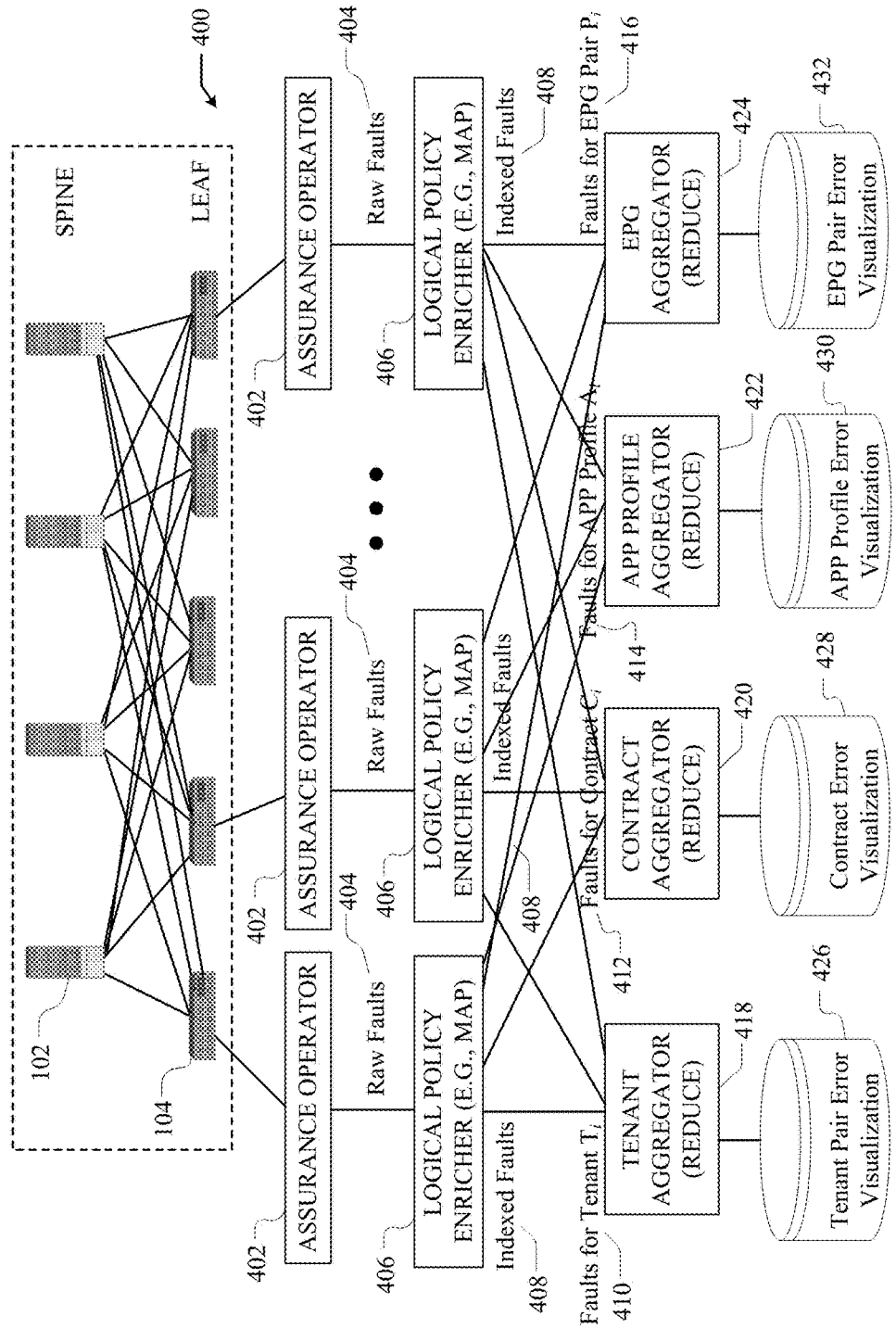
FIG. 4 illustrates an example platform for distributed fault code aggregation.

FIG. 4 illustrates an example configuration 400 for a network assurance platform 434. The network assurance platform 434 can run the assurance operator 402 on each Leaf 104 to generate and emit fault codes from the Leafs 104. In some cases, the assurance operator 402 can be, for example, one or more operators from the operators 310 illustrated in FIG. 3A. The fault codes can represent errors, such as hardware errors. The assurance operators 402 can send the raw faults 404 to the logical policy enrichers 406.

The logical policy enrichers 406 can map the hardware identifiers (e.g., scope, pcTag, etc.) to the logical policy entity defined in the fabric configuration (e.g., ACI fabric configuration). For example, the logical policy enrichers 406 can map the hardware identifiers to particular tenants, EPGs, application profiles (APs), contracts, etc. The logical policy enrichers 406 can generate indexed faults 408 based on the mappings, and send the indexed faults 408 to tenant aggregators 418, 420, 422, 424. In some cases, the indexed faults 408 can be transmitted to the aggregators as pairs such as key and tag pairs. Each key can represent a specific dimension, such as a tenant, a contract, an application profile, and EPG pair, etc.

The aggregators 418, 420, 422, 424 can represent an aggregation layer. In some cases, the aggregators 418, 420, 422, 424 can be specifically set to aggregate along a predetermined dimension, such as tenant (e.g., aggregator 418), contract (e.g., aggregator 420), application profile (e.g., aggregator 422), EPG pair (e.g., aggregator 424), etc. The aggregators 418, 420, 422, 424 can generate faults along a specific dimension, such as faults by tenant 410, faults by contract 412, faults by application profile 414, faults by EPG pair 416, etc.

The network assurance platform 434 can then generate and/or store visualization data for specific dimensions. For example, the network assurance platform 434 can maintain tenant error visualization 426, contract error visualization 428, application profile error visualization 430, EPG pair error visualization 432, and so forth. The visualizations can provide hardware-level visibility of errors along specific dimensions in an SDN, such as an ACI network. Moreover, the tenant error visualization 426, contract error visualization 428, application profile error visualization 430, EPG pair error visualization 432 can be stored in one or more respective storage locations, such as databases or storage servers.

Figure 5A:
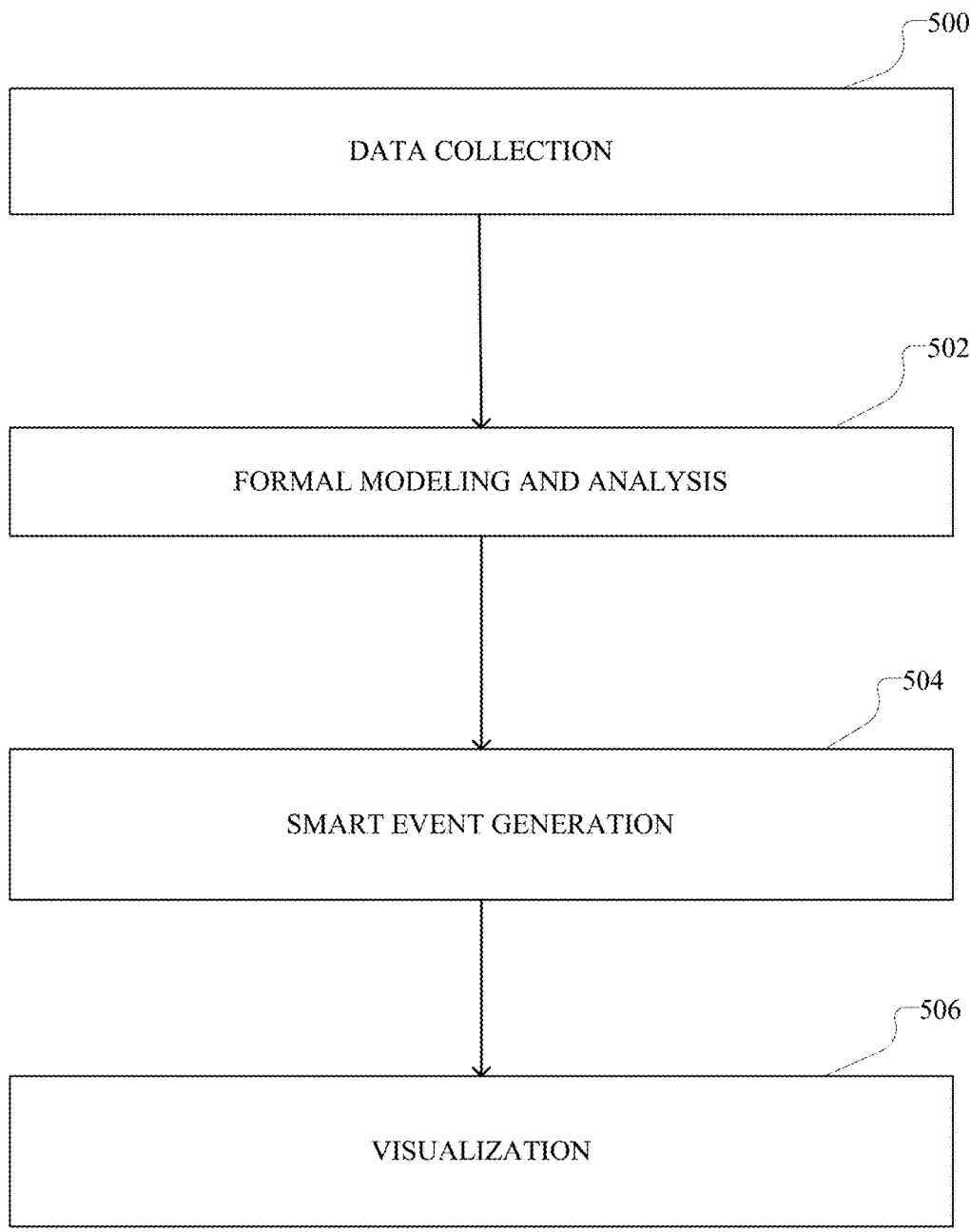
FIGS. 5A and 5B illustrate example method embodiments for network assurance and fault code aggregation.

FIG. 5A illustrates an example flowchart for a network assurance model. At step 500, the method involves data collection. Data collection can include collection of data for operator intent, such as fabric data (e.g., topology, switch, interface policies, application policies, endpoint groups, etc.), network policies (e.g., BDs, VRFs, L2Outs, L3Outs, protocol configurations, etc.), security policies (e.g., contracts, filters, etc.), service chaining policies, and so forth. Data collection can also include data for the concrete, hardware model, such as network configuration (e.g., RIB/FIB, VLAN, MAC, ISIS, DB, BGP, OSPF, ARP, VPC, LLDP, MTU, QoS, etc.), security policies (e.g., TCAM, ECMP tables, etc.), endpoint dynamics (e.g., EPM, COOP EP DB, etc.), statistics (e.g., TCAM rule hits, interface counters, bandwidth, etc.).

At step 502, the method can involve formal modeling and analysis. Formal modeling and analysis can involve determining equivalency between logical and hardware models, such as security policies between models, etc.

At step 504, the method can involve smart event generation. Smart events can be generated using deep object hierarchy for detailed analysis, such as: Tenant, Leaf, VRFs, Rules; Filters, Routes, Prefixes, Port Numbers.

At step 506, the method can involve visualization. Formal models can be used to identify problems for analysis and debugging, in a user-friendly GUI.

Figure 5B:
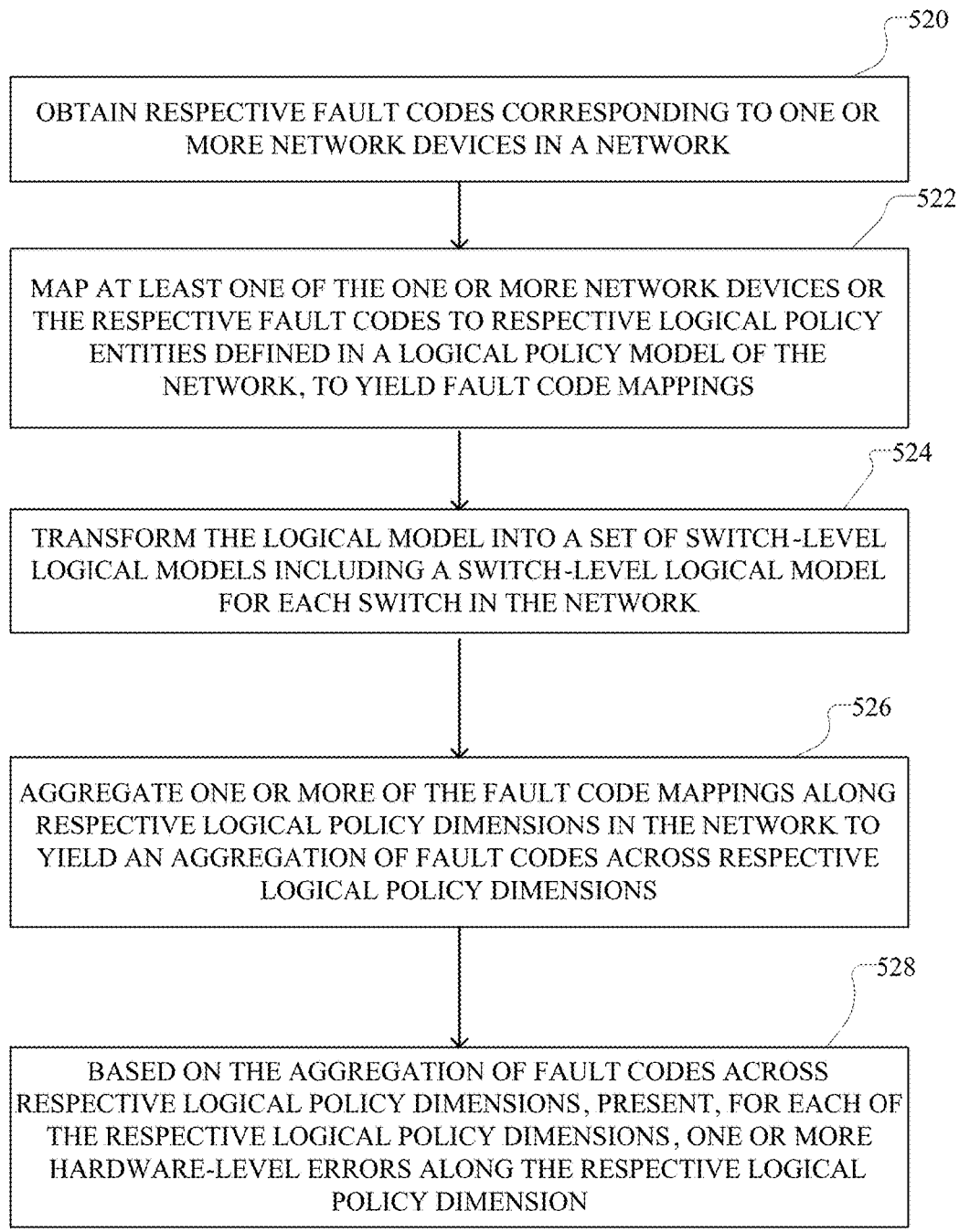
Figure 6:
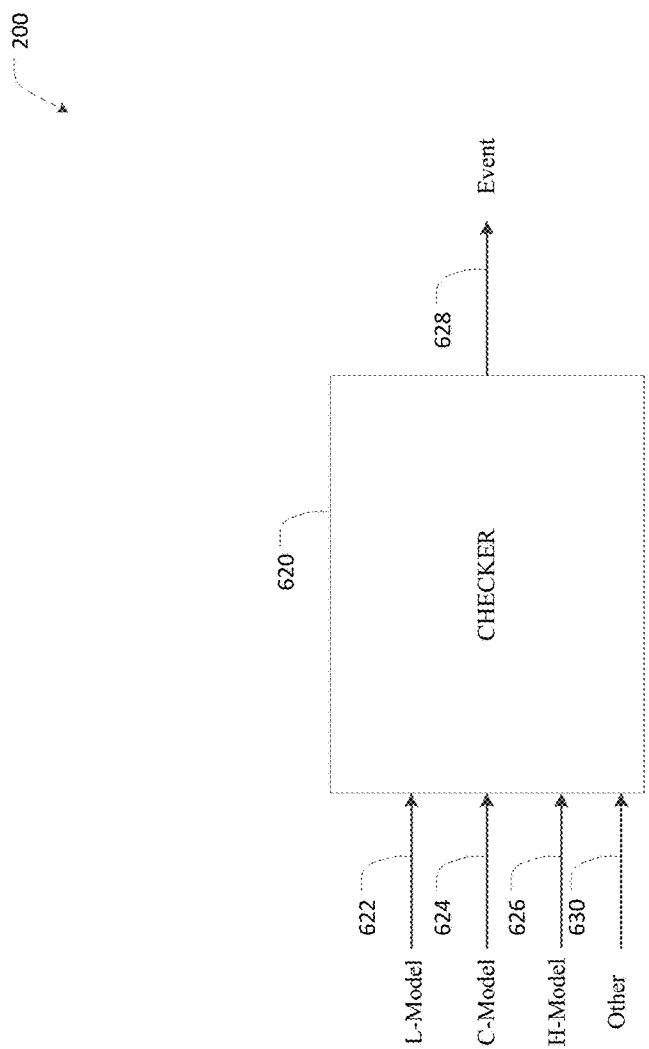
FIG. 6 illustrates an example checker of the network assurance appliance.

FIG. 5B illustrates an example method for fault code aggregation. At step 520, the assurance operators 402 obtain respective fault codes corresponding to one or more network devices in a network (e.g., Leafs 104). At step 522, the logical policy enrichers 406 map the one or more network devices and/or the respective fault codes to respective logical policy entities defined in a logical policy model of the network, to yield fault code mappings. The logical policy model can be a model of the fabric and/or network generated based on the SDN or ACI configurations.

At step 524, the aggregators 418, 420, 422, 424 aggregate one or more of the fault code mappings along respective logical policy dimensions in the network to yield an aggregation of fault codes across respective logical policy dimensions. At step 526, the network assurance platform 434 presents, for each of the respective logical policy dimensions, one or more hardware-level errors along the respective logical policy dimension. In some cases, the network assurance platform 434 can generate visualization data or interface data for presenting the one or more hardware-level errors along the respective logical policy dimension. Such data can be based on the aggregation of fault codes across the respective logical policy dimensions.

The disclosed technology addresses the need in the art for assuring tenant forwarding in a network environment. The present technology involves system, methods, and computer-readable media for network assurance in layer 1, layer 2 and layer 3 of the networked environment. The present technology also involves system, methods, and computer-readable media for network assurance for internal-internal (e.g., inter-fabric) forwarding and internal-external (e.g., outside the fabric) forwarding in the networked environment. In some examples, the network assurances can be in non-fabric networked environments. The network assurance can be performed using logical configurations, software configurations and/or hardware configurations.

As discussed above, certain embodiments are directed to the creation of policies that will define how Endpoints 122 can communicate with each other via the Leafs 104 and the Spines 102 with Fabric 120. Embodiments disclosed herein include the creation and dissemination of five levels of instruction information discussed above with respect to FIG. 2D that will configure Leafs 104 and Spines 102 to facilitate that communication. Each level can include a change in content and/or format, although this need not always be the case.

Figure 7:
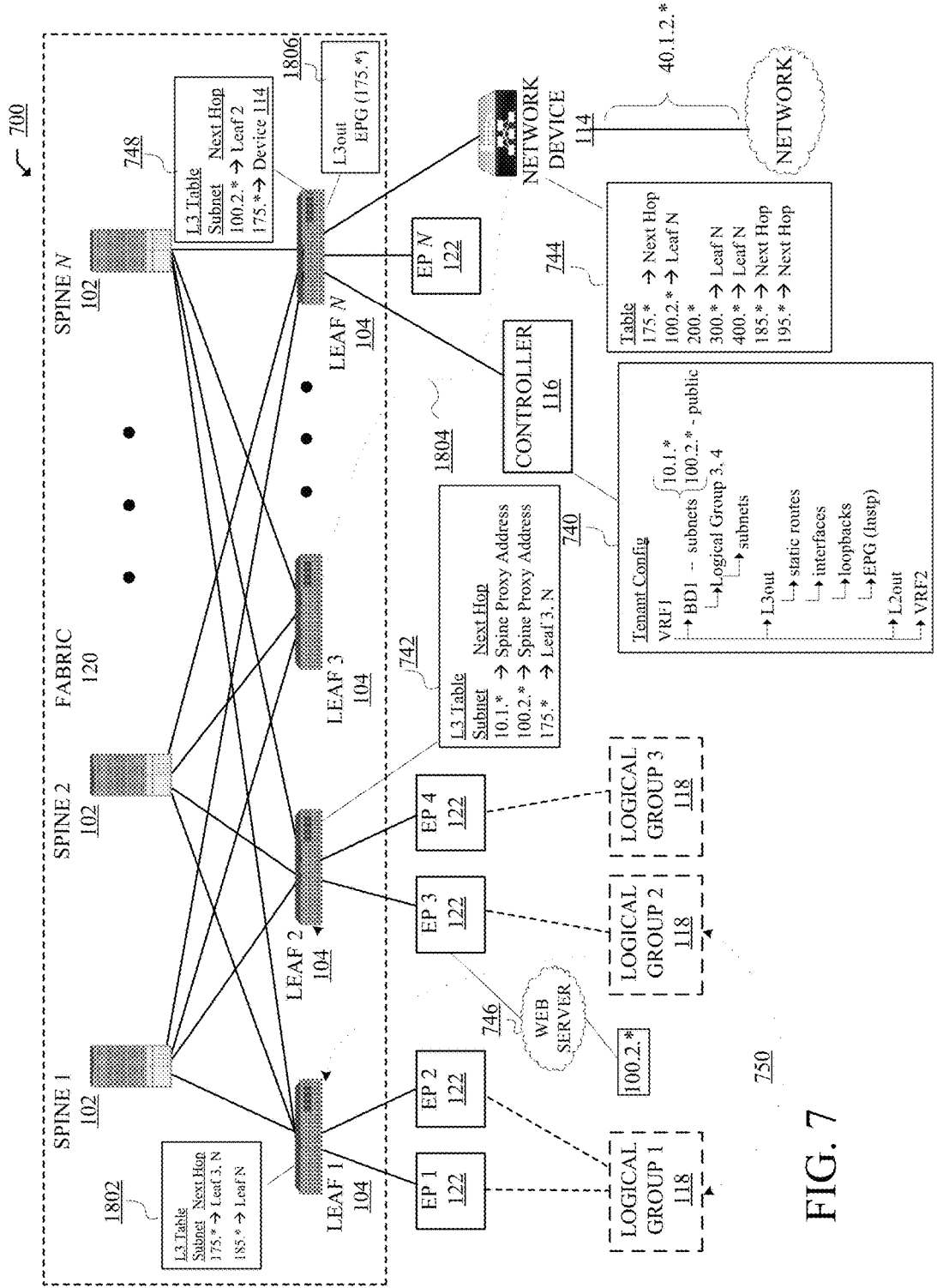
FIG. 7 illustrates an example network environment.

By way of non-limiting example, FIG. 7 illustrates example configurations in networked environment 700. Tenant Configuration 740 (e.g., an L_Model 270A configuration) can have VRF1 configured with BD1. BD1 can have one or more configured subnets (e.g., 10.1.*, 100.2.*, etc.). Subnets can be designated either private or public. In some examples, subnets can have a default designation of private. In this example, subnet 100.2.* has been made public (e.g., accessible from outside Fabric 120 and Networked Environment 700). Subnet 100.2.* can be associated with Web Server 746. For example, Web Server 746 can provide, via subnet 100.2.*, access to one or more web services (to devices) within fabric 120 and outside of fabric 120 via Network Device 114.

In order for communication to and from Web Server 746 to be facilitated, Tenant Configuration 740 must be sent from Controller 116 to the Leafs 104 and Spines 102 of Fabric 120. Public subnet 100.2.*, must also be leaked to an external device (e.g., Network Device 114) from a border leaf (e.g., Leaf N). For tenants to communicate outside the Fabric 120, the external network device (e.g., Network Device 114) must leak subnets (e.g., 175.*) to the border leaf (e.g., Leaf N). The leaked external subnets (e.g., learned routes) can then be propagated to the L3 tables of the Leafs 104 and Spines 102 of the Fabric 120.

VRFs can operate in the Layer 3 domain and can enable multiple instances of a routing table to coexist on the same router (e.g., Leafs 104 and Spines 102, etc.) at the same time. Since the routing instances are independent, the same or overlapping IP addresses can be used across VRFs without conflict.

BDs can operate as a Layer 2 forwarding construct within the fabric and can enable bidirectional flow of traffic between a Layer 2 bridged network and Layer 3 routed network traffic. Each BD can reside in a VRF. Each BD can also define one or more subnets. IP address in the defined subnets can belong to the specified BD.

A Logical Group (EPG) can be a managed object that is a named logical entity and contains a collection of endpoints. Endpoints can be devices that are connected to the network directly or indirectly (e.g., servers, virtual machines, network-attached storage, etc.). Each EPG can be assigned to a BD. EPGs can have an address (e.g., identity), a location, attributes (e.g., version or patch level), and can be physical or virtual. Endpoint membership in an EPG can be dynamic or static. Subnets can also be defined at the EPG.

L3out can be a construct to extend Layer 3 for external communication (e.g., outside the fabric and/or network environment). L3out can be bound to a VRF. L2out can be a construct to extend the Layer 2 for external communication (e.g., outside the fabric and/or network environment). L2out can be bound to a BD.

Controller 116, once configured, can push the L_Model 270A/B to the Leafs 104 and Spines 102 of the Fabric 120. In some cases, the L_Model 270A/B can be pushed to all Leafs 104 and Spines 102 of the Fabric 120. In other cases, portions of the L_Model 270A/B can be pushed to the Leafs 104 and Spines 102 of the Fabric 120 that are responsible for routing and forwarding data that are consistent with the L_Model 270A/B. For example, when BD1 defines subnet 101.1.*, the Leafs 104 that are configured to that BD (e.g., responsible for transmitting data with subnet 10.1.1*) can receive the L_Model 270A/B configuration related to BD1.

The L_Model 270A/B can be used to populate forwarding and routing tables (L3), VLAN tables (L2), interfaces (L1) and endpoint table (L2 and L3) at Leafs 104 and Spines 102 of the Fabric 120. For example, when BD1 defines subnet 10.1.1.*, the LPM table can populate an entry for the subnet and a destination to which incoming packets are to be routed (e.g., Leaf 3).

In some examples, the LPM table can be part of the forwarding table. The LPM table can specify one or more a subnets with a destination address matching more than one entry in the LPM table. The most specific of the matching table entries—the one with the longest subnet mask can be selected. The LPM table can also include information relating to subnets, static routes, dynamic (learned) routes, L3 interfaces, and L3 loopbacks. Populated LPM tables in FIG. 7 include tables 742, 748, 1802 and 1806, which are Ci_Models.

Each Leaf 104 in Fabric 120 can have a Layer3 (L3) Table (e.g., Longest Prefix match (LPM) Table). For example, L3 Table 742 can reside on Leaf 2 and L3 Table 748 can reside on Leaf N. The L3 tables can include a listing of subnets and next hops. For example, when a tenant of Leaf N requests to access Web Server 746, Leaf N can look up in L3 Table 748 the subnet associated with Web Server 746 (e.g., 100.2.*) and determine the next hop (e.g., Leaf 2). Accordingly, Leaf N can direct the packets from the tenant, to Leaf 2 via one of the Spines.

In other examples, devices outside Fabric 120 can request access to public Web Server 746. In these examples, the border leaf (e.g., Leaf N) can leak the public subnet (e.g., 100.2.*) to the external network device (e.g., Network Device 114). The external network device can maintain routing and forwarding tables (e.g., Table 744) where the leaked subnet information is stored. When a device outside Fabric 120 requests access to Web Server 120, Network Device 114 can determine where to forward the request by Table 744. The request will then be routed to the border leaf (e.g., Leaf N). The request can then be routed to the proper destination by the L3 tables of the Leafs and Spines.

In other examples, tenants within Fabric 120 can access devices external to the fabric (through the border leaf to which the external network is connected). For example, a tenant (e.g., EndPoint 4) can request access to devices external to Fabric 120, such as subnet 175.*. L3 Table 742 can determine that the next hop in accessing the external device is via Leaf N (e.g., subnet 175.*→Leaf N). This learned route is leaked from Network Device 114 to Border Leaf N, which is then propagated to the other leafs and spines of the fabric as needed. Border Leaf N can then route the request external to the fabric via next hop Network Device 114 (e.g., from L3 Table 748).

Networked Environment 700 can also include routing and forwarding through security contracts (e.g., 750) between logical groups, Layer 3 loopbacks and Layer 3 interfaces. While not shown, the L3 tables also include the Layer 3 loopback and Layer 3 interfaces.

The above instructions, and other instructions, are deployed by the Controllers 116 as L Models 270A/B and executed by the conversion into Ci_Model 274 and Hi_Model 276 as the individual Leafs 104 and Spines 102. Network assurance is a process by which the various creation and propagation of the L, C and H models, and related content, have been properly programmed, deployed, created etc. By way of non-limiting example, single level checks can be performed at the logical, software and/or hardware models by verifying the consistency of the models. Checks can also be performed by checking whether models were properly converted into other levels, e.g., whether the Leafs 104 and Spines 102 properly converted the L_Model 270A/B into Ci_Model 274 (logical to concrete checks) and Ci_Model 274 into Hi_Model 276 (concrete to hardware checks).

Network assurance can be verified by Assurance Appliance 300. Appliance 300 can poll devices (e.g., Spines 102, Leafs 104, Controller 116) of the networked environment (e.g., 100, Fabric 120) for the resident L, H and C Model configurations. For example, the application can poll Controllers 116 for L_Model 270A/B configurations and Leaf 104 and Spines 102 for Ci_Model 274 and Hi_Model 276 configurations. After receiving one or more L, C and H Model configurations from the one or devices (e.g., Spines 102, Leafs 104, Controller 116), Appliance 300 can perform one or more verifications using Checker 620 shown in FIG. 6, which can operate in the manner discussed with respect to FIG. 3B. It is to be understood that activity undertaken by one of Appliance 300 or Checker 620 can be undertaken by the other.

Checker 620 can be a component of Appliance 300. Checker 620 can receive as input one or more configurations (e.g., received at Appliance 300 through polling via Unified Collector 314), as well as other inputs as may be provided by Network 100 and/or Fabric 120. In some examples, one more L_Model 622 configurations (e.g., L-Model 270A/B) as provided by Controller 116 can be received as input. Similarly, reporting Leafs 104 and Spines 102 provide, and Checker 620 receives as input, one or more C_Model 624 configurations (e.g., Ci_Model 274) and one or more H_Model 626 configurations (e.g., Ci_Model 276). Other data from components of the Fabric 120 and/or Network 100 may also be received at Checker 620.

One type of check is a single level consistency check, in which a particular received model 622/624/626 is checked to confirm that the intent of the operator as originally programmed is represented and properly configured in the model. For example, Checker 620 can perform consistency checks on the L_Model configuration 622. For example, performing syntactic analysis (e.g., configuration, setup, typographical, etc.) on the L_Model configuration 622. The consistency checks can determine if the intent of the operator, when creating the configuration, is represented in the L_Model configuration 622.

A non-limiting example of a Layer 1 consistency check on L_Model configuration 622 is EPG deployed on an 'admin down' interface. This check can read the EPG deployment information and Interface Admin status from the L-Model. The EPG deployment information can identify the Leaf and interface where the EPG is physically deployed, and if properly deployed would match the Leaf and interface in the Interface Admin Status information. If the status is found to be 'admin down' the check may fail.

A non-limiting example of a Layer 2 check is overlapping encap VLANs on a switch. This check can read the EPG deployment information and Interface Port Policies from the L-Model to obtain the leaf, interface and encap VLAN. The EPG deployments can be grouped on a leaf by leaf basis. Within each such (leaf) group, the check can look for two distinct EPGs having the same encap VLAN. When such a pair is found, the check may fail if the pair are on the same interface. In other examples, the check can search interfaces on which the matching EPG pair for Interface Port Policies information gathered from the L-model. The check may fail if the VLAN scope of both the ports is marked as global.

A non-limiting example of a Layer 3 check is overlapping subnets due to cross-VRF contracts. This check can read the BD (subnets and VRF associated), EPG (subnets and BD association), and Contract information from the L-model. Within the set of Contracts the check can search for a Contract satisfying the cross VRF property as follows: VRF of BD of provider EPG of contract, namely provider VRF, and VRF of BD of consumer EPG of contract, namely consumer VRF are not the same VRFs. When such a contract is found, the check determines the consumer subnets (EPG subnets as well as consumer EPG's BD subnets) and provider subnets (EPG subnets). The checks may fail when any of the consumer subnets overlaps with any of the provider subnets.

Similarly, one or more C_Model 624 configurations (e.g., the Ci_Models 274 from the reporting Leafs 104 and Spines 102) can be received as an input and Checker 620 can perform consistency checks on any and all C_Model 624 configurations. Non-limiting examples of consistency checks, and how they are preformed, are as follows:

A non-limiting example of a Layer 1 check is Virtual Port Channel (VPC) consistency. The check can read the VPC state information from each Leaf. The check may fail if some interfaces on one leaf are in VPC mode, but no interfaces on the VPC peer leaf are in VPC mode.

A non-limiting example of a Layer 2 check is EPG VLAN (FD-VLAN) and BD VLAN (BD-VLAN) relationship consistency. The check can read the VLAN table information of a Leaf. The check can also search an FD-VLAN, such that its parent BD-VLAN does not include in the list of its children—if found, however, the check may fail. In other examples, the check may fail if an identified FD-VLAN does not indicate the BD-VLAN as the parent.

A non-limiting example of a Layer 3 check is Learned route distribution and next hop consistency. The check can read the LPM table information of all Leafs. The check may fail when a route is learned on some border leaf via an L3out but the route is not present on all of the other leafs where the L3out's VRF is deployed. In other examples, the check may fail when the next hops of the route on non-border leafs does not contain the border leafs.

There is no specific need for a separate H_Model consistency check, as this would be encompassed by the consistency check of the corresponding C_Model; any absence of issues in the C_Model checks by extension represents a lack of issues in the corresponding H_Model. However, the application is not so limited, and Checker 620 can perform an H_Model consistency check consistent with the methodologies discussed herein.

Another type of check is a model-to-model check. Such a check confirms that the Leafs 104 and Spines 102 properly converted an L_Model 270A/B into a Ci_Model 274, and/or a Ci_Model 274 into an Ci_Model 276.

For an L-to-C model ("L-C") check, a specific Leaf or Spine provides a Ci_Model as C_Model 624 and Controller 116 provides an L_Model 622. Checker 620 can determine whether the specific Ci_Model was properly generated from the L_Model 622. Checker 620 first takes the L_Model 622 and generates the corresponding local Li_Model for that particular Leaf or Spine; this can be performed by Switch Logical Policy Generator 316 as described with respect to FIG. 3B, for which the corresponding generated Li_Model is shown in FIG. 3 as Li. Since the particular Ci_Model and the corresponding generated Li_Model are in different formats, checker 620 converts one or both into the same format ("common format"). This format may be the native format of the Li_Model or the Ci_Model (in which case only one of the models would need to undergo format conversion), but can be a format different from both. Non-limiting examples of the common format is JSON objects, flattened list, strings, XML, common table, etc.

As discussed above, a particular Ci_Model 274 may have different content than the Li_Model 272 from which it was based, such that there will be overlapping fields of content between the models. The content difference reflects in part that Li_Model represents instructions of operator intent and the Ci_Model represents actual implementation of that intent, and thus the Ci_Model can include content regarding actual implementation. Checker 620 can extract (at least some of the) content from the overlapping fields from the common format version of the Ci_Model and the corresponding generated Li_Model and compares them relative to each other. If the extracted content from the overlapping fields matches, then the content was properly incorporated when the corresponding Ci_Model was created. If the extracted content from the overlapping fields do not match, then an error is generated, for example, an error that prevented the proper creation or population of the corresponding Ci_Model. The error could have occurred in a number of different ways, for example, in the L-to-C conversion, or that the Ci_Model is outdated (perhaps the updated L_Model never having been received or converted at all); the application is not limited to the nature of the error.

For a C-to-H model ("C-H") check, a specific Leaf or Spine provides its specific Ci_Model 624 and Hi_Model 626. Checker 620 can determine whether the Hi_Model was properly generated from the Ci_Model. Since the particular Ci_Model and the Hi_Model are in different formats, checker 620 can convert one or both into a common format. This format may be the native format of the Hi_Model or the Ci_Model (in which case only one of the models would need to undergo format conversion), but can be a format different from both. The common format of the C-H level check may be the same or different from the format used in the L-C level checks. Non-limiting examples of the common format is JSON objects, flattened list, strings, XML, common table, etc.

As discussed above, a particular Ci_Model 274 may have different content than the corresponding Hi_Model 276 from which it was based, such that there will be overlapping fields of content between the models information. Checker 620 can extract (at least some of) the content from the overlapping fields from the common format version of the Ci_Model 624 and the corresponding Hi_Model 626 and compares them relative to each other. If the extracted content from the overlapping fields matches, then the content was properly incorporated when the corresponding Hi_Model was created. If the extracted content from the overlapping fields does not match, then some error prevented the proper creation of the corresponding Hi_Model. The error could have occurred in a number of different ways, for example, in the C-to-H conversion, or that the Hi_Model is outdated (perhaps the Leaf 104 simply never performed the conversion in the first place); the application is not limited to the nature of the error.

In response to no discrepancies in the consistency or model-to-model conversion check, Checker 620 can output an informational event 628. In response to one or more discrepancies Checker 620 can output an error event 628 (e.g., of varying severity depending on the discrepancy).

Figure 9:
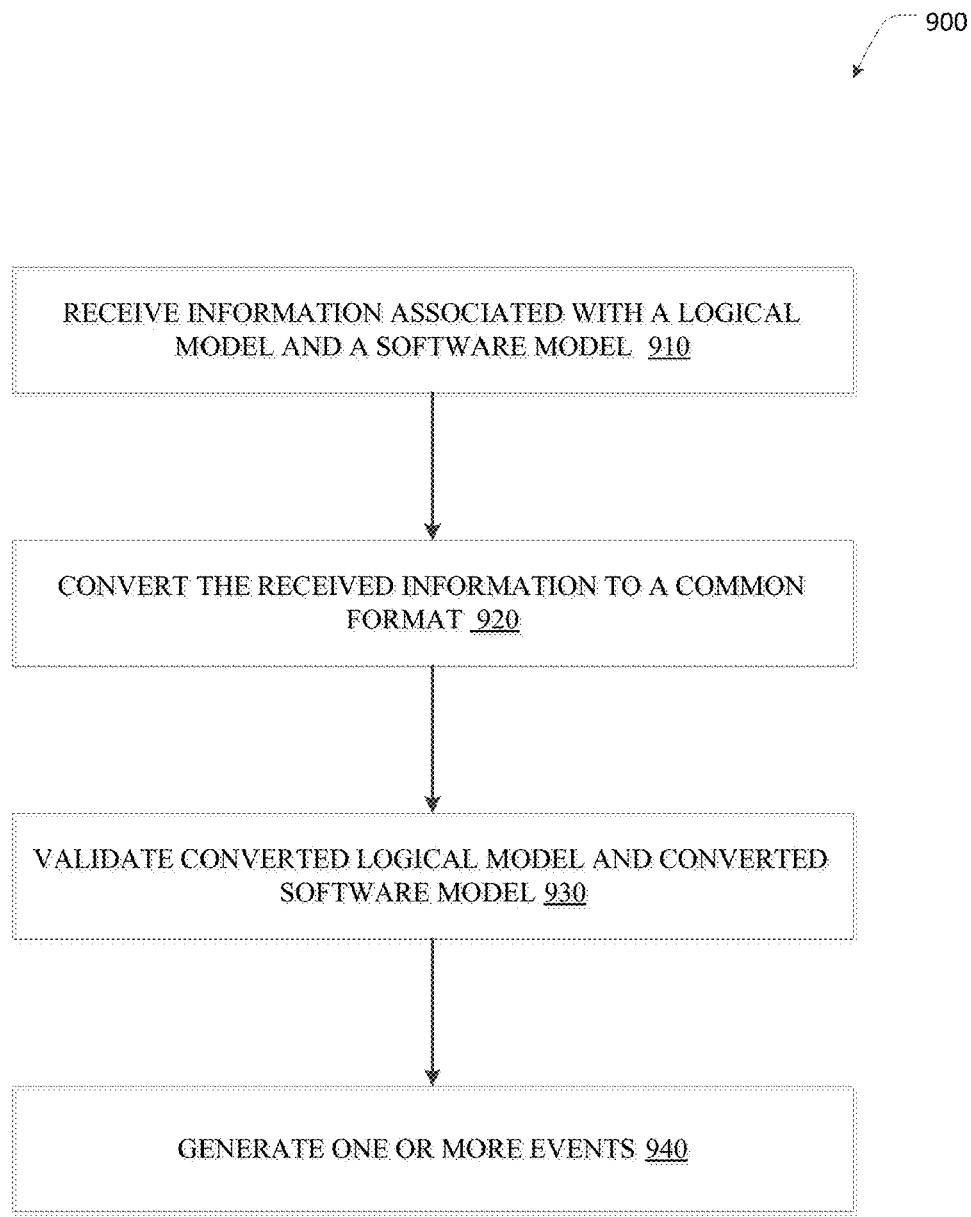
FIG. 9 illustrates an example method embodiment for network assurance of Layer 2 networking.

FIG. 9 illustrates an example flowchart for an example network assurance of model-to-model checks of a network environment. The method shown in FIG. 9 is provided by way of example, as there are a variety of ways to carry out the method. Additionally, while the example method is illustrated with a particular order of sequences, those of ordinary skill in the art will appreciate that FIG. 9 and the sequences shown therein can be executed in any order that accomplishes the technical advantages of the present disclosure and can include fewer or more sequences than illustrated.

Each sequence shown in FIG. 9 represents one or more processes, methods or subroutines, carried out in the example method. The sequences shown in FIG. 9 can be implemented by an application in a network environment such as network environment 100 shown in FIGS. 1A and 1B. The application can be present on Appliance 300 and/or Checker 620, although the application is not so limited.

At sequence 910, the various models (e.g., L_Model, C_Model, and/or H_Model) to be checked are received. For example, each Controller 116 in the Fabric 120 can send to the application (e.g., Assurance Appliance 300 and/or Checker 620) one or more L_Models 270A/B, and each Leaf 104 and Spine 102 sends its corresponding Ci_Model 274, and Ci_Model 276. In another example, some but not all of the L_Model, C_Model, and/or H_Model configurations are provided and/or received. Those received models will include information content, at least some of which will be subject to the validation process.

At sequence 920, the application can convert two received models into a common format (i.e., one model is converted into the format of the other so they are the same, or both models are converted into the same new format). In some examples, the common format can be the common model (e.g., that the configuration was original entered in by the operator).

At sequence 930, the application can validate the received information by comparing content from relevant overlapping fields in the common format of the two models. A match in content represents that, at least for that content, the originating Leaf 104 or Spine 102 properly converted one level of model into the next level of model. For example, the logical model (e.g., L_Model) received from the controller was properly converted into the concrete model (e.g., C_Model). A discrepancy indicates some error in relation to the deployment or creation of the models.

At sequence 940, an event is generated. For example, when the validations are consistent the application can generate an information event. In other examples, when one or more of the validations are not consistent the application can generate an error event. The severity of the error event can at least be determined based on which validation is inconsistent and which device had the inconsistency (e.g., production device, test device, access point, border leaf, etc.).

The above methodology reflects the overall steps for model-to-model checks. Individual types of model-to-model checks may include additional steps, modify certain steps, or omit certain steps. Non-limiting examples of such individual checks are set forth in other sections herein.

In the above embodiments, the local Li_Model 272 is not requested or provided to Checker 620, as the configuration and/or level checks that include the L_Model 270A/B would encompass any specific checks on local Li_Model 272. However, the application is not so limited, and a local Li_Model 272 can be an input to Checker 620 and checked consistent with the methodologies discussed above.

In the above embodiments, there is no need for a separate L-to-H model ("L-H") check, as this would be encompassed by the combined results in the L-C and C-H checks; the absence of discrepancies in the L-C and C-H checks by extension represents a lack of discrepancies between L and H. However, the application is not so limited, and Checker 620 can perform an L-H level check consistent with the methodologies discussed above.

Consistency checks may be universal to an entire model, in that all content of the model is checked. In other examples, only some content of the model may be checked, and in particular topic specific content. By way of non-limiting example, a Layer 2 specific check may only examine content in the model that is specific to Layer 2 operations, while a Layer 3 specific check examines content in the model that is specific to Layer 3 operations.

In some examples, model-to-model checks may be universal to all content of the model, in that all content (at least all content found in overlapping fields of the models that are to be compared) can be compared to identify which specific fields have matches or discrepancies. To the extent that certain specific topic checks are of interest, the check can simply consult the resulting overall comparison to examine the relevant fields. By way of a non-limiting example, the L and the C level may have 50 overlapping fields of content, but a first particular check may only require consideration of three (3) of them, while a second particular check only requires consideration of two (2) of them. Each topic specific check can consult the results of the comparison search for the needed specific fields. In this way, the comparison can precede the request for a topic specific check.

In other examples, some content of the models may be compared, and in particular topic specific content. For example, as discussed in more detail with respect to individual checks below, some checks are targeted to specific information with respect to a specific topic. In such cases, the comparison may not include or consider all overlapping fields, and would instead be limited to the overlapping fields of interest. By way of non-limiting example, a Layer 2 specific check may only compare content of overlapping fields in specific to Layer 2 operations. The types of information of interest relative to a particular check can be predefined in the application (e.g., 300), although the application is not so limited. In this way, the request for a topic specific check can precede the comparison, and the comparison can be limited only to the topics of interest.

Topic specific checks may be self-contained or overlap. Specifically, as discussed above different topic checks may examine different overlapping fields within the models. Some of these fields may be common to different checks. By way of a non-limiting example and as discussed below, Layer 2 checks for both BD deployment and an EPG deployment, both of which examine the information about the VLAN; thus two different checks include consideration of the similar content. If the checks are self contained, then each check would examine the relevant content regardless of other prior/future checks; thus in the example the VLAN would be checked independently in both the BD deployment and an EPG deployment check. In the other examples, if a common field has already by examined by a prior check, then a subsequent check can rely upon those results rather than conduct an independent examination; thus if the BD check shows that the VLAN information is as expected, then a subsequent EPG check can adopt those results rather than again/separately examine the VLAN information.

In the above embodiments, the results of the check are either a match or a discrepancy. However, the application is not so limited. There can be a predefined range of acceptable variation between compared content as to be acceptable or otherwise consistent with expectations. There could be some content for which a particular discrepancy is less important that another type of discrepancy. The application is not limited to the manner in which Checker 620 evaluates the existence, nature or impact of discrepancies.

Although the above checks are discussed with respect to specific Leafs 104 and Spines 102, it is to be understood that these checks can be performed on all or some Leafs 104 and Spines 102. Such checks could be in response to simply receiving the models, e.g., a C_Model and H_Model are received, and thus a C-H check is performed. In other examples, specific Leafs 104 and/or Spine 102 could be polled for information and the check confined to request information. The application is not limited to the manner in which information for checks are requested or received, or what triggers Checker 620 to institute a particular check.

Tenant Forwarding Event Generation

As shown above, FIG. 6 also illustrates the generation of an Event 628. Events can be generated in response to Checker 620 performing a check on one or more inputs (e.g., 622, 624, 626, 630). Events can be informational events and error events. Informational events are generated in response to no inconsistencies or discrepancies found during the check of the inputs. The information event can include the check performed, the devices checks, the time checked, the result of the check, etc. The informational (and error) events can be stored in a memory/database accessible by Appliance 300.

Historically stored events can be used in a predictive manner. By way of non-limiting example, the cause and effect (and particularly the failure) of prior configurations and checks of those configurations can be stored and referred to. Before changes are made to the Fabric 120 or networked environment with a newly proposed configuration, the system can consult with the historical data for instances of the same or similar configurations and any resulting positive or adverse effects of the same. The system can thus predict if the newly proposed configuration will adversely affect the network based on previous configurations that are the same or similar in nature. Similarly, the historical events can also be used to predict changes that have recently taken affect that could cause issues.

The error events can be generated in response to inconsistencies or discrepancies found during the check of the inputs (e.g., L_Model, C_Model, H_Model, etc.). The error events can have different levels of severity, for example, warning, minor, major, critical, etc. A warning severity can be a potential problem in the future, such as, not using best practices, or events that are of interest to the operator. A minor severity can be a low impact problem, for example, does not affect production devices, operation not affected, etc. A major can be a high impact problem, for example, operation is affected, but is still operational, (e.g., production devices dropping some packets, etc.). A critical error is a serious failure that usually prevents normal operation of devices and requires an immediate fix, for example, failure of border leaf, production devices, etc.

Each event can include a mnemonic (event code), a description of the error, remediation steps, affected objects (e.g., VRF), secondary affected objects (e.g., BD and EPG linked to affected VRF), severity level, number of checks, etc. When an error has occurred with an affected object, each secondary affected object can be checked for errors. For example, when a VRF has an issue and an error event is generated, the secondary objects of the VRF (linked BDs, EPGs, etc.) can be checked for errors. In some examples, the error might be generated at a higher level (e.g., VRF), but the cause of the error could be from a lower level (e.g., BD, EPG, etc.). By checking secondary objects and determining the actual cause of the error, remediation can be more efficient and effective.

In some examples, the remediation steps can be transmitted to the operator. In other examples, one or more of the devices in the network environment or fabric can automatically perform the remediation steps. In some examples, Appliance 300 can perform the remediation steps. In other examples, the remediation can require a vendor and the operator can be notified to contact the vendor.

Validation of Layer 1

From the perspective of deployment the operator can define in the L Model 270A instructions as to particular Leafs 104 or Spines 102 regarding Layer 1 operability. This can include whether a physical link (e.g., port) is set to active or down, a software link (e.g., port) is active or down, and a configured check to see if the interface is configured or not configured (e.g., access policy configured, etc.). Leafs 104 and Spines 102 can receive the L_Model 270A, convert the relevant content into Ci_Model 274, and then execute on the instructions to institute the configurations and set the physical link, software links and interfaces in the manner instructed. Leafs 104 and Spines 102 then update their respective Ci_Models 274 to reflect the status of the physical, software links, interfaces and any combination thereof.

Network assurance of Layer 1 physical interfaces is directed to Appliance 300 and/or Checker 620 confirming that the configurations are present and the links are set as instructed. The Layer 1 checks can be a physical link check (e.g., active or down), software link check (e.g., active or down) and a configured check (e.g., configured or not configured). For Layer 1 to be actively configured, each of the three controls should be configured properly (e.g., physical link up, software link up, access policy configured). In other examples, Layer 1 may not be actively configured and the three controls can be up, down and not configured.

The physical link check can determine if the network interfaces (e.g. of Leafs 104 and Spines 102) have a physical connection (e.g., cable attached, etc.). The Checker 620 receives the Ci_Model from a particular individual Leaf 104 or Spine 102, and identifies in the Ci_Model the reported status of whether the physical link is active or down. Checker 620 can also poll the software of the particular individual Leaf or Spine that monitors the hardware status to determine if the actual state of the physical link is as reflected by the Ci_Model, such as by issuing commands on the command line interface of a device (e.g., ethtool, ifconfig, etc.). The physical link is validated when the states match, and a discrepancy exists when the states do not (e.g., the polled state says the link is active but the reported state shows it is down, or vice-versa).

The software link check can determine when the physical link (e.g., port) is up or down at the software level (e.g., firmware, application, etc.). The methodology tracks that of the physical link check above, save that Checker 620 polls the software of the particular individual Leaf or Spine that monitors the software status to see if the actual state of the software link is as reflected by the Ci_Model, such as ports of a device having been brought up or down through software (e.g., a command line interface (or GUI) of the device). The software link is validated if the states match, and a discrepancy exists if they do not (e.g., the polled state says the link is active but the reported state shows it is down, or vice-versa).

Figure 3D:
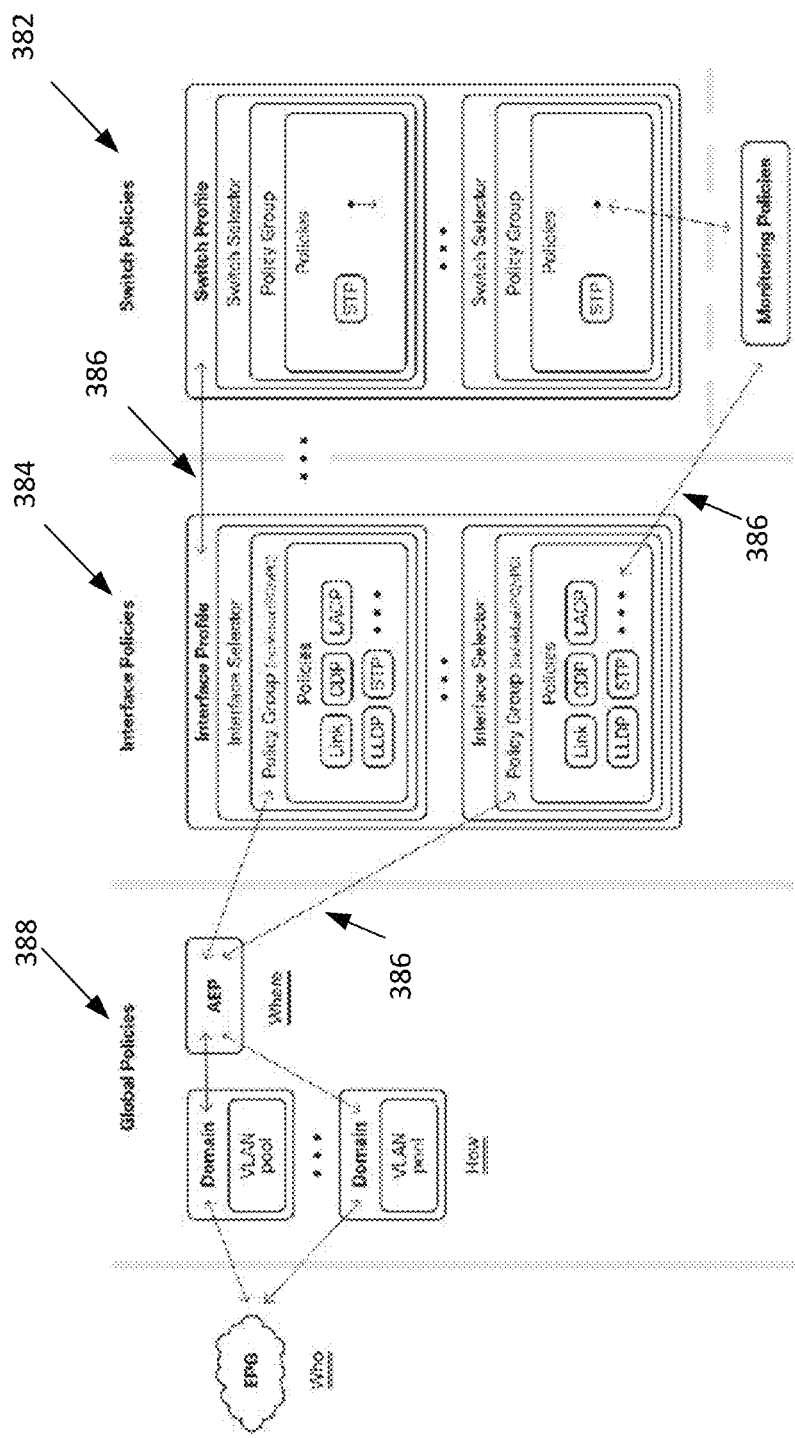
FIG. 3D illustrates an example of validated policies.

The configured check can determine when the interface is configured (e.g., has an access policy, etc.). Access policies can govern the operation of switch access ports that provide connectivity to resources such as storage, compute, Layer 2 and Layer 3 (bridged and routed) connectivity, virtual machine hypervisors, Layer 4 to Layer 7 devices, etc. Access policies can enable the configuration of, but not limited to: port channels and virtual port channels, protocols such as LLDP, CDP, or LACP, speed, STP properties, and features such as monitoring or diagnostics. Access policies can include common objects including, but not limited to: leaf profiles, leaf policies, interface profiles, interface policies, AEP, VLAN pools, physical domain (physdom), VMM domain, hypervisor, etc. Referring now to FIG. 3D, the particular check is an L-Model level consistency check, for which checker 620 checks to confirm that the switch profile 382 and interface profile 384 are present, populated and properly linked 386, and that the interface profile 384 is properly linked 386 to the global profiles 388. Checks of global profiles and other content can occur at other layers.

Figure 8:
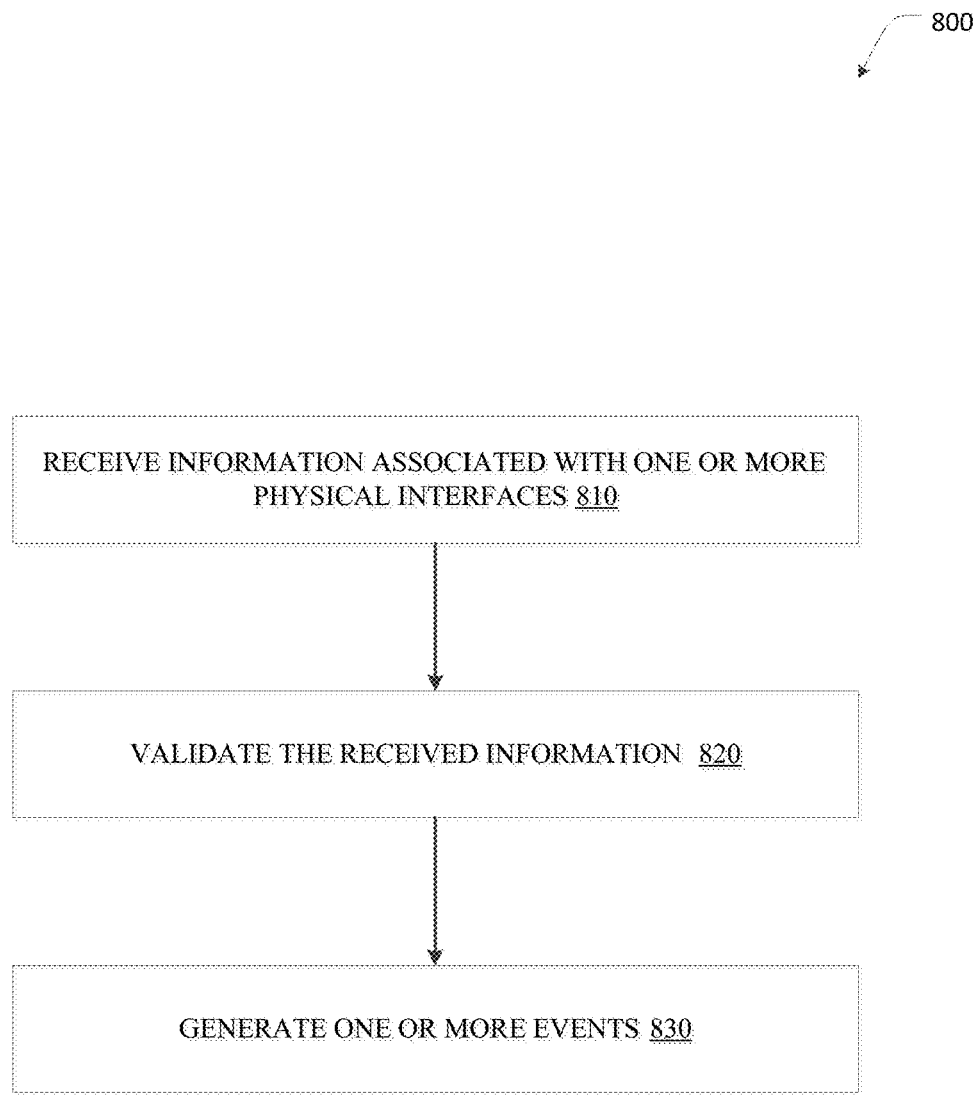
FIG. 8 illustrates an example method embodiment for network assurance of Layer 1 interfaces.

FIG. 8 illustrates an example flowchart for an example network assurance of Layer 1 physical interfaces. The method shown in FIG. 8 is provided by way of example, as there are a variety of ways to carry out the method. Additionally, while the example method is illustrated with a particular order of sequences, those of ordinary skill in the art will appreciate that FIG. 8 and the sequences shown therein can be executed in any order that accomplishes the technical advantages of the present disclosure and can include fewer or more sequences than illustrated.

Each sequence shown in FIG. 8 represents one or more processes, methods or subroutines, carried out in the example method. The sequences shown in FIG. 8 can be implemented in a network environment such as network environment 100 shown in FIGS. 1A and 1B. The application can be present on Appliance 300 and/or Checker 620, although the application is not so limited.

At sequence 810, the various models (e.g., L_Model, C_Model, and/or H_Model) to be checked are received. For example, one or more Leafs 104, Spines 102 and Controllers 116 in Fabric 120 can send to the application (e.g., Assurance Appliance 300) L_Model 270A/B, Ci_Model 274, and H_Model 274. Those received models will include information content, at least some of which will be subject to the validation process. For example, Layer 1 content of interest can include the physical link status of the interfaces of the devices, the software link status of the interfaces on the devices, and any access policies for the interfaces on the devices.

At sequence 820, the application can validate the received information. For example, the application (e.g., Assurance Appliance 300) can validate the received information verse previously stored information. In some examples, the received physical interface status can be validated against previously stored information required to determine if the physical interface is up (e.g., active). In some examples, the received software interface status can be validated against previously stored information required to determine if the software interface is up (e.g., active). In some examples, the received access policy information can be validated against previously stored information required to determine if the access policy is present and properly configured. In some examples, checker 620 can independently obtain the information from the one or more Leafs 104, Spines 102, etc., and compared against the content of the models in the manner discussed above.

At sequence 830, the application can generate an event. For example, when the validations are all successful (e.g., consistent with expectations of the validation) the application can generate an information event. In other examples, when one or more of the validations are not successful (e.g., not consistent with expectations of the validation) the application can generate an error event. The severity of the error event can at least be determined based on which validation is unsuccessful and which device was unsuccessfully validated (e.g., production device, test device, access point, border leaf, etc.).

Validation of Layer 2

Layer 2 is the protocol layer (e.g., data link layer) that can provide the functional and procedural configurations to transfer data between network entities. Appliance 300 can perform a series of network assurance checks on Layer 2 of the network environment. Layer 2 checks can include at least, for Layer 2 relevant content, a consistency check of the L_Model, an L-C check, and a C-H check, although the application is not so limited. These checks can be performed by Appliance 300 and/or Checker 620 as described above on at least the overlapping fields of content that are specific to Layer 2 operability.

The Layer 2 checks can be performed on Access Policies (e.g., common objects) and tenant trees (e.g., common objects that are pushed to leafs and spines). The tenant tree common objects can include, for each tenant, VRF, BD (bound to VRF), EPG (bound to BD). Each EPG can include deployment information (where the controller should deploy the configuration), including static binding or dynamic binding and domains. The static binding can include the leaf, card, port, and VLAN. The dynamic binding does not require further information as it is configured dynamically when required. The domains can include physical, VMM, or both. The domains and static bindings can also include deployment settings including pre-provision, immediate, lazy, etc. Once the configurations are completed (e.g., by the operator) to define the L_Model 270A, the Controller 116 can push the L_Model 270A/B to the appropriate Leafs 104 and Spines 102. Appliance 300 and/or Checker 620 can then check the deployment.

The Layer 2 L_Model consistency check can include at least a syntactic analysis (e.g., configuration, setup, typographical, etc.) on the L_Model configuration. Specific content checked for Layer 2 includes by way of non-limiting example that the Access Policies are configured properly (e.g., based on the common objects), the EPG is configured properly (e.g., based on common objects), Cross EPG checks (e.g., if an EPG is using one VLAN another EPG deployed on the same Leaf should not be using the same VLAN), etc. When there are inconsistencies an event can be generated.

The Layer 2 L-C checks can include if the BD is properly deployed (e.g., semantic check). For example, some subset of BDs has been deployed on one or more of the Leafs 104. The L-C checks can validate the subset of BDs have been properly deployed on the Leafs, for example, by utilizing the common objects (e.g., VLAN and interface). In some examples, the VLAN and interface information (e.g., C_Model) can be stored in the VLAN table of the leaf/spine.

The L-C checks can also include if EPGs are properly deployed, which similar to the BD check above examines the VLAN pair (between L_Model and C_Model) and interface pair (between L_Model and C_Model).

The Layer 2 C-H checks can be similar to the Layer 2 L-C checks, although content to be checked resides and is received from the Leafs 104 and Spines 102. For example, the application (e.g., Appliance 300) can receive the Ci_Model 624 and Hi_Model 626 from the one or more Leafs 104 and Spines 102, convert to a common format and then validate the VLAN pairs and interface pairs. When there are inconsistencies between the Ci_Model and Hi_Model an event can be generated.

Another Layer 2 check is to validate VLAN assignments in the network, which is an L_Model to H_Model relative check. In some examples, the L-Model to H_Model check can be performed by a combination of the L-C and C-H checks. The checks can verify for each EPG, the same VLAN is assigned at the same interface at the L_Model, Ci_Model and Hi_Model.

Another Layer 2 check can be to validate VLAN assignments across the networked environment. This particular check is a comparison of content of the L_Model to a Distributed Virtual Switch (DVS) configuration (hereinafter "DVS_Model"). The DVS is outside of Fabric 120 and like Leafs 104 and Spines 102 also receives the L_Model 270A/B. Checker 620 receives the L_Model 270A/B from Controller 116 L_Model input 622 as discussed above, and also receives as a distinct input the DVS configuration from the DVS at Other input 630. One or both of the received L_Model and/or the DVS configuration are converted into a common format, and content from relevant overlapping fields (within the models/configurations) is compared. For VLAN assignments, relevant overlapping fields can include but are not limited to: the configured VLANs for each EPG (e.g., static/physical and dynamic/virtual), and the particular VLAN IDs for dynamic/virtual EPGs.

Another Layer 2 check is VLAN provisioning on a switch or port as part of the L_Model consistency check. Appliance 300 can check that the L_Model 270A/B received from the Controller 116 does not include overlapping VLANs. At the switch level, the Appliance 300 can determine if there are duplicate VLANs on the switch. At the port level, the Appliance 300 can determine if there are duplicate VLANs on the same ports of the switch. In the port example, there can be duplicate VLANs on different ports of the switch.

Execution of the L-DVS, L-C and C-H level checks in Layer 2 occur as discussed with respect to FIG. 9. The various received models at sequence 910 would include information relevant to the Layer 2 analysis, such as VLAN and interface information. At sequence 920, for each model-to-model check the application can convert the received models into a common format. At sequence 930, the application can validate the received information by examining content from relevant fields, such as the VLAN common object and/or the interface common object of the Ci_Model. Other common objects for Layer 2 can be validated between L-DVS, L-C and C-H checks.

At sequence 940, the controller can generate an event. For example, when the validations are consistent (e.g., consistent with expectations of the validation) the application can generate an information event. In other examples, when one or more of the validations are not consistent (e.g., inconsistent with expectations of the validation) the application can generate an error event. The severity of the error event can at least be determined based on which validation is inconsistent and which device had the inconsistency (e.g., production device, test device, access point, border leaf, etc.).

Validation of Layer 3

Appliance 300 can perform a series of checks on Layer 3 (e.g., network layer) of the network environment (e.g., network assurance). The network layer is responsible for packet forwarding including routing through intermediate routers. Layer 3 checks can include at least a consistency check of the L_Model, an L-C check, and a C-H check, although the application is not so limited. These checks are performed by Appliance 300 and/or Checker 620 as described above on at least the overlapping fields of content that are specific to Layer 3 operability.

There are a variety of Layer 3 checks that can be performed, for example, BD subnets are deployed correctly (e.g., routing on/off, IP/mask, etc.), overlapping subnet checks, L3out deployed properly, BD-L3out association, RIB is programmed properly with subnets, learned routes are properly propagated in the fabric, RIB-FIB equivalence, and Cross-VRF route leaking.

In Layer 3, a concern of the check can be integrity of deployment of the subnets. Each BD can define one or more subnets (e.g., 10.0.*). The subnets can also be defined in the Logical Groups (e.g., EPG). Each VRF (which is in Layer 3) can have a unique IP address. If another device uses the same IP address, there is not a conflict as long as the IP address is used a different VRF. In Layer 3, a common object, L3out can also be defined (for external communication). The L3out common object can define: L3 interfaces, L3out EPG, static routes and loopbacks.

Whether the BD subnets are deployed correctly can be an L-C check. The subnets for each BD (and EPG) can be resident on L_Model 270A/B deployed by the Controller 116. The subnets as deployed at the network devices can include a routing information base resident on the Ci_Model of the reporting Leafs 104 or Spines 102. The application can collect the BD subnets deployed from the received L_Model and Ci_Models based on VRF assignments to define a set union (e.g., a list of BD subnet deployed without duplicates). The application can determine that the BD subnets are actually deployed at the appropriate network devices in the union (and not network devices that they should not be deployed). The BD subnets check can also include checking the BD subnets on network devices because of contracts between EPGs. The BD subnet check can determine the BD subnets points to the spine proxy and, the BD subnets have a corresponding gateway address is installed.

Figure 10:
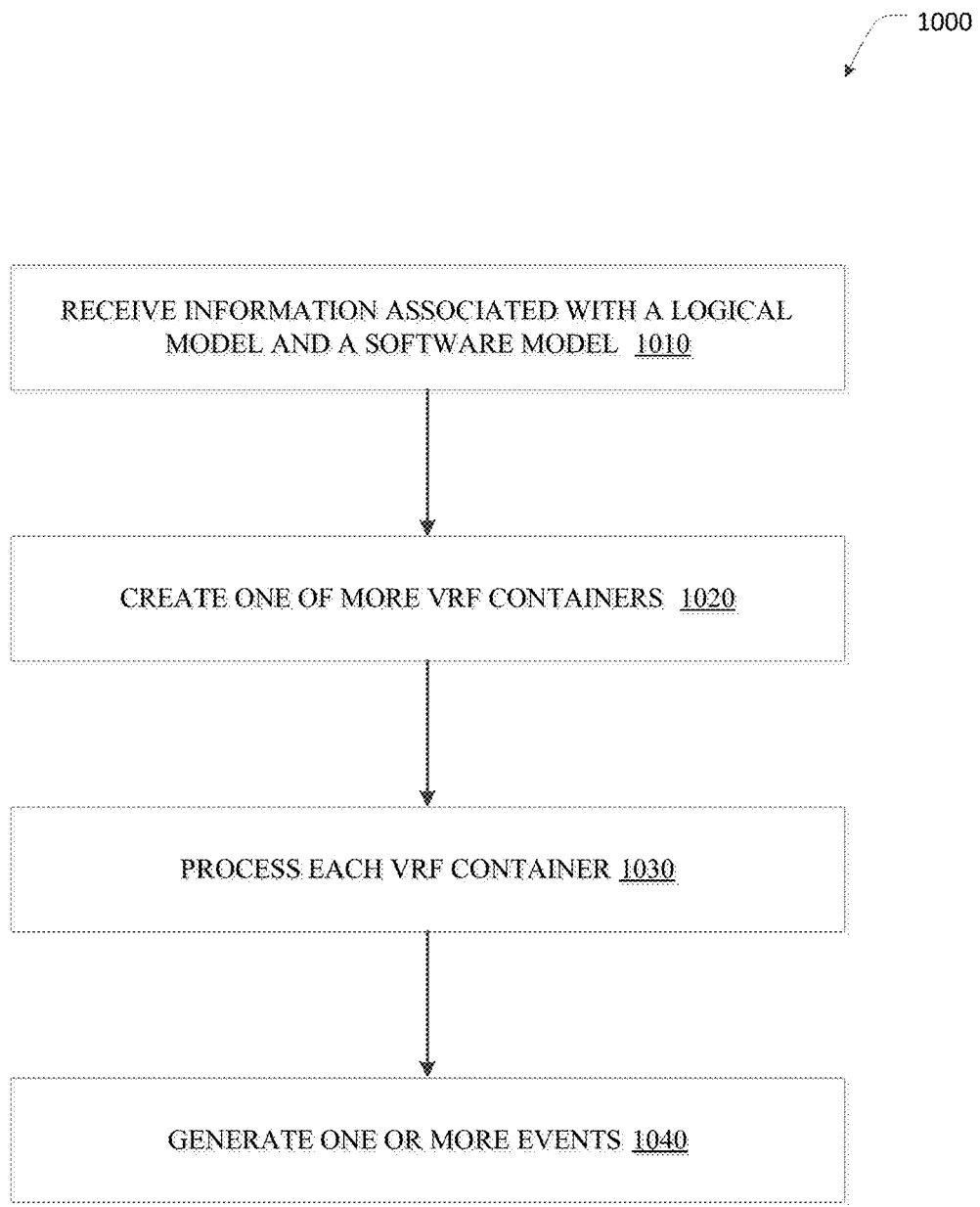
FIG. 10 illustrates an example method embodiment for network assurance of Layer 3 networking.

FIG. 10 illustrates an example flowchart for an example network assurance of Layer 3 configuration of a network environment. The method shown in FIG. 10 is provided by way of example, as there are a variety of ways to carry out the method. Additionally, while the example method is illustrated with a particular order of sequences, those of ordinary skill in the art will appreciate that FIG. 10 and the sequences shown therein can be executed in any order that accomplishes the technical advantages of the present disclosure and can include fewer or more sequences than illustrated.

FIG. 10 represents one or more processes, methods or subroutines, carried out in the example method. The sequences shown in FIG. 10 can be implemented in a network environment such as network environment 100 shown in FIGS. 1A and 1B. The application can be present on Appliance 300 and/or Checker 620, although the application is not so limited.

Method 1000 can begin at sequence 1010. At sequence 1010 the various models (e.g., L_Model, C_Model, and/or H_Model) to be checked are received. For example, the one or more Leafs 104, Spines 102 and Controllers 116 in the Fabric 120 can send to the application (e.g., Assurance Appliance 300) L_Model 270A/B, Ci_Model 274, and Ci_Model 276. Those received models include information content that can be subject to the validation process. In some examples, the information relevant to a Layer 3 check can include prefix, subnet, network, or routing data from each VRF, BD, EPG (e.g., logical group), in the network environment or fabric.

Figure 11:
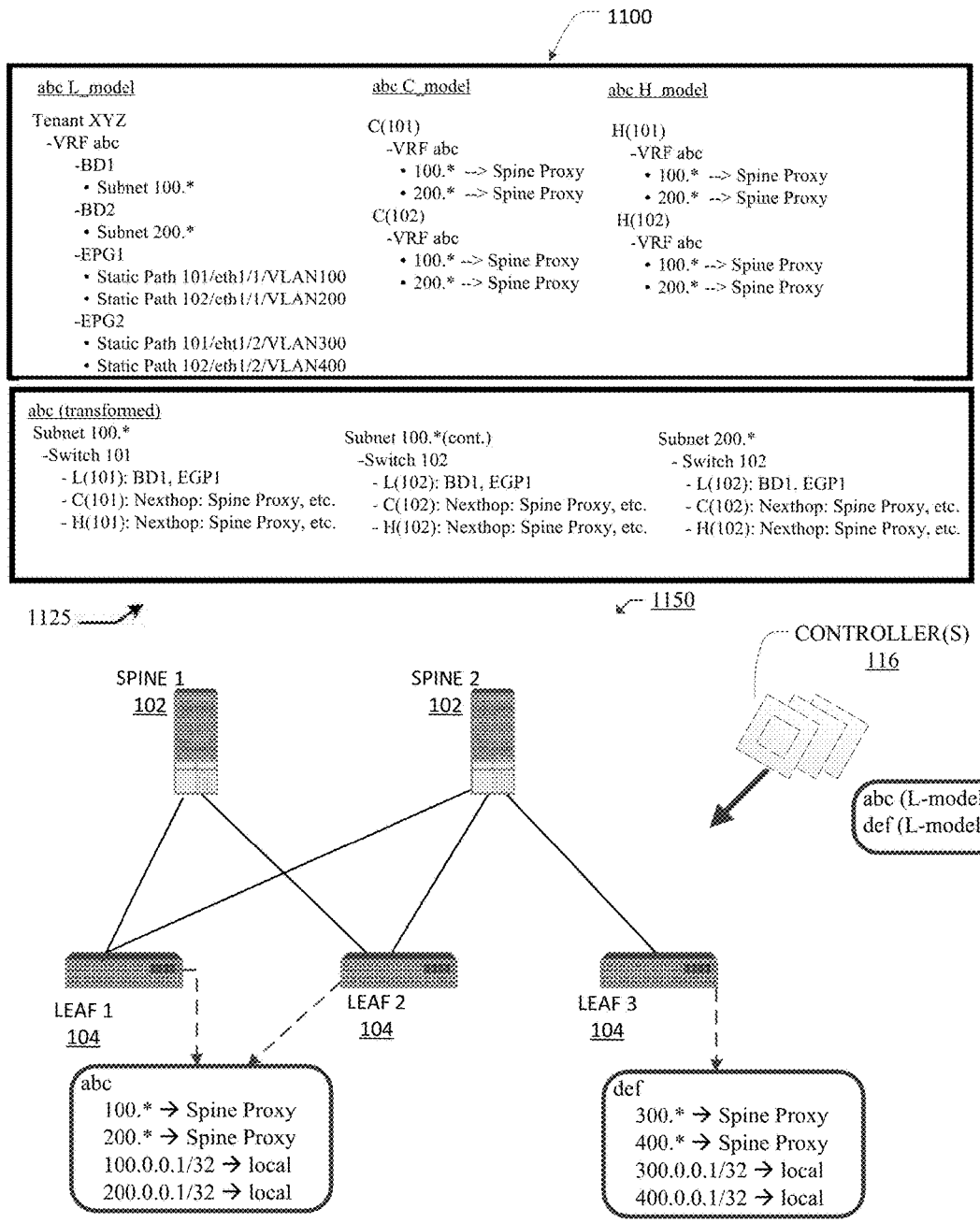
FIG. 11 illustrates an example configurations for network assurance.

At sequence 1020, one or more VRF containers for configuration abc (e.g., individual or multiple tables, files or the like) are created and populated for the VRFs in the received L_Model 622. FIG. 11 illustrates example VRF containers 1100 and 1125. While VRF containers 1100 and 1125 illustrate two different container configurations, more container configurations are realized and the example containers 1100 and 1125 are not limiting. Specific Leafs 104 under each VRF can be identified (e.g., each VRF will have one or more BD subnets, and each BD subnet will have one or more EPGs with one or more specific Leafs 104). Example VRF container 1100 and 1125 can populated with at least the received Ci_Model 274 and the created Li_Model 272 (as previously or newly created, and accounting for security contracts as discussed below) for the specific Leafs. Each VRF container can thus include data specific to that VRF (e.g., LPM container of prefixes, subnets, networks, external routes, etc.).

At sequence 1030, each VRF container is validated by Checker 620 and/or Appliance 300. The Li_Models represent how the BD subnets are to be configured (e.g., per the operator intent), and the Ci_Models represent how the instructions were actually implemented (e.g., at the Leaf, Spine, etc.). The intent should match the implementation, and thus Checker 620 confirms for each VRF container that the Li_Models are consistent with the Ci_Models. A discrepancy exists if there is a mismatch in content.

A discrepancy can also exist if a model is present that should not be. For example, if only Leafs 1 and 2 are under a particular VRF, then L1_Model, Ci_Model, L2_Model and C2_Model models would be present in the container for that VRF. No other Li_Model or Ci_Model for another Leaf should be in the VRF container, and the presence of such a model would be a discrepancy.

FIG. 11 illustrates a deployment 1150. For example, as shown in FIG. 11, abc is on Leaf 1 and Leaf 2, but not on Leaf 3, while def is on Leaf 3, but not Leafs 1 or 2. As such, Checker 620 will validate the abc configuration is properly deployed on Leaf 1 and Leaf 2, and not on Leaf 3, and that the def configuration is properly deployed on Leaf 3 but not Leafs 1 or 2. Checker 620 can also validate the abc configuration on Leaf 1 and Leaf 2 is consistent with the abc configuration as defined in the L_Model, and that def configuration on Leaf 3 is consistent with the def configuration as defined in the L_Model.

In some examples, Checker 620 can perform set checks. For example, the checker can perform a set difference by which after conversion to common format the Li_Model set subtracted from the Ci_Model set, and the Ci_Model set is subtracted from the L_Model set; the sets are proper when then the results of both subtractions are the same. A mismatch would indicate missing or extra information that can result in, for example, lost packets in the fabric and extra information can create, for example, security issues in the fabric (where device can access other devices they do not have permission to ask).

While the example shows an L-C check, a C-H check can be realized. In some examples, after the checker has validated the configuration the spine proxies can be checked to determine the correct next hop.

At sequence 1040, one or more events can be generated. For example, when the validations are consistent (e.g., consistent with expectations of the validation) the application can generate an information event. In other examples, when one or more of the validations are not consistent (e.g., inconsistent with expectations of the validation), configurations are not on the correct leafs (according the L_Model) or when there are missing or extra information the application can generate an error event. The severity of the error event can at least be determined based on which validation is inconsistent and which device had the inconsistency (e.g., production device, test device, access point, border leaf, etc.).

The above VRF container check of BD deployment is an example of an application of a generic VRF container integrity check. When the VRF container is created, it can be populated with the L_Model, Li_Model, Ci_Model and/or Hi_Model that contain data relevant to/required by the check. Checker 620 can confirm the presence or absence of these models. By way of non-limiting examples, an appropriate Li_Model being present but a corresponding required Ci_Model not being present, would indicate an error in deployment. A Ci_Model being present but a required corresponding Li_Model not being present, would indicate improper extra information. An Li_Model or Ci_Model being present from another VRF, would also indicate improper extra information.

Security Contract between Logical Groups

Figure 12:
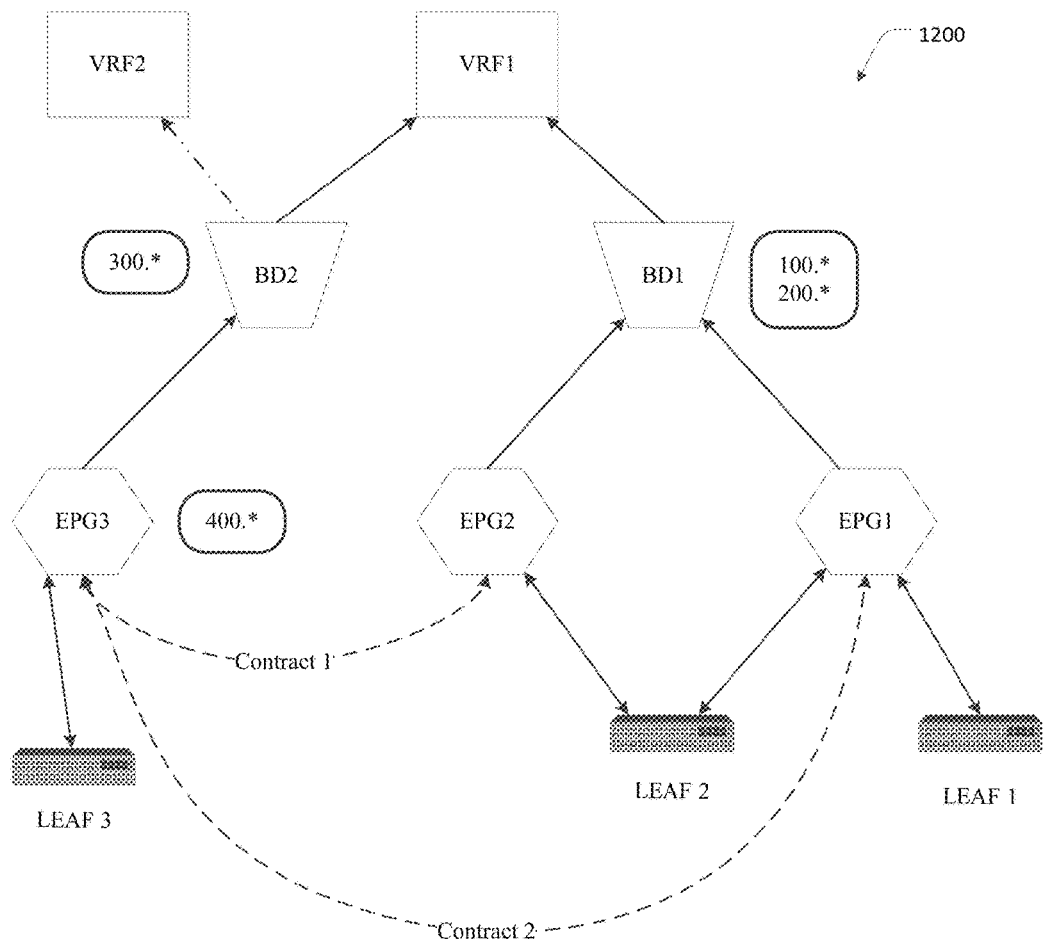
FIG. 12 illustrates an example network environment and configuration for network assurance of Cross Logical Groups/VRFs.
Figure 12:
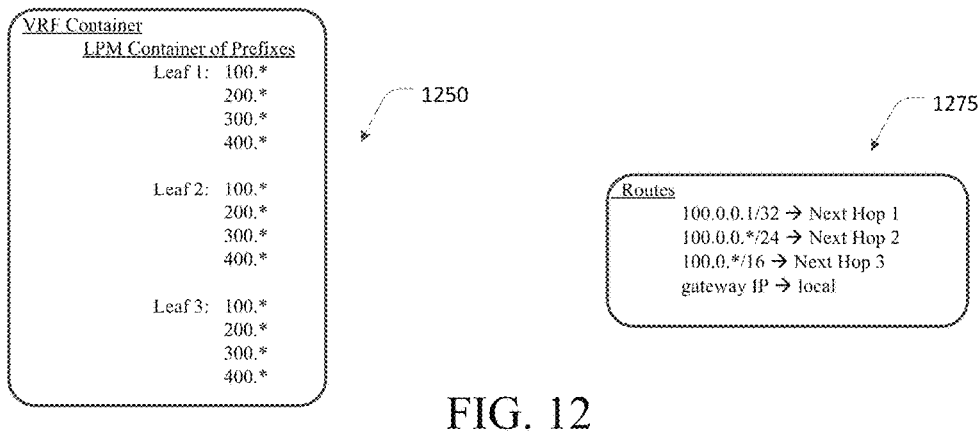

In some cases, there can be a security contract between endpoint groups (as illustrated below). In these cases the leafs will get the leaked subnets (and other information). Appliance 300 can perform an L-C check to determine if the RIB is properly programmed. For example, as illustrated in FIG. 12, when Contract 2 is configured, the RIB on Leaf 1 will include subnets 100.* and 200.* (e.g., from BD1) and subnets of BD2 (e.g., 300.*, 400.*) leaked from Contract 2. Also, Leaf 3 will include subnets 300.* and 400.* (from BD2) and subnets for BD1 (e.g., 100.* and 200.*) leaked from Contract 2. Without Contract 2 in place, Leaf 1 will not include BD2 subnets and Leaf 3 will however include BD1 subnets because of Contract 1.

Logical Groups (e.g., EPGs) cannot be properly deployed if there is a clash between two or more Logical Groups. For example, if Logical Groups are using same interface, subnets, encap VLANs etc. In one example, as shown in FIG. 7, Logical Group 1 (LG1) and Logical Group 2 (LG2) are initially independent from each other and do not clash. However, when Security Contract 750 is implemented, a clash between LG1 and LG2 subnets is possible. Subsequent a security contract being formed, the Logical Groups can be deployed on the leaf that hosts the Logical Groups (e.g., endpoints within the logical groups can communicate). After a security is formed between Logical Groups, the Logical Groups can be deployed on the leafs that host the Logical Groups and the leafs that host a Logical Group which is an endpoint to the contract (e.g., endpoints between logical groups that have a contract can communication). This enables the end points in the different Logical Groups to communicate with one another. For example, LG1 is on Leaf 1 and LG2 is on Leaf 2. After a security contract is formed between LG1 and LG2, LG1 subnets will be deployed on Leaf 2 and LG2 subnets will be deployed on Leaf 1. However, the communication between Logical Groups that have a contract can also share prefixes (e.g., routes) between the leafs, which can result in a conflict because of the existence of a common prefix between the logical groups; when the configurations of LG1 and LG2 would clash (e.g., same subnet), the deployment might fail and an event generated.

In some examples, the contract can be between Logical Groups that reside in different VRFs. In this situation, internal routing leaking can be performed between the VRFs, and the checks can be in Layer 3, discussed below.

FIG. 12 illustrates a graphical view of a tenant configuration 1200 of a network environment (e.g., Fabric 120). Tenant configuration 1200 can illustrate two BDs (e.g., BD1 and BD2) bound to the same VRF (e.g., VRF1). Each BD can have one or more assigned subnets. For example, BD1 can have assigned subnets 100.* and 200.*, and BD2 can have assigned subnets 300.*. One or more Logical Groups (e.g., EPGs) can be bound to the one or more BDs. For example, EPG1 and EPG2 can be bound to BD1 and EPG 3 can be bound to BD2. Each EPG can have one or more assigned subnets as well. For example, EPG3 has assigned subnet 00.*. Each EPG can point to one or more Leafs. For example, EPG1 can point to Leaf 1 and Leaf 2, EPG2 can point to Leaf 2 and EPG3 can point to Leaf 3.

In the above tenant configuration (e.g., 1200), the endpoints within an EPG can communicate with one another, however, endpoints of one EPG cannot communication with endpoints of a different EPG without a security contract. For example, endpoints of EPG3 cannot communication with endpoints of EPG2 without first having a security contract (e.g., Contract 1). When contract is in place between EPGs, endpoints of the EPGs subject to the contract can communicate. For example, when Contract 1 is in place, the endpoints in EPG3 and EPG2 can communicate.

When a security contract exists, the configurations (and subnets) will be deployed in the respectively connected Leafs. For example, when Contract 1 is in place, EPG2 subnets will be deployed on Leaf 3 and EPG3 subnets will be deployed on Leaf 2. As such, the subnets of BD1 (e.g., 100.* and 200.*) will be deployed on Leaf 3 and the subnets of BD2 (e.g., 300.*) and EPG3 (e.g., 400.*) will be deployed on Leaf 2.

When subnets are deployed on leafs, Appliance 300 can verify the subnets are properly deployed, for example, by looking at resulting configuration created by the security contracts as an L-C check. The subnets can be verified by the security contracts and can create a VRF container (e.g., 1250), as previously discussed. VRF container 1250, can include the Li_Model configurations including the configurations created by security contracts. For example, Leaf 1-3 can all include subnets 100.*, 200.* and 300.*. Subnet 300.* is accessible by Leaf 1 and 2 based on Contract 1 and subnet 300.* is a BD subnet. Leaf 2 and 3 can both have subnet 400.* accessible based on Contract 1. The Li_Model configuration can then be mapped to a Ci_Model configuration via the L-C check to determine consistency across the fabric.

Next Hop Check

Next, the application can determine if the next hops are proper. For example, each BD and EPG subnet should point to a spine proxy and the gateway IP should point to local. In some examples, route table 1275 can show the next hops for IP address and masks (e.g., using Longest Prefix Match). When an IP address of 100.0.0.1 comes in, the next hop will be Next Hop 1 because the full IP address is used (e.g., 32 bit mask in IPv4). When an IP address of 100.0.0.0/24 comes in, the next hop will be Next Hop 2 because mask of 28 (also shown as a *). This check can be a consistency check at the Ci_Model for the noted content.

RIB to FIB Equivalence

Appliance 300 can also determine that the RIB and FIB of a particular Leaf 104 or Spine 102 are consistent. The Routing Information Base (RIB) is contained within the LPM table of the Ci_Model of the particular Leaf 104 or Spine 102. The Forwarding Information Base (FIB) is contained within the LPM table of the Hi_Model of the particular Leaf 104 or Spine 102. The RIB to FIB check is a C-H check as described above on at least the overlapping fields of content that are specific to RIB and FIB operability.

Figure 13:
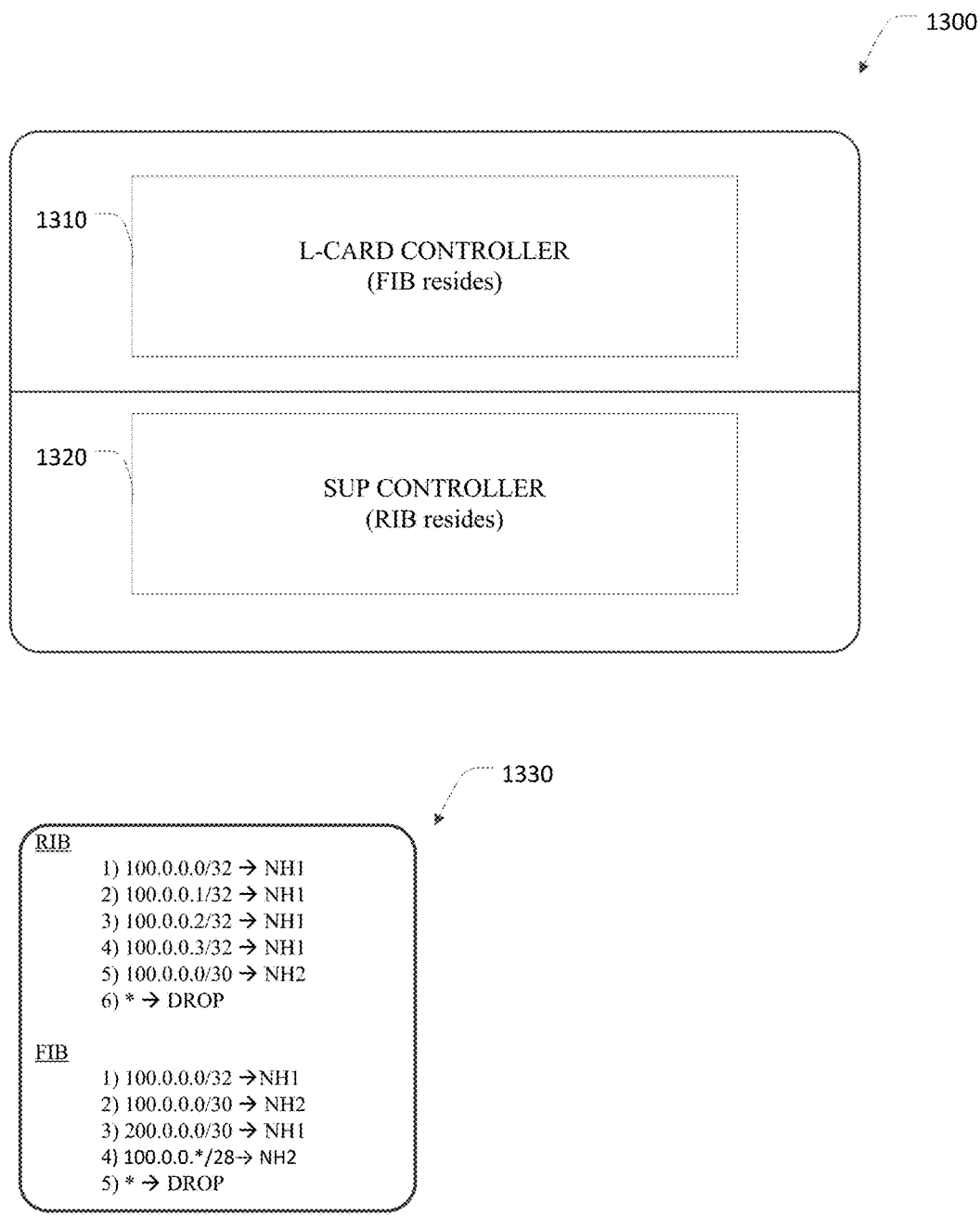
FIG. 13 illustrates an example network environment and configuration for network assurance of the RIB and FIB.

As illustrated in FIG. 13, device 1300 (e.g., Leaf 104, Spine 102, etc.) can include Line Card Controller 1310, where the FIB resides and SUP Controller 1320, where the RIB resides. The routing protocols works on the SUP level (software level). The RIB is compiled to the Line Card Controller, which physically programs to the hardware of the device. Appliance 300 can determine the equivalence by extracting the FIB and RIB and convert them to a common format, as illustrated by table 1330. Table 1330 can show an IP address (e.g., 100.0.0.0), a mask (e.g., 32) and one or more next hops (e.g., NH1, NH2, etc.). Table 1330 can also include a "catch all" (e.g., *→DROP). For example, when an IP address is received that does not match an IP address/mask, the catch all will drop the packets. The entries can be compared to determine there are no inconsistencies between the next hops.

Figure 14:
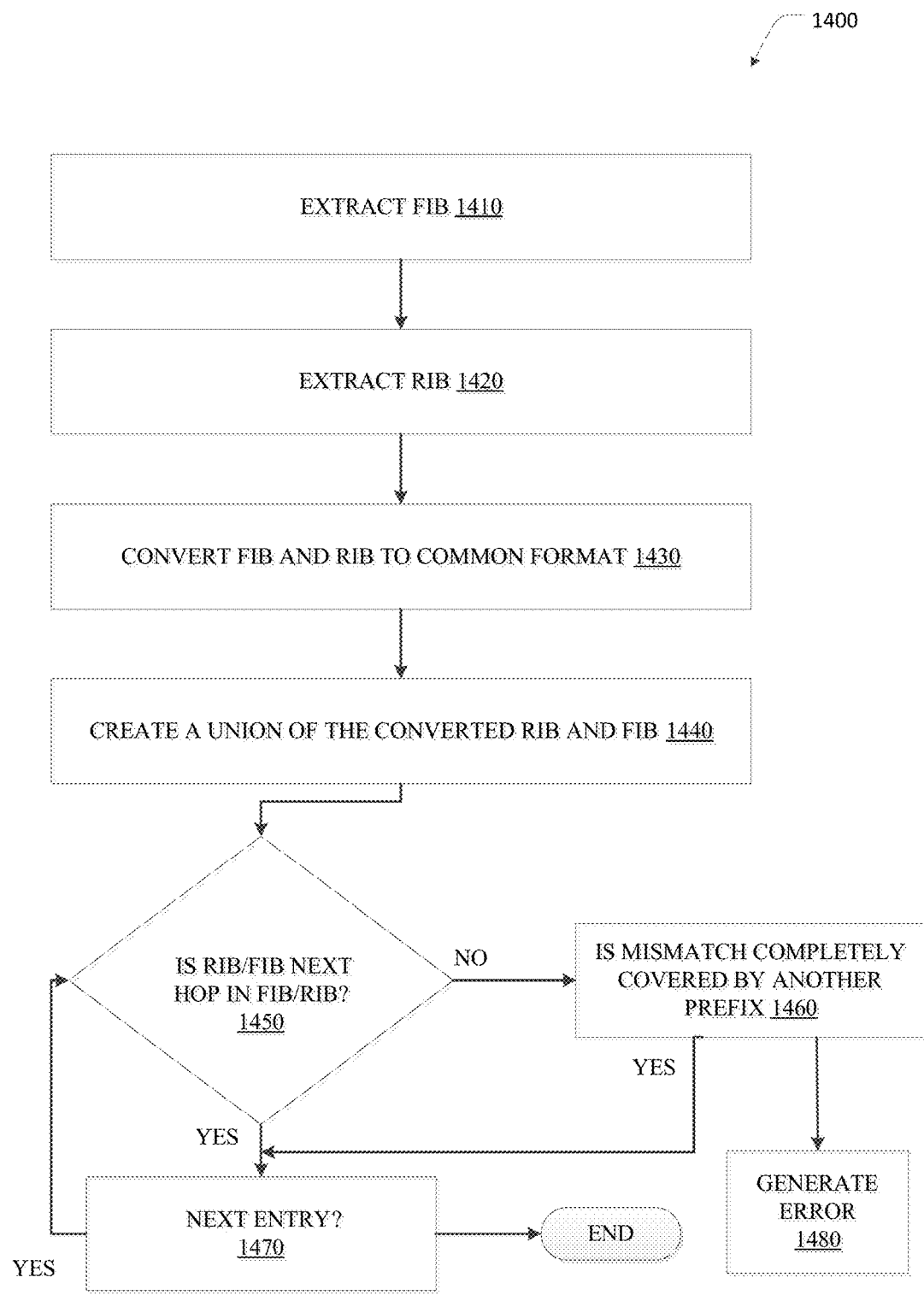
FIG. 14 illustrates an example method embodiment for network assurance of the RIB and FIB.

FIG. 14 illustrates an example flowchart for an example network assurance of a RIB-FIB equivalence of a network environment. The method shown in FIG. 14 is provided by way of example, as there are a variety of ways to carry out the method. Additionally, while the example method is illustrated with a particular order of sequences, those of ordinary skill in the art will appreciate that FIG. 14 and the sequences shown therein can be executed in any order that accomplishes the technical advantages of the present disclosure and can include fewer or more sequences than illustrated.

Each sequence shown in FIG. 14 represents one or more processes, methods or subroutines, carried out in the example method. The sequences shown in FIG. 14 can be implemented in a network environment such as network environment 100 shown in FIGS. 1A and 1B. The application can be present on Appliance 300 and/or Checker 620, although the application is not so limited.

Method 1400 can begin at sequence 1410. At sequence 1410, an application (e.g., Appliance 300) can extract a RIB from the SUP Controller of a device (e.g., Leaf 104, Spine 102, etc.). At sequence 1420, the application can extract a FIB from the Line Card Controller of the device. Both sequences 1410 and 1420 can entail polling one or more Leaf 104 or Spine 102 for the content, or in other examples obtaining the content from the received Ci_Model 624 and Hi_Model for one or more Leaf 104 or Spine 102.

At sequence 1430, the application can convert the extracted FIB and RIB to a common format (e.g., one of the FIB or RIB is converted into the format of the other, or both are converted to the same new format). At sequence 1440, the application can create a union of the converted RIB and FIB (e.g., a set union including lists all RIBs and FIBs without duplication), such as illustrated by Table 1330. Although shown as a collective table, the lists may be in distinct tables.

At sequence 1450, the application can identify a first entry in the RIB and determine if there is a matching IP address/mask in the FIB with a matching next hop. If such a match exists, then control passes to sequence 1470 to see if there is a next entry to consider. If so, control passes back to sequence 1450 to check the next entry (e.g., the next entry in the RIB, and then turning to the entries in the FIB s).

For example with respect to Table 1330, the first entry RIB 1) has an IP address/mask 100.0.0.0/32 with a next hop of NH1. The same IP address/mask 100.0.0.0/32 with a next hop of NH1 is found in the FIB, at FIB 1). Since the RIB and FIB entries match, method 1400 can proceed to the next entry sequence 1470. If there was no next entry then method 1400 can end. In this example there is a next entry of RIB 2), and thus control passes to sequence 1450 for the checking of the next entry of RIB 2).

At sequence 1450, if the application does not identify a matching FIB entry for the RIB entry under inspection, then control passes sequence 1460. At sequence 1460, the application can determine if the mismatch is covered by another prefix, for example, via Longest Prefix Match. When there is not another prefix and/or if the next hop does not match, an error can be generated at 1480.

For example with respect to Table 1330, the entry RIB 2) 100.0.0.1/32 does not have a matching FIB, and thus control passes to sequence 1460 to identify another covering prefix, which in this case exists as FIB 2) 100.0.0.*/30. If the next hops matched (between RIB 2 and FIB 2) control would pass to sequence 1450 for the next RIB entry. However, the next hops of RIB 2) and FIB 2) do not match (NH1 v. NH2) and the error is noted at sequence 1480 before control returns to sequence 1470 consider the next entry.

In some cases, the mismatch can be a non-entry in one of the tables. For example, FIB 3) 200.0.0.0/30 does not have a match in the RIB table, except the "catch all" (e.g., *→Drop). Any incoming IP address 200.0.0.0 will be dropped, even though the FIB table says route to NH1. In response to this type of mismatch, an error can be generated.

In some cases, there can be entries in a RIB or FIB that will not be used. For example, RIB 5) will never be used since combined RIB 1) to RIB 4) cover all IPs in RIB 5).

When all RIBs are examined, the process continues for the list of FIB s, and particularly those FIBs that were not accounted for by the initial RIB check. The process could also be reversed, in that the list of FIBs could be checked before RIBs. Or the system could switch between lists. The application is not limited to the manner in which the list of RIBs and FIBs is processed.

Validation of L3out (Internal-External Forwarding)

As shown above in FIG. 7, internal subnets (e.g., 100.2.*) can be leaked to external networks (e.g., Network Device 114) and external networks (e.g., 175.*) can be leaked to the Fabric. In order for communication to properly occur between the public subnets in the Fabric 120 and the external devices, Layer 3 out ("L3out") must be properly configured. Appliance 300 can determine that the L3out is properly configured.

The L3out interfaces model can include, at a minimum, leaf (e.g., border), port and network (e.g., 40.1.2.*). Border leafs can have L3out configured to access an outside device/network (e.g., Network Device 114). To deploy an L3out interface the leaf, port and network can be configured. For example, an operator can program Leaf N, port eth1/10 and network 40.1.2.* into L_Model 270A, for which in a manner discussed above Leaf N generates the corresponding CN_Model and HN_Model. Once configured, the link between Leaf N and Network Device 114 is important in transferring data external the fabric. In this case, network 40.1.2.* would own the link. The 100.2.* subnet (as shown in LPM Table 748) can be leaked to Network Device 114 (through L3out interface and link 40.1.2.*). The subnet is leaked through routing protocols, such as, BGP, OSPF, EIGRP, etc. For example, in the routing protocols there are two peers: peer1 is the border leaf (e.g., Leaf N) and peer2 is the external device (e.g., Network Device 114). The two peers will exchange their routes with each other. For example, peer1 can tell peer2 that it has public networks (e.g., 100.2.*) to leak outside the fabric and peer 2 can tell peer1 that it has external routes (e.g., 175.*) to be leaked inside the fabric.

L3out loopback is an interface for configuring networking protocols (e.g., BGP). Static routes can be programmed by the Fabric 120. For example, Network Device 114 can have network 200.* that has not been leaked to the Fabric 120. In these cases, the L_Model can directly program the 200.* network for communicating with an external router (e.g., Network Device 114). EPG (Instp) can be used to control import of external routes. For example, Network Device 114 can have several routes (e.g., 100.*, 300.*, 400.*, etc.) leaked to Fabric 120. These networks can be tagged with EPGs. For example, 100.* can be tagged with EPG1 (e.g., Logical Group 1), 300.* can be tagged with EPG2 (e.g., Logical Group 2) and 400.* can be tagged with EPG3 (e.g., Logical Group 3). As such, whenever an incoming packet comes into Fabric 120 from these networks, the packet will be tagged with the associated EPG.

Appliance 300 can perform checks on the L3out through an L-C Model check. For example, Appliance 300 can verify the interface, loopback, and static routes are programmed on the border leafs (e.g., present in the LPM Table). Appliance 300 can also verify one or more EPGs of L3out are correct. Appliance 300 can verify, for each network, the next hop is proper.

Figure 15:
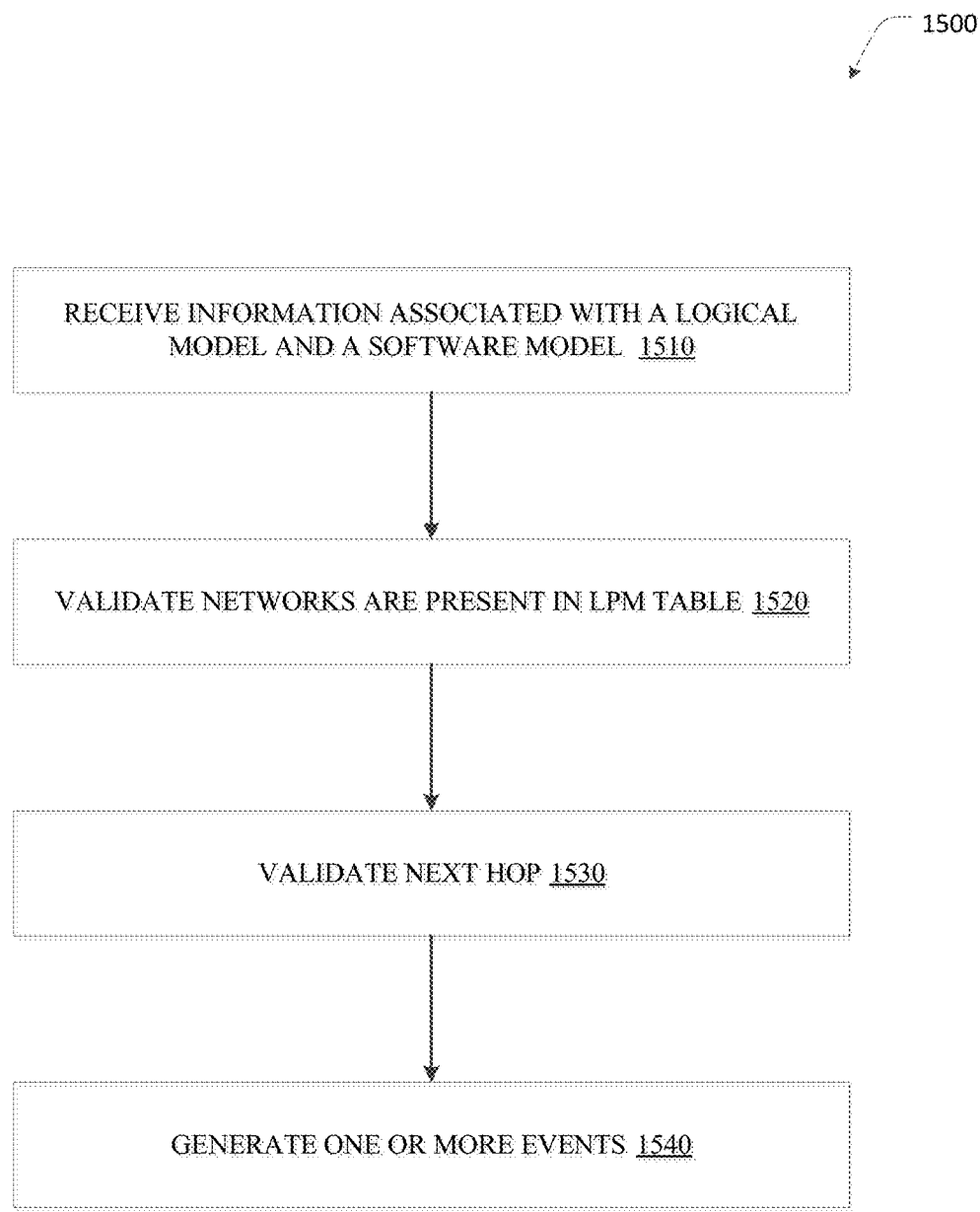
FIG. 15 illustrates an example method embodiment for network assurance of Layer 3 out.

FIG. 15 illustrates an example flowchart for an example network assurance of L3out configuration of a network environment. The method shown in FIG. 15 is provided by way of example, as there are a variety of ways to carry out the method. Additionally, while the example method is illustrated with a particular order of sequences, those of ordinary skill in the art will appreciate that FIG. 15 and the sequences shown therein can be executed in any order that accomplishes the technical advantages of the present disclosure and can include fewer or more sequences than illustrated.

Each sequence shown in FIG. 15 represents one or more processes, methods or subroutines, carried out in the example method. The sequences shown in FIG. 15 can be implemented in a network environment such as network environment 700 shown in FIG. 7. The application can be present on Appliance 300 and/or Checker 620, although the application is not so limited.

Method 1500 can begin at sequence 1510. At sequence 1510 the various models (e.g., L_Model, C_Model, and/or H_Model) to be checked are received. For example, one or more Leafs 104, Spines 102 and Controllers 116 in Fabric 120 can send to the application (e.g., Assurance Appliance 300) L_Model 270A/B, Ci_Model 274, and Ci_Model 276. Those received models can include information content that can be subject to the validation process. In some examples, the information relevant to an L3out assurance check can include interface (e.g., leaf, port, network), loopback (e.g., protocol), static routes, and EPG.

At sequence 1520, the application can validate networks configured to communicate through L3out are in the LPM Table (e.g., L3 Table). The LPM Table (e.g., C_Model) can contain configuration of the devices in the network (e.g., Leafs 104, Spines 102, etc.). The L_Models and C_Models can be converted to a common format as discussed above, and the relevant content of overlapping fields can be compared. For example, the L3out interface assurance considers the fields of leaf, port and network. Appliance 300 can validate that the leaf from the configuration has the port and network deployed as shown in the configuration (e.g., L_Model). Appliance 300 can perform similar validation for the loopback (consideration of fields of leaf and network) and static routes (consideration of the fields of leaf, network and next hop). EPG can be validated by the application as well via an L-C check.

At sequence 1530, the application can validate the next hops via C_Model consistency check. For example, validating the LPM Tables at each leaf includes next hop entries to communicate with the border leaf (e.g., for external communication). As shown in FIG. 7, Leaf 2 can include an LPM Table 742. LPM Table 742 can include subnets and next hops. As previously discussed, subnet 100.2.* has been leaked from Leaf N to Network Device 114 and when Leaf 2 wants to communication with the external network, data is routed through Leaf N (or another border leaf connected to Network Device 114). Appliance 300 can validate the next hop routes in the LPM tables of the leafs and spines are correct.

At sequence 1540, one or more events can be generated. For example, when the validations are consistent (e.g., consistent with expectations of the validation) the application can generate an informational event. In other examples, when one or more of the validations are not consistent (e.g., inconsistent with expectations of the validation), configurations are not on the correct leafs (according the L_Model) or when there are missing or extra information the application can generate an error event. The severity of the error event can at least be determined based on which validation is inconsistent and which device had the inconsistency (e.g., production device, test device, access point, border leaf, etc.).

Validation of BD-L3out Configuration (Internal-External Forwarding)

Figure 16:
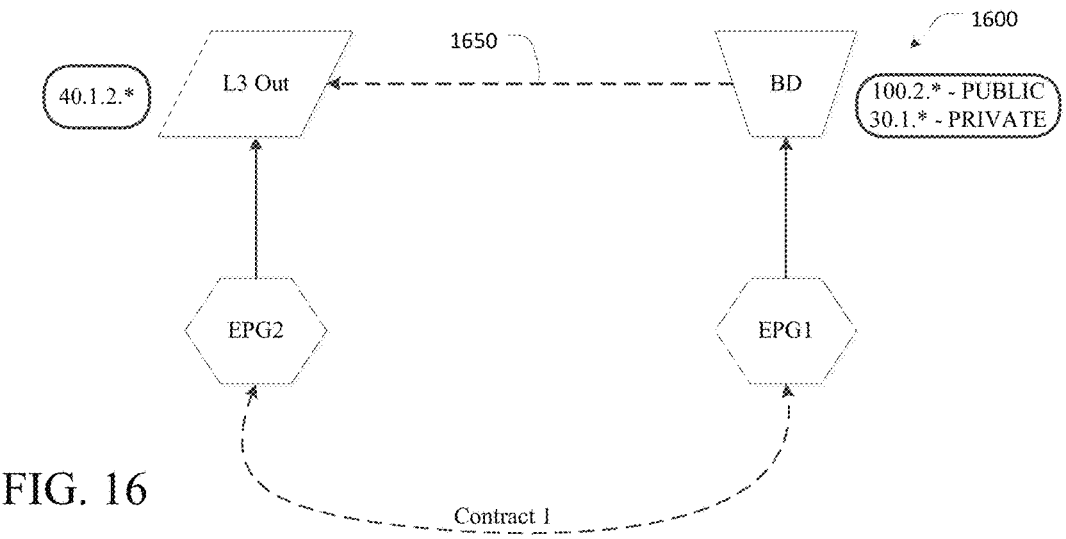
FIG. 16 illustrates an example network diagram for BD-L3out association.

BD-L3out association enables internal networks to be leaked external to the fabric, that is, the external router should know about internal networks and where data should be routed for accessing the internal networks (e.g., internal Fabric 120). As shown in FIG. 7, Leaf 2 has a public network 100.2.*. For network 100.2.* to be accessed from outside the fabric (e.g., by network device 114), the BD-L3out association can be configured. As shown in FIG. 16, the BD-L3out association can include, BD subnet is marked public (e.g., 100.2.*), BD is associated with L3out (e.g., 1650) and a security contract exists between the EPG of BD and EPG of L3out (e.g., Contract 1). When BD subnet is marked public and BD is associated with L3out, routing can work properly external to the fabric.

Appliance 300 can validate these BD-L3out configuration conditions. In particular, Appliance 300 can confirm that the models reflect that the internal networks have in fact been leaked. This specific check uses a series of L_Model consistency checks (or a single check that considers multiple fields of information).

Figure 17:
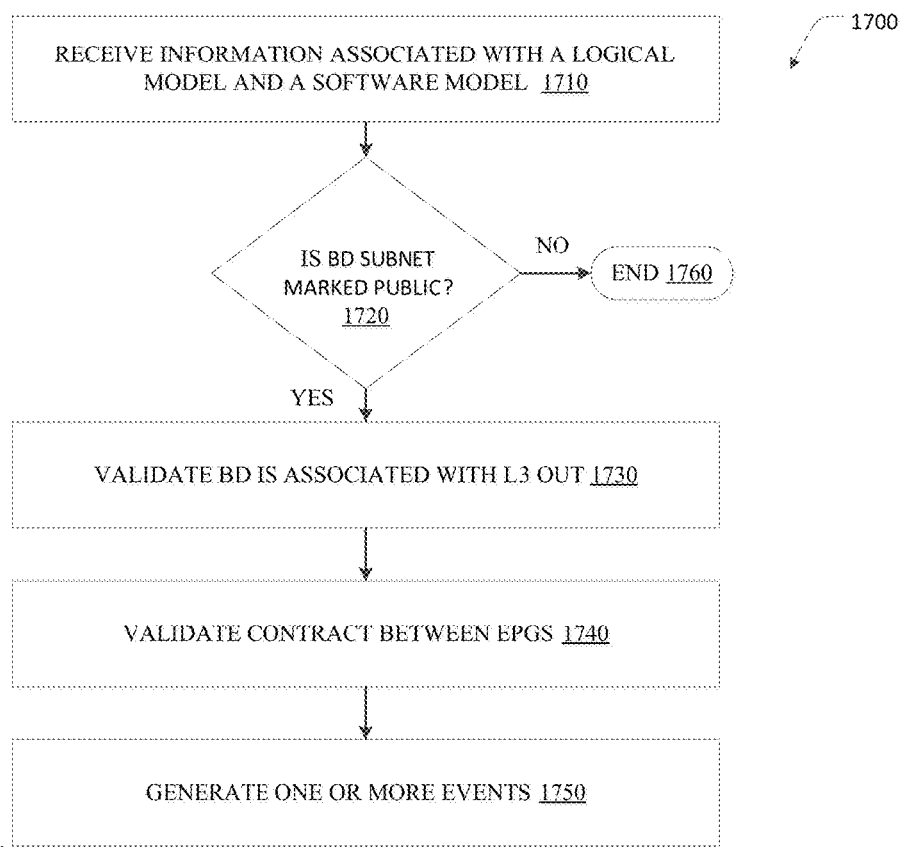
FIG. 17 illustrates an example method embodiment for network assurance of BD-L3out association.

FIG. 17 illustrates an example flowchart for an example network assurance of BD-L3out association configuration of a network environment. The method shown in FIG. 17 is provided by way of example, as there are a variety of ways to carry out the method. Additionally, while the example method is illustrated with a particular order of sequences, those of ordinary skill in the art will appreciate that FIG. 17 and the sequences shown therein can be executed in any order that accomplishes the technical advantages of the present disclosure and can include fewer or more sequences than illustrated.

Each sequence shown in FIG. 17 represents one or more processes, methods or subroutines, carried out in the example method. The sequences shown in FIG. 17 can be implemented in a network environment such as network environment 700 shown in FIG. 7 and network diagram 1600 shown in FIG. 16. The application can be present on Appliance 300 and/or Checker 620, although the application is not so limited.

At sequence 1710 the various models (e.g., L_Model, C_Model, and/or H_Model) to be checked are received. For example, each Controller 116 in the Fabric 120 can send to the application (e.g., Assurance Appliance 300 and/or Checker 620) one or more L_Models 270A/B, and one or more Leafs 104 and Spines 102 can send corresponding Ci_Model 274, and Ci_Model 276. In another example, some but not all of the L_Model, C_Model, and/or H_Model configurations are provided and/or received. Those received models can include information content, at least some of which will be subject to the validation process. In some examples, the information can include L3out configuration data and BD configuration data.

At sequence 1720, the application via an L_Model consistency check identifies whether any BD subnets are marked public. In some examples, BD subnets in the fabric are configured to be private, shared, etc. In order to be marked public, the operator must specify the subnet as public in L_Model 270A and push the configuration to the Controller 116. The application can verify via an L-Model consistency check whether any BD subnet in the received L_Model 622 is marked public. If not, then this check ends at sequence 1760. If one or more of the BD subnets in the received L_Model 622 are marked as public, then the process continues at 1730 for each subnet identified as public; the process will be described with respect to a single subnet so identified, although it is to be understood that the process would also apply to multiple identified subnets.

At sequence 1730, the application via an L_Model consistency check can validate the public BD is associated with an L3out. The BD is associated with L3out through the BD configuration. The BD configuration can be programmed by the operator in L_Model 270A at the Controller 116 (e.g., Tenant Configuration 740), and which can subsequently arrive at checker 620 via sequence 1710 above. An example of a BD-L3out association 1650 is shown in FIG. 16. The application can verify the association via an L-Model consistency check.

At sequence 1740, the application via an L_Model consistency check can validate a contract between the EPGs (e.g., Logical Groups). As shown above, the L3out can have an EPG (e.g., EPG2) and BD can have an EPG (e.g., EPG1). When a contract (e.g., Contract 1) has been formed between the EPGs, the associated endpoints can then communicate. Appliance 300 can validate that a security contract is present between the EPG under L3out and the EPG under BD.

At sequence 1750, one or more events can be generated. For example, when the validations are consistent (e.g., consistent with expectations of the validation) the application can generate an information event. In other examples, when one or more of the validations are not consistent (e.g., inconsistent with expectations of the validation), configurations are not on the correct leafs (according the L_Model) or when there is missing or extra information the application can generate an error event. The severity of the error event can at least be determined based on which validation is inconsistent and which device had the inconsistency (e.g., production device, test device, access point, border leaf, etc.).

Proper Propagated Learned (Imported) Routes

Learned Routes (e.g., imported routes) are external networks that are leaked (i.e., imported) inside the Fabric 120. The external networks (e.g., to be leaked) can be networks that an external device (e.g., Network Device 114) wants to share with the Fabric 120 via a border leaf (e.g., Leaf N). The Fabric 120 can in theory import all networks provided by the external router or only specific external networks. The decisions can be based on resources of the network devices, for example the LPM table. When all external routes are imported, for example thousands of networks, expensive resources are utilized by storing these learned routes at each network device (e.g., Leafs 104, Spines 102, etc.). The learned routes populate the LPM Tables stored in the TCAM of each network device. Overpopulating these resources can affect the efficiency and overall operation of the fabric. The border leaf (e.g., Leaf N) can decide (e.g., based on operator intent) which external networks to import.

The deployment of the instruction to permit a leak of a particular external network is programmed by the operator into the L_Model 270A, and can identify for a particular border Leaf 104 (e.g., Leaf N) what network(s) can be leak into Fabric 120. The particular border Leaf 104 (e.g., Leaf N) can store the permissible network(s) in EPGs defined in the L3out table (e.g., table 1806 for Leaf N) within the Ci_Model 274.

When an external device (e.g., Network Device 114) wants to share an external network with the Fabric 102 via a border leaf (e.g., Leaf N), the border leaf (e.g., Leaf N) initially determines from its L3out table whether import of that network is permissible. If permissible, the border leaf (e.g., Leaf N) sets that external device as the next hop in the LPM table (e.g., 748 for Leaf N). The L3out of the border Leaf (e.g., Leaf N) is under a particular VRF, and as the "source" of the leak the border Leaf propagates (e.g., leaks) that learned route to other Leafs 104 (e.g., student leafs) which have an L3out or BD that is under that same particular VRF. Those "student" Leafs 104 will store the learned route in their LPM table (e.g., 1802 for Leaf 1 and 742 for Leaf 2) and set the next hop to the source Leaf (e.g. Leaf N). By virtue of the source Leaf and the student Leaf having L3out and/or BD under the same VRF, these source and student Leafs 104 define a "VRF Leaf Group."

Non-limiting examples of learned routes are illustrated in Fabric 120 of FIG. 7. L_Model 270A/B contains instructions for Leaf N that it can import from external network 175.*. Leaf N includes this in its CN_model 272 as an L3out in LPM table 1806. An external Network Device 114 wants to export networks to Fabric 120 through Border Leaf N, for example, external subnets 175.*, 185.*, 195.* as listed in routing and forwarding table 744 of Network Device 114. Border Leaf N can import network 175.* (e.g., EPG (175.*) because it is listed in table 1806, but cannot import networks 185.* and 195.* because they are not present in table 1806. Border Leaf N updates table 748 along with the next hop indictor of network device 114 (175.*→Device 114). Border Leaf N can then spreads the leak to the remainder of the VRF Leaf Group, which in this case includes Leaf 1 and Leaf 2. Leaf 1 and Leaf 2 can update their LPM table (e.g., 1802, 742) at the Ci_Model 274 level to reflect the import of 175.* and set Leaf N as the corresponding next hop to reflect it is the source Leaf (e.g., 175.*→Leaf N).

In some examples, multiple border Leafs import a network from the same external device. In FIG. 7, Leaf 3 is also a border leaf as shown by dashed line 1804 to external Network Device 114, and as such also imports network 175.* and propagates the imported networks to Leafs 1 and 2. The LPM tables (e.g., 1802, 742) reflect that the next hop can be either Leaf 3 or Leaf N (e.g., 175.*→Leaf 3, N).

In some examples, the LPM tables may have errors. For example, the LPM Table of the devices (e.g., 1802, 742, etc.)

can include equivalent learned routes as the LPM Table of the border leaf (e.g., 748). Turning to FIG. 7, the LPM Table of Leaf 2 (e.g., 742) shows an equivalent learned route (e.g., 175.*) as in Border Leaf N, while the LPM Table of Leaf 1 (e.g., 1802) shows an extra learned route (e.g., 185.*) not in border Leaf N. Network 185.* was not authorized for importation by L_Model 270A. The presence of learned route 185.* is thus a discrepancy and can generate an error.

Figure 18:
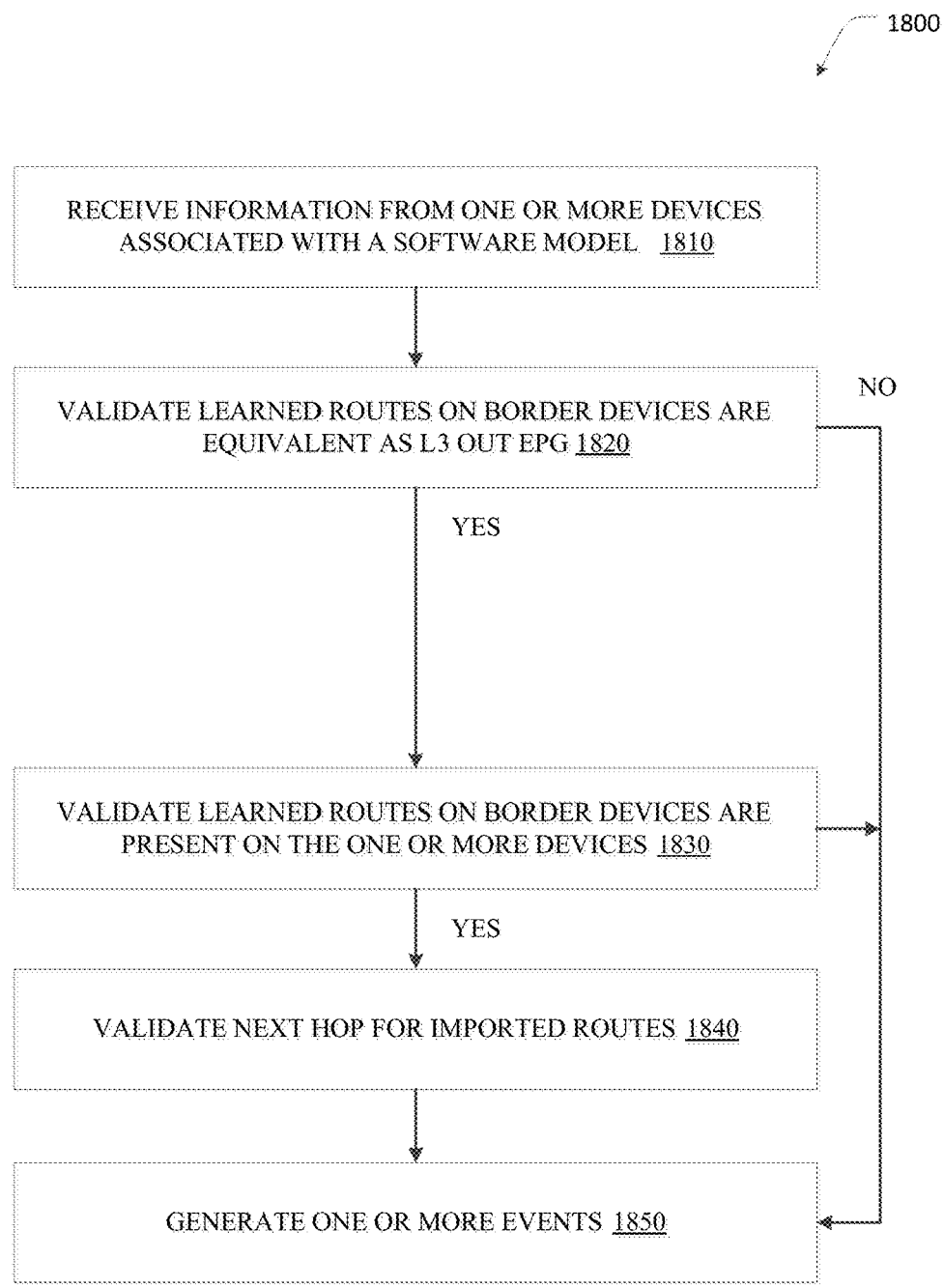
FIG. 18 illustrates an example method embodiment for network assurance of Learned Routes.

FIG. 18 illustrates an example flowchart for an example network assurance of learned routes of a network environment. The method shown in FIG. 18 is provided by way of example, as there are a variety of ways to carry out the method. Additionally, while the example method is illustrated with a particular order of sequences, those of ordinary skill in the art will appreciate that FIG. 18 and the sequences shown therein can be executed in any order that accomplishes the technical advantages of the present disclosure and can include fewer or more sequences than illustrated.

Each sequence shown in FIG. 18 represents one or more processes, methods or subroutines, carried out in the example method. The sequences shown in FIG. 18 can be implemented in a network environment such as network environment 700 shown in FIG. 7. The application can be present on Appliance 300 and/or Checker 620, although the application is not so limited.

Method 1800 can begin at sequence 1810. At sequence 1810, an application (e.g., Assurance Appliance 300) can receive various models (e.g., L_Model, C_Model, and/or H_Model) to be checked. For example, each Controller 116 in the Fabric 120 can send to the application (e.g., Assurance Appliance 300 and/or Checker 620) one or more L_Models 270A/B, and each Leaf 104 and Spine 102 sends its corresponding Ci_Model 274, and Ci_Model 276. In another example, some but not all of the L_Model, C_Model, and/or H_Model configurations are provided and/or received. Those received models will include information content, at least some of which will be subject to the validation process. For example, each border leaf (e.g., Leaf 3, Leaf N, etc.) in the Fabric 120 can send to the application, information associated with software model (C_Model). In some examples, the information can be the LPM Table (e.g., L3 Table) and L3out configuration.

Learned routes can be present in the LPM Table within the Ci_Model 274 of border nodes (e.g., border Leaf) and the EPG of L3out in the L_Model 270A. At sequence 1820, the application examines the Ci_Model 624 for one or more border Leafs along with the L_Model 622 to confirm that the learned routes are consistent with each other. For example, when the EPG of L3out includes the imported route 175.*, the LPM Table should include 175.* as an imported route (and no other learned routes, unless imported from a different border leaf or a different L3out). In response to discrepancies of the learned routes between EPG of L3out and the LPM Table an error event can be generated (e.g., at sequence 1860). In response to no discrepancies, an informational event can be generated.

Sequence 1820 may require a common format step for Ci_Model 624 and L_Model 622, although the subject matter of interest may be extract from overlapping fields of the models the common format as well as from fields in the models that do not overlap.

At sequence 1830, the application can validate the learned routes are present on the "source" are "student" leafs (e.g., where the VRF for the EPG/Logical Groups are present). The application thus checks the Ci_Model 624 configuration for all of Leafs within a common VRF Leaf Group to confirm that the learned routes are consistent across the group. This is can be a C-Model level consistency check per Ci_Model and across multiple Ci_Models. With respect to FIG. 7, this check would confirm that all listings of 175.* are proper in those Leafs; it would also identify that network 185.* is improperly listed in 1802 and trigger a corresponding error event.

At sequence 1840, the application can validate the next hops for the imported routes. For a learned route in a source Leaf, this is a Ci_Model level consistency check to validate that the next hop is directed to the external device. By way of non-limiting example, in FIG. 7 the CN_Model for Leaf N is checked to confirm that the next hop for network 175 is the external device that requested import (e.g., 175.*→Device 114). In the example of a learned route in a student leaf, this is a Ci_Model level consistency check to validate that the next hop is directed to the source Leaf(s). By way of non-limiting example, in FIG. 7 the Ci_Model for Leafs 1 and 2 are checked to confirm that the learned routes (e.g., 175.*) are directed to the border leafs (e.g., Leaf 3 and N). When there is more than one border leaf and two next hops (e.g., 175, e.g., 175.*→Leaf 3, N) the application can validate both next hops (for network redundancy this is common).

When routing between two next hops, the leaf (e.g., Leaf 1) can compute a hash based on flow (e.g., source IP, source port, destination IP, destination port, etc.). The computed hash will be modulo with the number of border leafs. In this example, there are two border leafs so the computed hash modulo 2 (e.g., hash % 2). The routing would then be sprayed among the modulo output.

At sequence 1850, one or more events can be generated. For example, when the validations are consistent (e.g., consistent with expectations of the validation) the application can generate an information event. In other examples, when one or more of the validations are not consistent (e.g., inconsistent with expectations of the validation), configurations are not on the correct leafs (according the L_Model) or when there are missing or extra information the application can generate an error event. The severity of the error event can at least be determined based on which validation is inconsistent and which device had the inconsistency (e.g., production device, test device, access point, border leaf, etc.).

Detection of Overlapping Subnets

An overlapping subnet in a network (e.g., Fabric 120) can cause misrouting and lost packets during forwarding (e.g., using LPM). In a fabric there can be multiple networks in each VRF, for example, BD subnets; EPG subnets (function same as BD subnets); L3out interface; L3out loopback; L3out static routes; L3out loopbacks; learned routes; etc. These multiple networks can be determined by operator intent or imported (e.g., learned). Each of the networks (e.g., subnets) can have an IP address and a mask (e.g., IPv4, IPv6, etc.). The mask determines how much of the IP address is used in forwarding data (e.g., LPM). For example, an IP/mask of 200.1.1.1/16 would be used as 200.1.* because the last 16 bits (in an IPv4 address) are masked.

Figure 19:
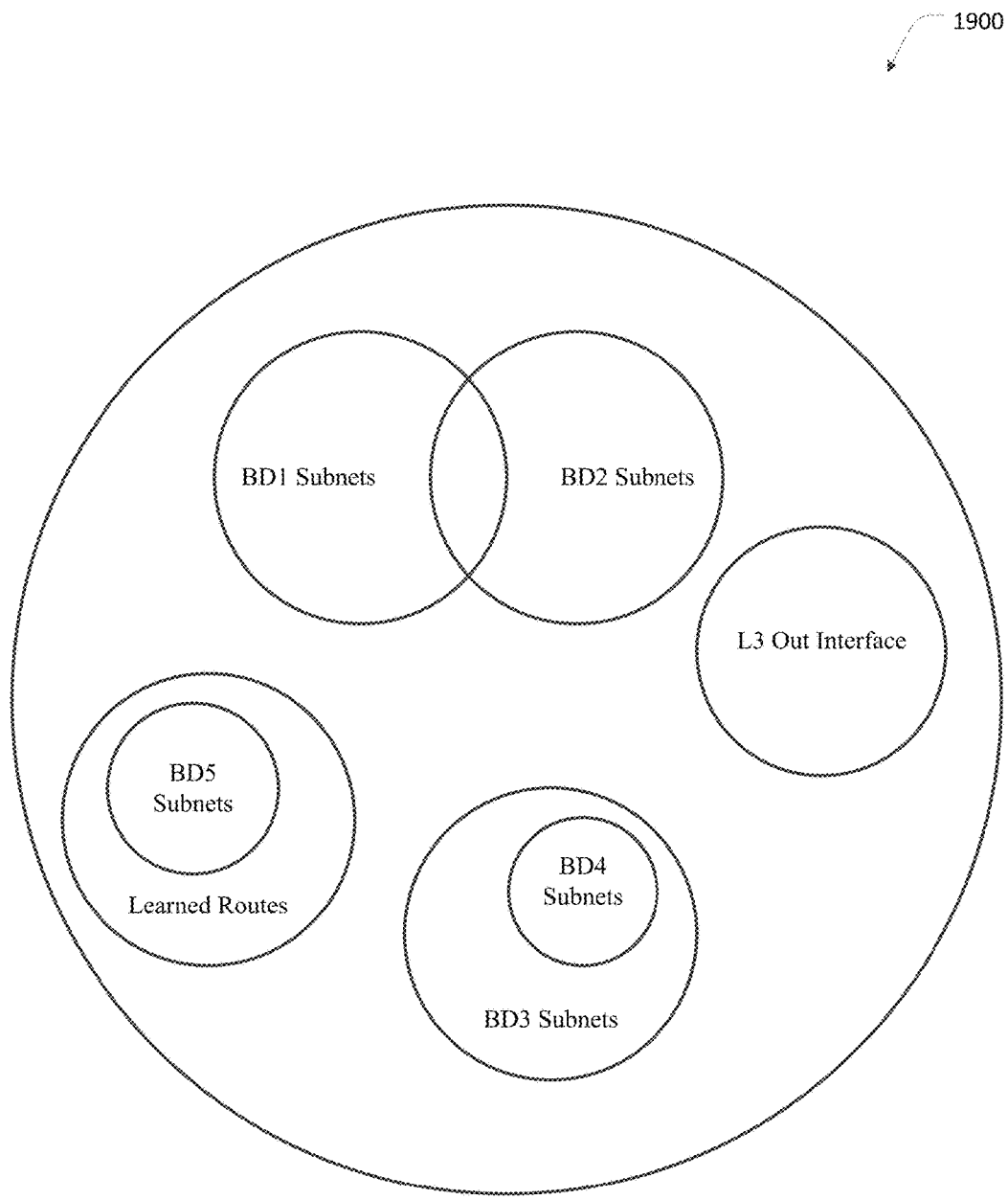
FIG. 19 illustrates an example diagram of subnet overlaps.

FIG. 19 illustrates network diagram 1900 of potential subnet overlaps and exceptions. Generally, subnets in a fabric can be spread out across the possible subnets. However, operator intent (e.g., misintent) and masks can create unintended overlap. For example, BD1 subnets and BD2 subnets can overlap in that BD1 and BD2 can be configured with at least one identical subnets (e.g., both are configured with a subnet of 100.1.1.1). In this example, there is an overlap and an event is generated. In other examples, this overlap can be constrained by the mask. For example, BD1 can have a mask of 32 (e.g., 100.1.1.1/32) and BD2 can have a mask of 24 (e.g., 100.1.1.1/24). In this example, when forwarding data BD1 would have subnet 100.1.1.1 and BD2 would have subnet 100.1.1.*. As such, anything other than 100.1.1.1 would be forwarded to BD2.

While the above overlap is constrained by the mask, a complete overlap is still possible as shown by BD3 subnets and BD4 subnets. For example, BD3 subnets can include 200.1.1.0/16 and BD4 subnets can include 200.1.1.1/24. In this example, while the subnets are different, the mask would overlap them, BD3 subnet would be 200.1.* and BD4 subnet would be 200.1.1.*. As such, any forwarding to 200.1.1.0 (or 200.1.1.*) would go to BD4 subnet even though the intent could be to send to BD3 subnet (because LPM). This overlapping would generate an event. One exception to this would be if BD3 and BD4 were the same BD (e.g., forwarding would be to the same BD so no clash).

In some situations, the EPGs to which there is a security contract can be in different VRFs, as shown in FIG. 12 (e.g., dashed line from BD2 to VRF2). For example, BD2 can be bound to VRF2 and BD1 can be bound to VRF1. When Security Contract 2 is formed between EPG3 (bound to BD2) and EPG1 (bound to BD1) the subnets from BD2 (e.g., 300.* and 400.*) are leaked to VRF1 and the subnets from BD1 (e.g., 100.* and 200.*) are leaked to VRF2. Once, the subnets are leaked, VRF1 cannot use subnets 300.* and 400.* independently and VRF2 cannot use subnets 100.* and 200.* independently without their being a clash of subnets. Appliance 300 is configured to verify and check there are no clashes between subnets when contracts are formed between EPGs.

There are some exceptions to the overlapping which are shown by the Learned Routes and BD5 subnets. In this example, the Learned Routes can have a subnet of 200.* (e.g., mask 8) and BD5 subnet can have a subnet of 200.1.1.*. The BD5 subnet is owned by the fabric (e.g., internal) and the Learned Routes is owned external. In this example, the overlap does not matter as when using LPM because anything with a 200.1.1.XXX will be forwarded to BD5, and everything else will be forwarded external. As such, internal routing is given preference over external and there will be no misrouting of data. However, when the situations are reversed (BD5 subnet being 200.* and external being 200.1.1.*), the internal network is not provided preference and internal data could be sent outside the fabric, and an error can be generated.

Figure 20:
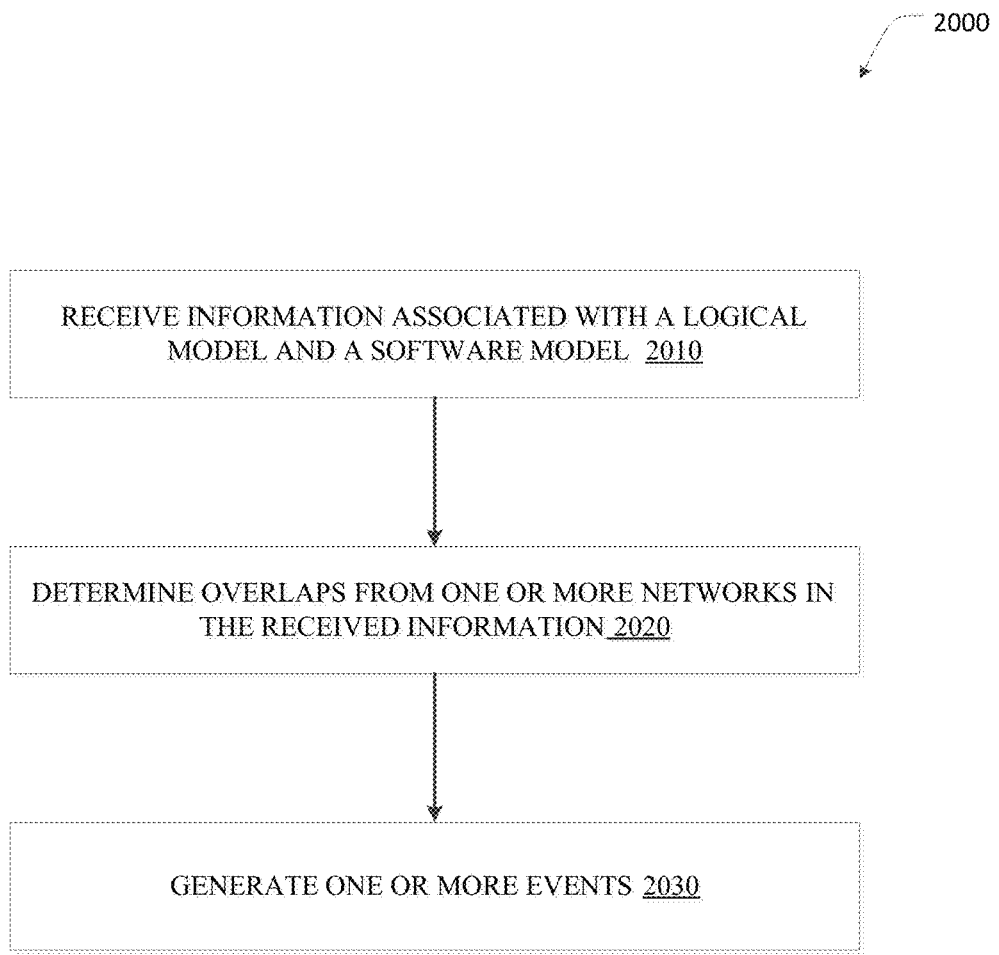
FIG. 20 illustrates an example method embodiment for network assurance of overlapping subnets.

FIG. 20 illustrates an example flowchart for an example network assurance of learned routes of a network environment. The method shown in FIG. 20 is provided by way of example, as there are a variety of ways to carry out the method. Additionally, while the example method is illustrated with a particular order of sequences, those of ordinary skill in the art will appreciate that FIG. 20 and the sequences shown therein can be executed in any order that accomplishes the technical advantages of the present disclosure and can include fewer or more sequences than illustrated.

Each sequence shown in FIG. 20 represents one or more processes, methods or subroutines, carried out in the example method. The sequences shown in FIG. 20 can be implemented in a network environment such as network environment 700 shown in FIG. 7 and network diagram 1900 shown in FIG. 19. The application can be present on Appliance 300 and/or Checker 620, although the application is not so limited.

Method 2000 can begin at sequence 2010. At sequence 2010 an application (e.g., Assurance Appliance 300) receives various models (e.g., L_Model, C_Model, and/or H_Model) to be checked. For example, one or more Controllers 116 in the Fabric 120 can send to the application (e.g., Assurance Appliance 300 and/or Checker 620) one or more L_Models 270A/B, and one or more Leafs 104 and Spines 102 can send corresponding Ci_Model 274, and Ci_Model 276. In another example, some but not all of the L_Model, C_Model, and/or H_Model configurations are provided and/or received. Those received models will include information content, at least some of which will be subject to the validation process. In some examples, the information can include the multiple networks in each VRF (e.g., from the LPM table, tenant config, etc.).

At sequence 2020, the application can determine impermissible overlap between the received networks for each VRF (e.g., in the L_Models received). Subnets can be found in the L_Model 270A/B, and learned routes can be found in individual Ci_Model 274 configuration for each VRF. All of these subnets, including learned routes, can be examined to direct an overlap. An overlap for which no exception exists constitutes a discrepancy.

At sequence 2030, one or more events can be generated. For example, when the validations are consistent (e.g., consistent with expectations of the validation) the application can generate an information event. In other examples, when one or more of the validations are not consistent (e.g., inconsistent with expectations of the validation), configurations are not on the correct leafs (according the L_Model) or when there are missing or extra information the application can generate an error event. The severity of the error event can at least be determined based on which validation is inconsistent and which device had the inconsistency (e.g., production device, test device, access point, border leaf, etc.).

The foregoing embodiments have been described with reference to a Leaf/Spine topology. However, the application is not so limited, and the methodologies can be applied to other topologies.

The disclosure now turns to FIGS. 21 and 22, which illustrate example network devices and computing devices, such as switches, routers, load balancers, client devices, and so forth.

FIG. 21 illustrates an example network device 2100 suitable for performing switching, routing, load balancing, and other networking operations. Network device 2100 includes a central processing unit (CPU) 2104, interfaces 2102, and a bus 2110 (e.g., a PCI bus). When acting under the control of appropriate software or firmware, the CPU 2104 is responsible for executing packet management, error detection, and/or routing functions. The CPU 2104 can accomplish all these functions under the control of software including an operating system and any appropriate applications software. CPU 2104 may include one or more processors 2108, such as a processor from the INTEL X86 family of microprocessors. In some cases, processor 2108 can be specially designed hardware for controlling the operations of network device 2100. In some cases, a memory 2106 (e.g., non-volatile RAM, ROM, etc.) also forms part of CPU 2104. However, there are many different ways in which memory could be coupled to the system.

The interfaces 2102 are typically provided as modular interface cards (sometimes referred to as "line cards"). Generally, they control the sending and receiving of data packets over the network and sometimes support other peripherals used with the network device 2100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 21 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 2100.

Regardless of the network device's configuration, it may employ one or more memories or memory modules (including memory 2106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 2106 could also hold various software containers and virtualized execution environments and data.

The network device 2100 can also include an application-specific integrated circuit (ASIC), which can be configured to perform routing and/or switching operations. The ASIC can communicate with other components in the network device 2100 via the bus 2110, to exchange data and signals and coordinate various types of operations by the network device 2100, such as routing, switching, and/or data storage operations, for example.

FIG. 22 illustrates a computing system architecture 2200 wherein the components of the system are in electrical communication with each other using a connection 2205, such as a bus. Exemplary system 2200 includes a processing unit (CPU or processor) 2210 and a system connection 2205 that couples various system components including the system memory 2215, such as read only memory (ROM) 2220 and random access memory (RAM) 2225, to the processor 2210. The system 2200 can include a cache of high-speed memory connected directly with, in close proximity to, or integrated as part of the processor 2210. The system 2200 can copy data from the memory 2215 and/or the storage device 2230 to the cache 2212 for quick access by the processor 2210. In this way, the cache can provide a performance boost that avoids processor 2210 delays while waiting for data. These and other modules can control or be configured to control the processor 2210 to perform various actions. Other system memory 2215 may be available for use as well. The memory 2215 can include multiple different types of memory with different performance characteristics. The processor 2210 can include any general purpose processor and a hardware or software service, such as service 1 2232, service 2 2234, and service 3 2236 stored in storage device 2230, configured to control the processor 2210 as well as a special-purpose processor where software instructions are incorporated into the actual processor design. The processor 2210 may be a completely self-contained computing system, containing multiple cores or processors, a bus, memory controller, cache, etc. A multi-core processor may be symmetric or asymmetric.

To enable user interaction with the computing device 2200, an input device 2245 can represent any number of input mechanisms, such as a microphone for speech, a touch-sensitive screen for gesture or graphical input, keyboard, mouse, motion input, speech and so forth. An output device 2235 can also be one or more of a number of output mechanisms known to those of skill in the art. In some instances, multimodal systems can enable a user to provide multiple types of input to communicate with the computing device 2200. The communications interface 2240 can generally govern and manage the user input and system output. There is no restriction on operating on any particular hardware arrangement and therefore the basic features here may easily be substituted for improved hardware or firmware arrangements as they are developed.

Storage device 2230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2225, read only memory (ROM) 2220, and hybrids thereof.

The storage device 2230 can include services 2232, 2234, 2236 for controlling the processor 2210. Other hardware or software modules are contemplated. The storage device 2230 can be connected to the system connection 2205. In one aspect, a hardware module that performs a particular function can include the software component stored in a computer-readable medium in connection with the necessary hardware components, such as the processor 2210, connection 2205, output device 2235, and so forth, to carry out the function.

For clarity of explanation, in some instances the present technology may be presented as including individual functional sequences including functional sequences comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

We claim:

1. A system for performing a network assurance check of proper deployment of a configuration in a fabric, comprising:
   at least one memory configured to store data; and
   at least one processor operable to execute instructions associated with the data, which when executed by the at least one processor, causes the processor to perform operations comprising:
   receive, from a controller, a global logical model in a first format, the global logical model containing instructions on how endpoints connected to a fabric communicate within each other through one or more network devices within the fabric;
   receive, from a network device within the fabric:
      a software model being at least a subset of instructions from the global logical model in a second format executable on the network device, the subset of instructions being device specific instructions from the global logical model that are specific to operability of the network device, wherein the software model was created by the network device from a portion of the global logical model that is specific to how the network device communicates to the fabric; and
      a hardware model of hardware configurations of the network device, wherein the hardware model was created by the network device from the software model;
   validate accuracy of the received global logical model, the received software model and the received hardware model relative to each other; and
   generate one or more events based on the validating.

2. The system of claim 1, the operations further comprising:
   store prior configurations and corresponding effectiveness of the prior configurations;
   identify any configuration in the received global logical model, the received software model and/or the received hardware model that is the same or similar to a stored prior configuration with a corresponding adverse effectiveness;
   report potential flaws in the received global logical model, the received software model and/or the received hardware model in response to a positive result of the identifying.

3. The system of claim 1, wherein the one or more events include an informational event in response to no identified inconsistencies resulting from the validating.

4. The system of claim 1, wherein the one or more events include an error event in response to at least one identified inconsistency resulting from the validating.

5. The system of claim 4 wherein the error event can have different levels of severity based on a severity of the at least one inconsistency.

6. The system of claim 5, wherein the severity is based on which of the network devices had the inconsistency.

7. The system of claim 4, the operations further comprising independently validating, in response to an error event, secondary content within the received global logical model, the received software model and/or the received hardware model, the secondary content being related to original content for which the at least one inconsistency was generated.

8. At least one non-transitory computer readable medium storing instructions, which when executed by a processor causes the processor to perform operations comprising:
   receive, from a controller, a global logical model in a first format, the global logical model containing instructions on how endpoints connected to a network fabric communicate within each other through one or more network devices within the fabric;
   receive, from a network device within the fabric:
      a software model being at least a subset of instructions from the global logical model in a second format executable on the network device, the subset of instructions being device specific instructions from the global logical model that are specific to operability of the network device, wherein the software model was created by the network device from a portion of the global logical model that is specific to how the network device communicates to the fabric; and
      a hardware model of hardware configurations of the network device, wherein the hardware model was created by the network device from the software model;
   validate accuracy of the received global logical model, the received software model and the received hardware model relative to each other; and
   generate one or more events based on the validating.

9. The at least one non-transitory computer readable medium of claim 8, the operations further comprising:
   store prior configurations and corresponding effectiveness of the prior configurations;
   identify any configuration in the received global logical model, the received software model and/or the received hardware model that is the same or similar to a stored prior configuration with a corresponding adverse effectiveness;

report potential flaws in the received global logical model, the received software model and/or the received hardware model in response to a positive result of the identifying.

10. The at least one non-transitory computer readable medium of claim 8, wherein the one or more events include an informational event in response to no identified inconsistencies resulting from the validating.

11. The at least one non-transitory computer readable medium of claim 8, wherein the one or more events include an error event in response to at least one identified inconsistency resulting from the validating.

12. The at least one non-transitory computer readable medium of claim 11 wherein the error event can have different levels of severity based on a severity of the at least one inconsistency.

13. The at least one non-transitory computer readable medium of claim 11, the operations further comprising independently validating, in response to an error event, secondary content within the received global logical model, the received software model and/or the received hardware model, the secondary content being related to original content for which the at least one inconsistency was generated.

14. A method for performing a network assurance check of proper deployment of a configuration in a fabric, comprising:

receiving, from a controller, a global logical model in a first format, the global logical model containing instructions on how endpoints connected to a network fabric communicate within each other through one or more network devices within the fabric;

receiving, a network device within the fabric:

a software model being at least a subset of instructions from the global logical model in a second format executable on the network device, the subset of instructions being device specific instructions from the global logical model that are specific to operability of the network device, wherein the software model was created by the network device from a portion of the global logical model that is specific to how the network device communicates to the fabric; and a hardware model of hardware configurations of the network device, wherein the hardware model was created by the network device from the software model;

validating accuracy of the received global logical model, the received software model and/or the received hardware model relative to each other; and generating one or more events based on the validating.

15. The method of claim 14, further comprising:

storing prior configurations and corresponding effectiveness of the prior configurations;

identifying any configuration in the received global logical model, the received software model and/or the receiving hardware model that is the same or similar to a stored prior configuration with a corresponding adverse effectiveness;

reporting potential flaws in the received global logical model, the received software model and/or the receiving hardware model in response to a positive result of the identifying.

16. The method of claim 14, wherein the one or more events include an informational event in response to no identified inconsistencies resulting from the validating.

17. The method of claim 14, wherein the one or more events include an error event in response to at least one identified inconsistency resulting from the validating.

18. The method of claim 17 wherein the error event can have different levels of severity based on a severity of the at least one inconsistency.

19. The method of claim 18, wherein the severity is based on which of the network devices had the inconsistency.

20. The method of claim 17, further comprising independently validating, in response to an error event, secondary content within the received global logical model, the received software model and/or the receiving hardware model, the secondary content being related to original content for which the at least one inconsistency was generated.

* * * * *